US012571156B2

(12) United States Patent (10) Patent No.: US 12,571,156 B2
Yoon et al. (45) Date of Patent: Mar. 10, 2026

(54) LAUNDRY TREATING APPARATUS AND METHOD FOR CONTROLLING THE SAME

(71) Applicant: LG Electronics Inc., Seoul (KR)

(72) Inventors: Juhan Yoon, Seoul (KR); Namyeong Heo, Seoul (KR); Donghyun Jin, Seoul (KR); Manseok Lee, Seoul (KR); Jinwoo Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 779 days.

(21) Appl. No.: 17/667,076

(22) Filed: Feb. 8, 2022

(65) Prior Publication Data

US 2022/0251764 A1 Aug. 11, 2022

(30) Foreign Application Priority Data

Feb. 8, 2021 (KR) ........................ 10-2021-0017566
Mar. 30, 2021 (KR) ........................ 10-2021-0040833
Jul. 8, 2021 (KR) ........................ 10-2021-0089470

(51) Int. Cl.
*D06F 58/20* (2006.01)
*D06F 58/08* (2006.01)
(Continued)

(52) U.S. Cl.
CPC ............ *D06F 58/203* (2013.01); *D06F 58/08* (2013.01); *D06F 58/206* (2013.01); *D06F 58/44* (2020.02);
(Continued)

(58) Field of Classification Search
None
See application file for complete search history.

(56) References Cited

U.S. PATENT DOCUMENTS 10,907,288 B1 * 2/2021 Carpenter ............... D06F 33/00
2011/0167664 A1 * 7/2011 Favret ................... D06F 58/203
34/134
(Continued)

FOREIGN PATENT DOCUMENTS

CN 1474889 2/2004
CN 101003938 7/2007
(Continued)

OTHER PUBLICATIONS

International Search Report and Written Opinion in International Application No. PCT/KR2022/001807, dated May 30, 2022, 13 pages.
(Continued)

*Primary Examiner* — David J Laux
(74) *Attorney, Agent, or Firm* — Fish & Richardson P.C.

(57) ABSTRACT

A laundry treating apparatus includes a cabinet, a drum configured to accommodate laundry, a base that disposed below the drum and defines a space configured to guide air circulating to the drum or correct moisture in the air, a motor configured to rotate the drum, a heat exchange unit disposed at the base and configured to condense the moisture in the air and to heat the air, a steam generator configured to generate steam to be supplied to the drum. The motor is disposed behind the drum and spaced apart from the base, and the base includes a circulation flow path part configured to circulate the air to the drum, and a steam generator installation space that accommodates the steam generator therein.

35 Claims, 32 Drawing Sheets

(51) Int. Cl.
| | |
|---|---|
| *D06F 58/44* | (2020.01) |
| *D06F 103/62* | (2020.01) |
| *D06F 105/02* | (2020.01) |
| *D06F 105/42* | (2020.01) |
| *H02K 7/116* | (2006.01) |

(52) U.S. Cl.
CPC .......... *H02K 7/116* (2013.01); *D06F 2103/62* (2020.02); *D06F 2105/02* (2020.02); *D06F 2105/42* (2020.02)

(56) References Cited

U.S. PATENT DOCUMENTS

| | | | | |
|---|---|---|---|---|
| 2012/0151792 A1* | 6/2012 | Jang | ........................ | D06F 58/24 |
| | | | | 34/562 |
| 2013/0199250 A1* | 8/2013 | Doh | ........................ | D06F 39/40 |
| | | | | 68/5 C |
| 2013/0269202 A1* | 10/2013 | Razborsek | ........... | F04D 29/483 |
| | | | | 34/130 |
| 2016/0115641 A1* | 4/2016 | Kim | ........................ | D06F 58/10 |
| | | | | 34/132 |
| 2017/0016171 A1* | 1/2017 | Lee | ........................ | D06F 58/22 |
| 2017/0016172 A1* | 1/2017 | Lee | ........................ | D06F 58/22 |
| 2019/0186068 A1* | 6/2019 | Kim | ........................ | D06F 58/26 |
| 2019/0249355 A1* | 8/2019 | Park | ........................ | D06F 58/26 |
| 2019/0338455 A1* | 11/2019 | Garnek | .................... | D06F 58/24 |
| 2020/0224358 A1* | 7/2020 | Masters | ................ | D06F 29/005 |
| 2020/0255939 A1* | 8/2020 | Khizar | .................... | D06F 39/14 |

FOREIGN PATENT DOCUMENTS

| | | |
|---|---|---|
| CN | 101310068 | 11/2008 |
| CN | 102869826 | 1/2013 |
| CN | 103736754 | 4/2014 |
| CN | 103966817 | 8/2014 |
| CN | 105671902 | 6/2016 |
| CN | 107780120 | 3/2018 |
| CN | 109844211 | 6/2019 |
| CN | 110528226 | 12/2019 |
| CN | 112088231 | 12/2020 |
| EP | 1734170 A1 | 12/2006 |
| EP | 1961857 A1 | 8/2008 |
| EP | 1970482 | 8/2010 |
| EP | 3964634 | 3/2022 |
| JP | 55081914 | 6/1980 |
| JP | 55115455 | 9/1980 |
| JP | 57063724 | 4/1982 |
| JP | 57124674 | 8/1982 |
| JP | S60-111715 | 6/1985 |
| JP | 2009247600 A * | 10/2009 |
| JP | 2012254246 | 12/2012 |
| JP | 2013090815 | 5/2013 |
| JP | 2014150859 | 8/2014 |
| KR | 10-2005-0065721 A | 6/2005 |
| KR | 10-2009-0069756 A | 7/2009 |
| KR | 20150027492 | 3/2015 |
| KR | 20190121656 | 10/2019 |
| KR | 20190128464 | 11/2019 |
| KR | 20190128468 | 11/2019 |
| KR | 10-2020-0066169 A | 6/2020 |
| KR | 102119538 | 6/2020 |
| WO | WO 2008101611 | 8/2008 |
| WO | WO 2019/216631 | 11/2019 |

OTHER PUBLICATIONS

The Partial European Search Report in European Application No. 22153378.9, dated Jun. 29, 2022, 13 pages.

Office Action in Taiwanese Appln. No. 111103367, mailed on Jun. 6, 2023, 50 pages (with English translation).

Office Action in Chinese Appln. No. 202210118041.5, mailed on Apr. 15, 2023, 22 pages (with English translation).

Office Action in Australian Appln. No. 2022218062, mailed on May 12, 2025, 5 pages.

Office Action in Korean Appln. No. 10-2023-7024690, mailed on Apr. 24, 2025, 9 pages (with English translation).

Office Action in Korean Appln. No. 10-2023-7024690, mailed on Dec. 29, 2025, 18 pages (with English translation).

* cited by examiner

- Related Art -

- Related Art -

Figure 32:
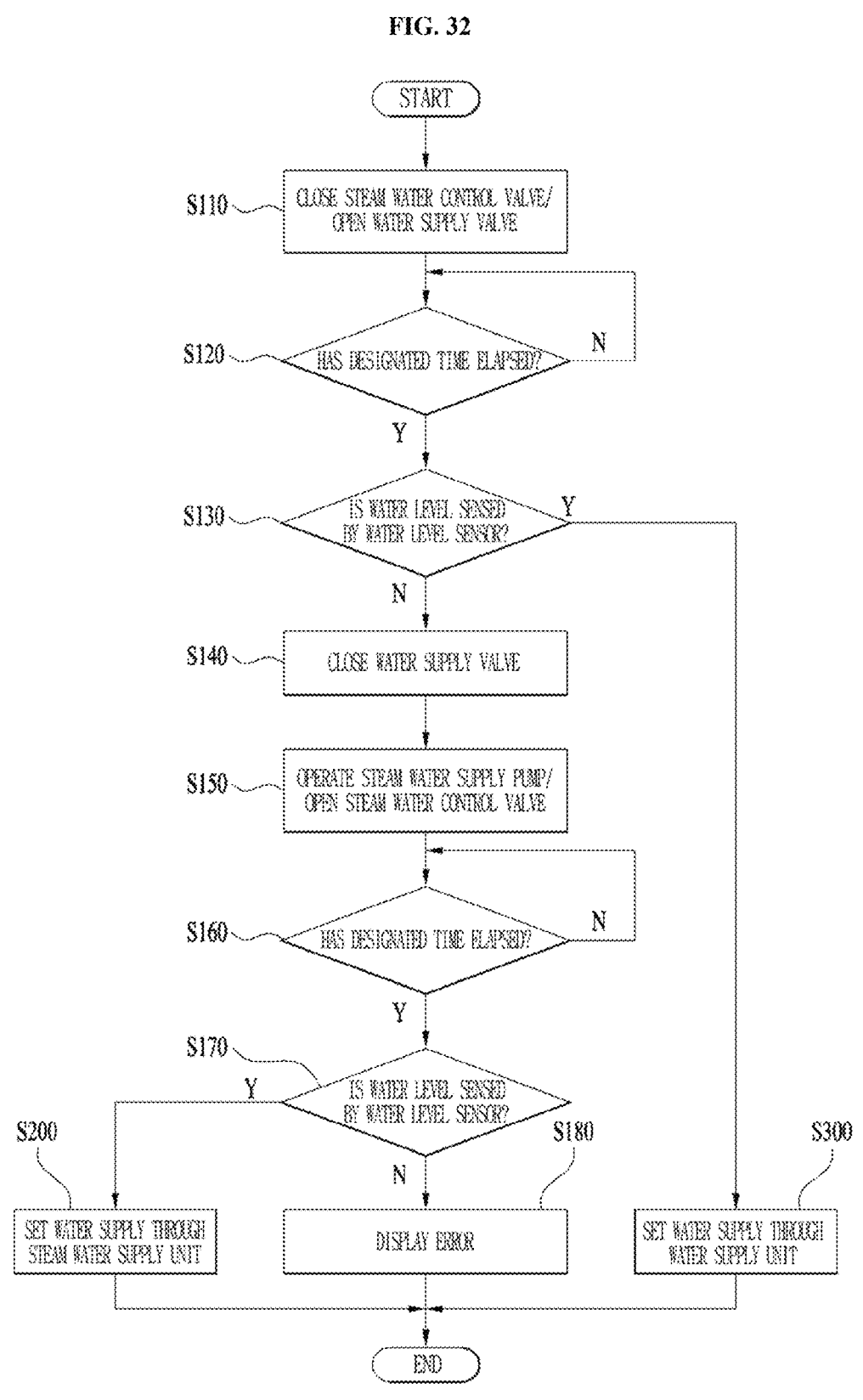

START

S110 — CLOSE STEAM WATER CONTROL VALVE/ OPEN WATER SUPPLY VALVE

S120 — HAS DESIGNATED TIME ELAPSED? — N

Y

S130 — IS WATER LEVEL SENSED BY WATER LEVEL SENSOR? — Y

N

S140 — CLOSE WATER SUPPLY VALVE

S150 — OPERATE STEAM WATER SUPPLY PUMP/ OPEN STEAM WATER CONTROL VALVE

S160 — HAS DESIGNATED TIME ELAPSED? — N

Y

S170 — IS WATER LEVEL SENSED BY WATER LEVEL SENSOR?

Y — S200    N — S180    S300

S200 — SET WATER SUPPLY THROUGH STEAM WATER SUPPLY UNIT

S180 — DISPLAY ERROR

S300 — SET WATER SUPPLY THROUGH WATER SUPPLY UNIT

END

LAUNDRY TREATING APPARATUS AND METHOD FOR CONTROLLING THE SAME

CROSS-REFERENCE TO RELATED APPLICATIONS

This application claims the benefit of Korean Patent Application Nos. 10-2021-0017566, filed on Feb. 8, 2021, 10-2021-0040833, filed on Mar. 30, 2021, and 10-2021-0089470, filed on Jul. 8, 2021, the disclosures of which are hereby incorporated by reference as if fully set forth herein.

TECHNICAL FIELD

The present disclosure relates to a laundry treating apparatus, and more particularly, to a laundry treating apparatus including a driving unit directly connected to a drum configured to accommodate laundry so as to rotate the drum.

BACKGROUND

Laundry treating apparatuses are apparatuses configured to remove dust and foreign substances from laundry, for example, by applying physical force thereto. The laundry treating apparatuses can include washers, dryers, clothes refreshers (i.e., clothes stylers), etc.

The washers may be configured to perform a washing cycle to separate and remove foreign substances from laundry by supplying water and detergent.

The dryers may be classified into an exhaust-type dryer and a circulation-type dryer, and both dryers are configured in common to perform a drying cycle to remove moisture from laundry by producing hot air having a high temperature through a heater and exposing the laundry to the hot air.

In some cases, a dryer may omit components for supplying water to laundry or to drain water and a tub provided in a cabinet to receive water such that the inner structure of the dryer may be simplified, and drying efficiency may be improved by directly supplying hot air to the drum.

In some cases, a dryer may include a drum configured to accommodate laundry, a hot air supplier configured to supply hot air to the drum, and a driving unit configured to rotate the drum. The dryer may dry the laundry accommodated in the drum by supplying hot air to the inside of the drum, and may uniformly expose the surface of the laundry to hot air by rotating the drum. Consequently, drying of the laundry may be completed through uniform contact of the overall surface of the laundry with hot air.

In order to rotate the drum, the driving unit may be fixed to the inside of the cabinet. Further, when the driving unit is provided to rotate a rotating shaft coupled to the drum, the driving unit may be provided parallel to the rotating shaft. However, the dryer may not include a tub fixed to the inside of the cabinet, which may lead to a difficulty in fixing the driving unit to the tub in the same manner as the washer.

FIG. 1 shows the structure of an example of a dryer and a driving unit in related art.

For example, the dryer may include a cabinet 1 configured to form the external appearance of the dryer, a drum 2 rotatably provided within the cabinet 1 so as to accommodate laundry, and a driving unit 3 provided so as to rotate the drum 2.

The driving unit 3 may be disposed on the rear surface of the drum 2 so as to rotate the drum 2, and may be fixedly coupled to a rear panel 11 forming the rear surface of the cabinet 1. Therefore, the driving unit 3 may be fixed to the cabinet 1, and may thus rotate the drum 2.

The driving units 3 of the above-described conventional dryers may include in common a stator 31 fixed to the rear panel 11, a rotor 32 rotated by the stator 31, and a rotating shaft 33 coupled to the rotor 32 so as to rotate the drum 2, and may further include a reducer 37 provided to increase torque while reducing the revolutions per minute (RPM) of the rotating shaft 33 so as to rotate the drum 2.

Further, the dryer may further include in common a fixing unit 4 configured to fix the driving unit 3 to the rear panel 11. The fixing unit 4 may include at least one of a first fixing member 41 configured to fix the stator 31 to the rear panel 11, and a second fixing member 42 configured to fix the rotating shaft 33 to the rear panel 11. Therefore, in the conventional dryers, the driving unit 3 is disposed parallel to the rotating shaft 33 coupled to the drum 2, and may thus stably rotate the drum 2.

The rear panel 11 of the cabinet 1 may be provided as a thin steel plate, and is thus easily deformed or vibrated even by a considerably small external force. Further, the rear panel 11 may receive not only the load of the driving unit 3 but also the load of the drum 2 through the rotating shaft 33, and thus maintaining the shape of the rear panel 11 may thus be difficult.

In some cases, when laundry is eccentrically disposed in the drum 2 or repeatedly falls in the drum 2 during the rotating process of the drum 2, external force may be repeatedly transmitted to the rear panel 11, and thus, the rear panel 11 may be vibrated.

When the rear panel 11 is even temporarily bent or deformed due to vibration or external force transmitted thereto, the rotating shaft 33 configured to connect the driving unit 3 to the drum 2 may be distorted. Accordingly, the driving unit 3 may generate vibration or noise and, in severe cases, the rotating shaft 33 may be damaged. Further, bending or deformation of the rear panel 11 may generate noise.

Further, during a process of vibrating the rear panel 11, the distance between the rotor 32 and the stator 31 is temporarily varied, and may thus cause collision between the rotor 32 and the stator 31 or generate vibration and noise.

Moreover, when the driving unit 3 further includes the reducer 37, the rotating shaft 33 coupled to the reducer 37 and a reduction shaft 33a configured to connect the reducer 37 to the drum 2 are separated from each other. In some cases, since the reducer 37 is supported by the rear panel 11 through the stator 31 or the rotating shaft 33, when the rear panel 11 is deformed even slightly, the reduction shaft 33a and the rotating shaft 33 may be distorted or misaligned with each other.

For instance, the reduction shaft 33a connected to the drum 2 may have a less position change than the rotating shaft 33 coupled to the driving unit 3 due to the load of the drum 2. Therefore, when the rear panel 11 is temporarily bent or deformed, the tilting degrees of the rotating shaft 33 and the reduction shaft 33a may be different, and thus, the rotating shaft 33 and the reduction shaft 33a may be misaligned with each other.

Therefore, in some cases, when the driving unit 3 is operated, the rotating shaft 33 and the reduction shaft 33a may be misaligned with each other, and thus, reliability of the reducer 37 may not be secured and the reducer 37 may be damaged.

In some cases, a dryer may include a driving unit 3 fixed to the bottom surface of a cabinet 1.

For example, FIGS. 2A and 2B show the dryer in related art having the driving unit 3 fixed to the bottom surface of the cabinet 1 or a base 5.

The dryer may include the cabinet 1 and a drum 2, and may further include a circulation flow path configured to circulate air of the drum 2 to the outside, and a heat pump 6 accommodated in the circulation flow path and configured to condense air and reheat air. Water condensed by the heat pump 6 may be collected in a storage tank 9 using a pump 8.

Even when the driving unit 3 is vibrated or external force is temporarily transmitted to the cabinet 1 through the driving unit 3, the bottom surface of the cabinet 1 may not be deformed or tilted.

Therefore, the driving unit 3 may be fixed to the bottom surface of the cabinet 1 or the base 5 that is fixed to the bottom surface of the cabinet 1 below the drum 2. In the dryer, the driving unit 3 may not be disposed parallel to the axis of rotation of the drum 2, and thus, the drum 2 may be rotated using an additional element.

Specifically, the driving unit 3 may include a motor 34 fixed to the bottom surface of the cabinet 1, a rotating shaft rotated by the motor 34, a pulley 35 rotated by the rotating shaft, and a belt 36 provided to connect the outer circumferential surface of the drum 2 to the outer circumferential surface of the pulley 35.

In some cases, when the motor 34 rotates the rotating shaft, the pulley 35 may rotate the belt 36, and the belt 36 may rotate the drum 2. In some examples, since the diameter of the pulley 35 is much smaller than the diameter of the drum 2, the dryer may omit a reducer.

In some cases, since the diameter of the pulley 35 is much smaller than the diameter of the drum 2, when the motor 34 is rapidly rotated, the belt 36 may slip on the drum 2 or the pulley 35. Therefore, the rotational acceleration of the motor 34 may be limited to a designated level or less, and the motor 34 may be slowly accelerated or decelerated so as to prevent slip of the belt 36 when the drum 2 is rotated.

Therefore, the conventional dryer may not rapidly change the rotating direction of the drum 2, thus being incapable of controlling rotation of the drum 2 or changing the rotating direction of the drum 2. Thereby, the dryer may not control the rotating direction and the rotational velocity of the drum 2 during the drying cycle, and thus may not maximally increase drying efficiency.

Referring to FIG. 2B, the base 5 of the conventional dryer may include a motor installation part 531 configured such that the motor 34 is installed thereon, a circulation flow path part 51 configured such that air of the drum 2 flows therein, a compressor installation part 58 provided outside the circulation flow path part 51 such that a compressor is installed on the compressor installation part 58, and a water collection part 57 configured to collect water condensed in the circulation flow path part 51. An evaporator fixing part 54 configured to fix an evaporator and a condenser fixing part 53 configured to fix a condenser may be provided in the circulation flow path part 51. Water condensed in the evaporator fixing part 54 may be collected in the water collection part 57 through a communication hole 551.

Further, the compressor installation part 58 may be installed as close to the circulation flow path part 51 as possible so as to reduce heat loss of a refrigerant. Further, the water collection part 57 needs to be installed as close to the circulation flow path part 51 as possible so as to accommodate the condensed water.

In some examples, the motor 34 may be provided to have a considerable volume so as to generate power to rotate the drum 2, and change in the installed position of the motor 34 is limited in order to rotate the drum 2 through the belt 36. Therefore, the motor installation part 59 needs to occupy a specific area or more of the base 5 at one side of the circulation flow path part 51, and disposition of the motor installation part 59 needs to be determined before the compressor installation part 58 and the water collection part 57.

Therefore, the compressor installation part 58 and the water collection part 57 need to be installed so as to avoid the motor installation part 59, and need to be installed in a region of the base 5 other than the circulation flow path part 51 and the motor installation part 59.

The compressor 61 can occupy a considerable volume, and thus, the compressor installation part 58 and the water collection part 57 may not be disposed in the extending direction (for example, in the forward and rearward directions) of the circulation flow path part 51.

Here, the water collection part 57 can be disposed immediately adjacent to the circulation flow path part 51, and thus, the water collection part 57 needs to be disposed between the compressor installation part 58 and the circulation flow path part 51.

In some cases, a dryer may include a heat pump configured to circulate air in a drum so as to dry laundry accommodated in the drum. In some cases, the distance between the evaporator and the condenser may not be sufficiently secured. That is, the distance between the evaporator and the condenser may be less than the distance between the condenser and the fan.

Therefore, condensed water generated by the evaporator is not collected, and may be evaporated again by the condenser located adjacent to the evaporator. When the condensed water is evaporated, heat loss of the condenser may be caused, and wet steam may be generated again and thus supplied to the drum, thereby reducing drying efficiency In some cases, a dryer may include a steam injection apparatus configured to generate steam and inject the generated steam into a drum so as to remove contaminants from laundry and sterilize the laundry. A drawer having a water accommodator provided therein may be installed at the upper portion of the front surface of the dryer, and water accommodated in the water accommodator may be transferred to the steam injection apparatus, i.e., a steam generator, provided at the rear portion of the dryer by a pump. Steam generated by the steam generator may be injected into the rear region of the drum through a nozzle or the like.

That is, a separate element, such as the pump, may transfer water for generating steam, and a flow path configured to connect the water accommodator to the steam generator located at the rear portion of the dryer may have a designated length or more. Therefore, water stagnant in the flow path may cause freezing of the flow path in winter time, and the stagnant water may be contaminated and thus generate odor.

In some cases, a dryer may have a separate steam generator and generate steam using condensed water generated during drying of laundry or water supplied from an external water supply sources, thereby diversifying and improving laundry treating performance.

Dryers may be used in the state of being installed on the ground, and a water supply unit may receive water transmitted from an external water supply source so as to supply steam. For example, the water supply unit may be located at the upper portion of the rear surface of the dryer for user convenience.

In some cases, a dryer and a drum washer may be disposed in the vertical direction to improve efficiency of the installation space for the dryer and the washer. For instance, the washer having a relatively large weight may be disposed on the ground, the dryer having a smaller weight than the washer may be disposed on the washer, and thereby, utilization of the space in which the washer and the dryer are installed and use convenience may be increased.

In some cases, where the water supply unit provided on the upper portion of the rear surface of the dryer is located at a higher position from the ground, the position of the water supply unit may cause inconvenience of a worker or a user who connects the water supply unit to the external water supply source.

In some cases, where the dryer is stacked on the washer, the distance between the water supply unit of the dryer and the external water supply source may be increased, and thus, the length of a water supply hose to connect the water supply unit to the external water supply source may be increased.

SUMMARY

The present disclosure describes a laundry treating apparatus that includes a driving unit configured to reduce the rotational velocity of a rotor and to transmit the reduced rotational velocity to a drum, thereby allowing the center of rotation of the rotor and the center of rotation of the drum to form a concentric axis.

The present disclosure describes a laundry treating apparatus that has a space between an evaporator and a condenser to help prevent condensed water generated by the evaporator from scattering in the condenser.

The present disclosure describes a laundry treating apparatus that has a space between a condenser and a circulation fan to facilitate smooth generation of air flow in a flow path by the circulation fan.

The present disclosure describes a laundry treating apparatus that can increase the circulation rate of air in a flow path.

The present disclosure describes a laundry treating apparatus that includes a steam generator configured to generate steam injected into a drum and installed on a base.

The present disclosure describes a laundry treating apparatus that can supply steam generated by a steam generator to the front portion of a drum.

The present disclosure describes a laundry treating apparatus that can shorten the length of a flow path configured to supply water to a steam generator by disposing a water supply unit configured to store water for generating steam and the steam generator adjacent to each other.

The present disclosure describes a laundry treating apparatus that includes a steam generator installed on a base to increase efficiency in space utilization.

The present disclosure describes a laundry treating apparatus and a method for controlling the same to improve a water supply structure configured to generate steam and to simplify a steam water supply flow path.

The present disclosure describes a laundry treating apparatus and a method for controlling the same to improve a water supply position for steam generation when the laundry treating apparatus is stacked on another laundry treating apparatus, so as to provide convenience to a worker or a user.

The present disclosure describes a laundry treating apparatus and a method for controlling the same to improve a water supply position for steam generation when the laundry treating apparatus is stacked on another laundry treating apparatus, so as to shorten a water supply hose configured to connect a water supply unit to an external water supply source.

According to one aspect of the subject matter described in this application, a laundry treating apparatus includes a cabinet having an opening defined at a front portion thereof, a drum rotatably that is disposed in the cabinet and has an inlet defined at a front portion thereof and configured to introduce laundry to the drum, a base that is disposed below the drum and defines a space configured to guide air circulating to the drum or to collect moisture condensed from the air, a motor that is configured to rotate the drum, disposed rearward relative to the drum, and spaced apart from the base, a steam generator configured to generate steam to be supplied to the drum, and a heat exchange unit. The heat exchange unit includes a first heat exchanger disposed at the base and configured to condense the moisture in the air, a second heat exchanger disposed at the base and configured to heat the air, and a compressor configured to supply a refrigerant to the first heat exchanger or the second heat exchanger to thereby enable heat exchange between the air and the refrigerant. The base defines a circulation flow path that accommodates the first heat exchanger and the second heat exchanger and is configured to guide the air toward the drum, and a steam generator installation space that is spaced apart from the circulation flow path and accommodates the steam generator.

Implementations according to this aspect can include one or more of the following features. For example, the laundry treating apparatus can include a water collection part that is spaced apart from the steam generator installation space and defines a water collection space that is in fluid communication with the circulation flow path and configured to collect water condensed in the circulation flow path. The steam generator installation space and the water collection part are arranged along a forward-rearward direction such that the steam generator installation space overlaps with the water collection part along the forward-rearward direction. In some examples, the steam generator installation space can be defined forward relative to the water collection part. In some examples, the water collection part and the first heat exchanger can be arranged along a left-right direction such that the water collection part overlaps with the first heat exchanger along the left-right direction.

In some implementations, the base can include a collection guide that is recessed from a first portion of a bottom surface of the circulation flow path facing the first heat exchanger and configured to guide the condensed water to the water collection space. The collection guide can define a water collection communication hole that passes through a second portion of the bottom surface of the circulation flow path facing the water collection part, where the water collection communication hole is in fluidly communication with the water collection space, and the steam generator installation space is defined forward relative to the water collection communication hole. In some implementations, the steam generator installation space is defined forward relative to the first heat exchanger.

In some implementations, the base can further define a compressor installation space that is spaced apart from the circulation flow path and accommodates the compressor, where the steam generator installation space and compressor installation space are arranged along the forward-rearward direction such that the steam generator installation space overlaps with the compressor installation space along the forward-rearward direction. In some examples, the steam generator installation space can be defined forward relative to the compressor installation space. The water collection space can be arranged between the steam generator installation space and the compressor installation space in the forward-rearward direction.

In some implementations, the laundry treating apparatus can include a plurality of ducts that define the circulation flow path. For example, the plurality of ducts include an inflow duct disposed at a first side of the circulation flow path and configured to receive air discharged from the drum, a discharge duct disposed at a second side of the circulation flow path and configured to discharge the air toward the drum, and a transfer duct that connects the inflow duct to the discharge duct. In some examples, the ducts can refer to parts of the circulation flow path. The steam generator installation space and the inflow duct can be arranged along a left-right direction such that the steam generator installation space overlaps with the inflow duct along the left-right direction.

In some implementations, the laundry treating apparatus can include a front plate that is located between the cabinet and the front portion of the drum and supports the front portion of the drum, where the front plate is configured to guide the air discharged from the drum to the inflow duct and defines an inlet communication hole in fluid communication with the opening of the cabinet, and the steam generator installation space is defined at a surface of the base facing the front plate. In some examples, the steam generator can be disposed between the base and the front plate.

In some implementations, the laundry treating apparatus can include a rear plate disposed on the base and located between the drum and the motor, where the rear plate is configured to guide the air discharged from the circulation flow path to the drum. In some examples, the laundry treating apparatus can include a reducer fixed to a rear surface of the rear plate and disposed between the drum and the motor, the reducer being configured to reduce rotational power supplied by the motor to rotate the drum. In some examples, the motor can be fixed to the reducer and spaced apart from the rear plate.

In some implementations, the laundry treating apparatus can include a circulation flow path fan rotatably disposed in the discharge duct and configured to generate air flow from the transfer duct toward the drum, where a distance between the first heat exchanger and the second heat exchanger is greater than a distance between the second heat exchanger and the circulation flow path fan in a forward-rearward direction. In some examples, the distance between the first heat exchanger and the second heat exchanger can be greater than or equal to a length of the first heat exchanger or a length of the second heat exchanger in the forward-rearward direction.

In some implementations, the laundry treating apparatus can include a steam water supply unit configured to store water and to supply the stored water to the steam generator, where the steam water supply unit includes a supply pipe that is disposed at an upper region of a front portion of the cabinet and extends toward the steam generator. The laundry treating apparatus can further include a water supply unit configured to receive water from an external water supply source and to supply the water to the steam generator, where the water supply unit includes a water supply pipe that is disposed at a lower region of a rear portion of the cabinet and connected to the supply pipe of the steam water supply unit.

In some examples, the steam water supply unit can include a steam water cartridge configured to store water, a supply unit housing configured to detachably accommodate the steam water cartridge therein, and a steam water supply pump disposed in the supply unit housing and configured to transfer the water stored in the steam water cartridge through the supply pipe, where the supply pipe can include a T-type connection pipe connected to the steam water supply pump and the water supply pipe. In some examples, the cabinet can include a rear plate that defines a rear surface of the cabinet, where the motor is disposed on the rear plate, and the water supply unit is located at a lower portion of a rear surface of the rear plate.

In some examples, the water supply unit can include a water supply valve disposed at the lower portion of the rear surface of the rear plate, and the water supply pipe can connect the water supply valve to the T-type connection pipe. In some examples, the steam water supply unit can include a steam water control valve disposed at a front end of the T-type connection pipe and configured to restrict the stored water from flowing along the supply pipe.

In some examples, the supply unit housing can define a cartridge mount space configured to detachably accommodate the steam water cartridge, and a pump installation space that is disposed adjacent to the cartridge mount space and accommodates the steam water supply pump. In some examples, the cabinet can include an upper panel that defines an upper surface of the cabinet, where the upper panel has a cartridge inlet defined above the cartridge mount space and configured to receive and discharge the steam water cartridge therethrough. The cabinet can further include an inlet door rotatably connected to the upper panel and configured to cover the cartridge inlet.

According to another aspect, a method controls a laundry treating apparatus. The laundry treating apparatus includes a steam generator that is configured to generate steam in a steam generation space and a water level sensor configured to sense a water level in the steam generation space, a steam water supply unit including a supply pipe configured to supply water stored in a steam water cartridge to the steam generator and a steam water control valve disposed at the supply pipe and configured to control a flow path of the supply pipe, and a water supply unit including a water supply pipe configured to supply water supplied from an external water supply source to the supply pipe and a water supply valve disposed at the water supply pipe and configured to control a flow path of the water supply pipe. The method includes closing the steam water control valve and opening the water supply valve, closing the water supply valve and opening the steam water control valve, sensing, by the water level sensor, the water level in the steam generation space based on opening the water supply valve and based on opening the steam water control valve, and supplying water supplied from one of the steam water supply unit or the water supply unit to the steam generator based on whether or not the water level is sensed by the water level sensor.

Implementations according to this aspect can include one or more of the following features. For example, the method can include standing for a designated time before sensing the water level after each of opening the water supply valve and opening the steam water control valve. In some examples, the steam water supply unit can include a steam water supply pump configured to supply the water stored in the steam water cartridge to the supply pipe, and the method can include supplying the stored water to the steam generator through the supply pipe based on the steam water control valve being opened.

In some implementations, opening the water supply valve and opening the steam water control valve can be sequentially performed, where sensing the water level can include sensing a first water level in the steam generation space after opening the water supply valve, and sensing a second water level in the steam generation space after opening the steam water control valve. In some implementations, the method can include, based on the first water level and the second water level not being sensed by the water level sensor, indicating, by a display, that the water level is not sensed.

According to another aspect, a laundry treating apparatus includes a cabinet having an opening defined at a front portion thereof, a drum that is rotatably disposed in the cabinet and has an inlet defined at a front portion thereof and configured to introduce laundry to the drum, a base that is disposed below the drum and defines a space configured to guide air circulating to the drum or to collect moisture condensed from the air, a motor that is configured to rotate the drum, that is disposed rearward relative to the drum, and that is spaced apart from the base, and a heat exchange unit. The heat exchange unit includes a first heat exchanger disposed at the base and configured to condense the moisture in the air, a second heat exchanger spaced apart from the first heat exchanger and configured to heat the air, and a compressor configured to supply a refrigerant to the first heat exchanger or the second heat exchanger to thereby enable heat exchange between the air and the refrigerant. The base defines a circulation flow path that accommodates the first heat exchanger and the second heat exchanger and is configured to guide the air toward the drum. The laundry treating apparatus can further include a circulation flow path fan that is disposed in the circulation flow path and spaced apart from the second heat exchanger, where the circulation flow path fan is configured to generate air flow along the circulation flow path toward the drum, and a distance between the first heat exchanger and the second heat exchanger is greater than a distance between the second heat exchanger and the circulation flow path fan.

Implementations according to this aspect can include one or more of the following features. For example, the circulation flow path can include an inflow duct disposed at a first side of the circulation flow path and configured to receive air discharged from the drum, a discharge duct disposed at a second side of the circulation flow path and configured to discharge the air toward the drum, and a transfer duct that connects the inflow duct to the discharge duct. In some examples, the first heat exchanger and the second heat exchanger can be disposed in the transfer duct, and the circulation flow path fan can be disposed in the discharge duct.

In some implementations, the discharge duct can include an air blowing part that accommodates the circulation flow path fan, that is located at a rear part of the discharge duct, and that is configured to discharge the air out of the circulation flow path. In some examples, a diameter of the circulation flow path fan can be greater than or equal to a height of the second heat exchanger. In some examples, the circulation flow path fan and the transfer duct can be arranged along a forward-rearward direction such that an outer circumferential surface of the circulation flow path fan overlaps with the transfer duct along the forward-rearward direction.

In some implementations, a center axis of rotation of the circulation flow path fan can extend parallel to a longitudinal direction of the transfer duct and pass through a width center of the transfer duct. In some examples, a center axis of rotation of the circulation flow path fan can pass through a width center of one of the first heat exchanger or the second heat exchanger.

In some implementations, the base can include a water collection part that is disposed outside the circulation flow path and defines a water collection space in fluid communication with the circulation flow path, where the water collection space is configured to collect condensed water generated in the circulation flow path. The base can further include a collection guide disposed at a bottom surface of the circulation flow path facing the first heat exchanger and configured to guide the condensed water to the water collection space.

In some implementations, the laundry treating apparatus can include a water cover that is located between the first heat exchanger and the collection guide and supports the first heat exchanger, where the water cover is configured to block the condensed water transferred along the collection guide from coming into contact with the first heat exchanger, and the water cover is spaced apart from the second heat exchanger. In some examples, the collection guide can include an extending stepped portion located between the first heat exchanger and the second heat exchanger and configured to block the condensed water from overflowing toward the second heat exchanger.

The present disclosure is not limited to the above-described objects, and it is to be understood that other objects which are not described herein will be apparent to those skilled in the art from the following description.

BRIEF DESCRIPTION OF THE DRAWINGS

FIG. 9 is an exploded perspective view illustrating an example of coupling of the reducer and a motor to the rear surface of the rear plate of the laundry treating apparatus.

FIG. 20 is a cross-sectional view taken along line B-B of FIG. 14A.

FIG. 24 is a cross-sectional view taken along line F-F of FIG. 23A, as seen from the right.

FIG. 29 is a partially exploded perspective view illustrating an example of a steam generator.

FIG. 32 is a flowchart illustrating an example of a process of supplying steam water.

DETAILED DESCRIPTION

Hereinafter, a laundry treating apparatus according to one or more implementations of the present disclosure will be described in detail with reference to the accompanying drawings.

Figure 1:
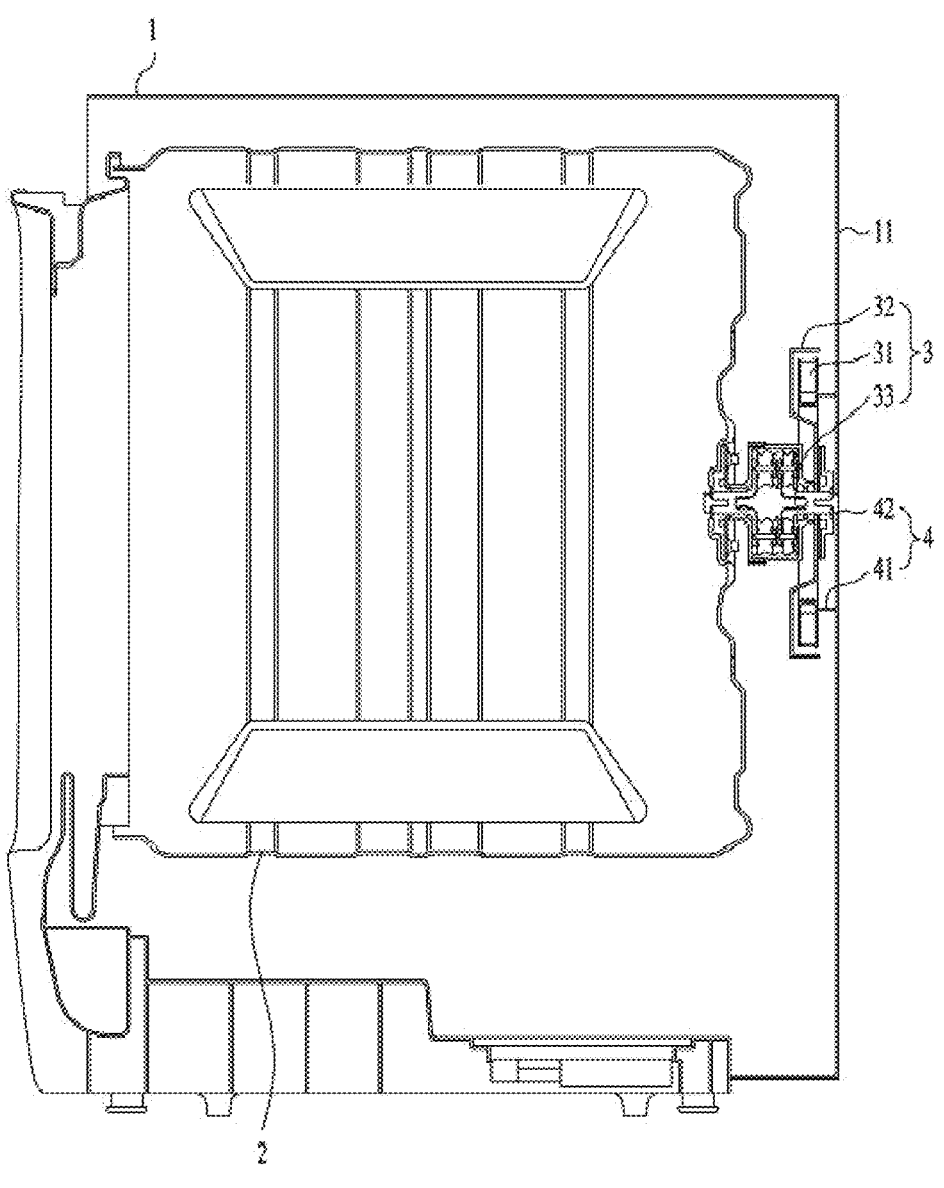
FIG. 1 is a cross-sectional view illustrating an example of a dryer in related art.
Figure 2A:
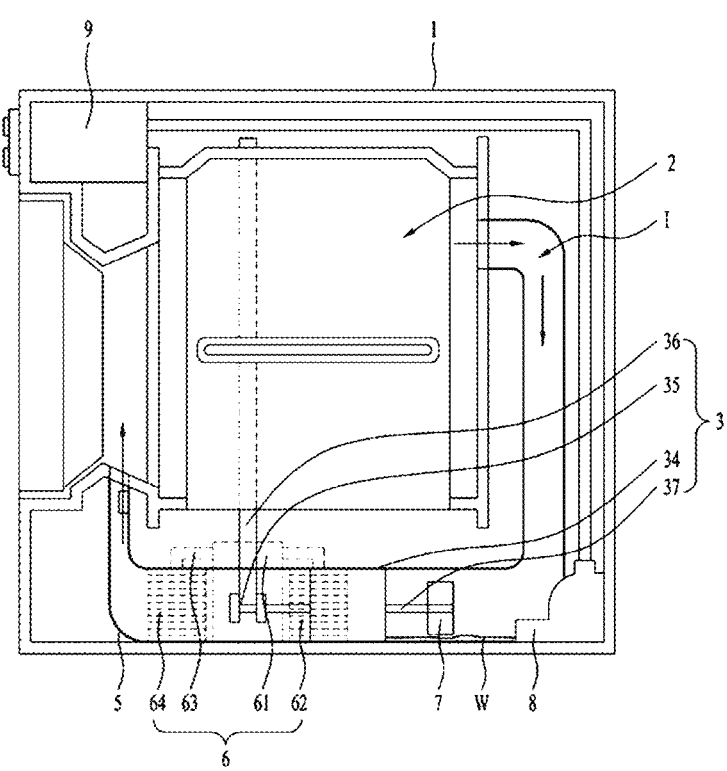
FIGS. 2A and 2B are views illustrating an example of another dryer in related art.
Figure 2B:
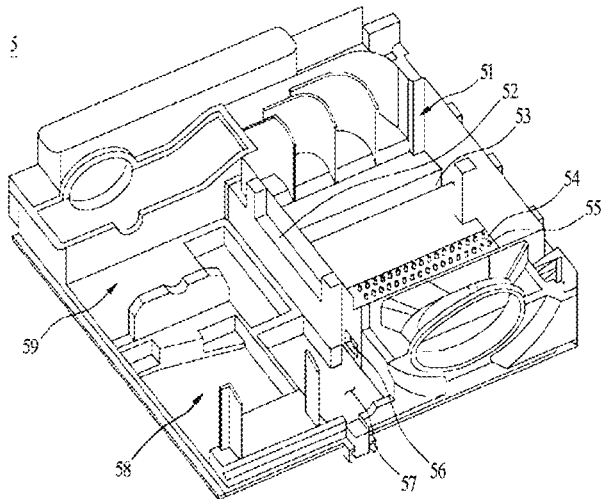
Figure 3:
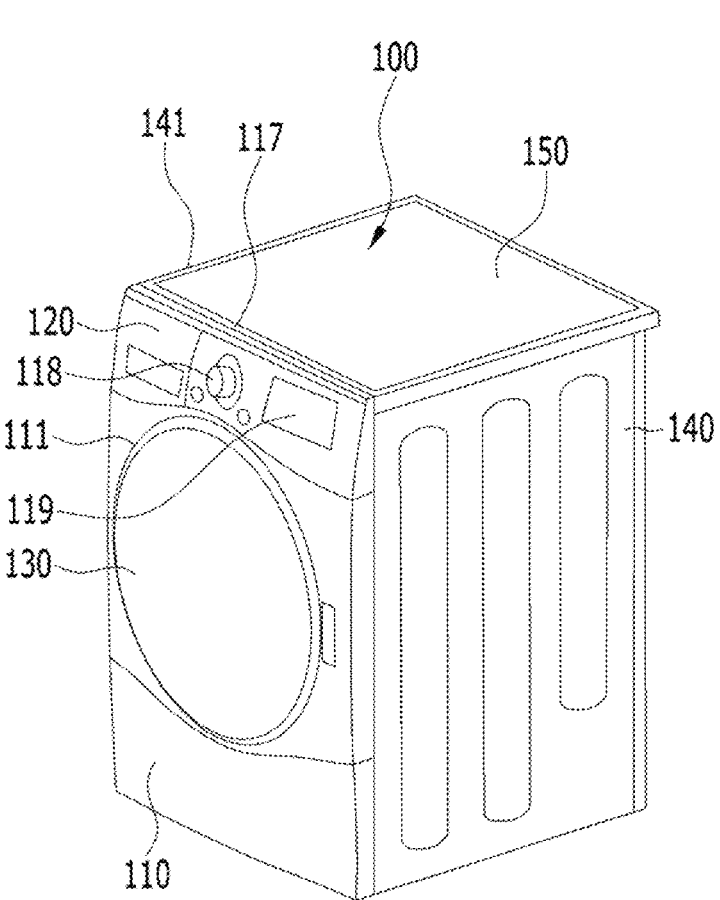
FIG. 3 is a perspective view illustrating an example of a laundry treating apparatus according to the present disclosure.

FIG. 3 illustrates an external appearance of an example of a laundry treating apparatus.

For example, in some implementations, the laundry treating apparatus can include a cabinet 100 that defines the external appearance of the laundry treating apparatus.

In some examples, the cabinet 100 can include a front panel 110 that defines the front surface of the laundry treating apparatus, an upper panel 150 that defines the upper surface of the laundry treating apparatus, and side panels 140 that defines the side surfaces of the laundry treating apparatus. The side panels 140 can include a left side panel 141 that defines the left side surface of the laundry treating apparatus. The front panel 110 can be provided with an opening 111 provided to communicate with the inside of the cabinet 100, and a door 130 rotatably coupled to the cabinet 100 so as to open and close the door 130.

A control panel 117 can be installed on the front panel 110. The control panel 117 can include an input unit 118 configured to receive control commands from a user, and a display 119 configured to output information, such as control commands selectable by the user. The control commands can include control commands for selecting a drying course configured to perform the drying cycle or selecting drying options. A control box (with reference to FIG. 14) configured to control the inner elements of the laundry treating apparatus so as to perform the control command input through the input unit 118 can be installed in the cabinet 100. The control box can be connected to the inner elements of the laundry treating apparatus, and can thus control the corresponding elements so as to perform the input control command.

The input unit 118 can include a power supply request unit configured to request supply of power of the laundry treating apparatus, a course input unit configured to allow a user to select a desired one out of a plurality of courses, and an execution request unit configured to request starting of the course selected by the user.

The display 119 can include at least one of a display panel configured to output text and graphics or a speaker configured to output a voice signal and sound.

In some implementations, the laundry treating apparatus can include a water storage tank 120 configured to separately store moisture generated during a process of drying the laundry. The water storage tank 120 can include a handle provided on one side of the front panel 110 so as to withdraw the water storage tank 120 to the outside therethrough. The water storage tank 120 can be provided to collect condensed water generated during the drying cycle. Therefore, the user can withdraw the water storage tank 120 from the cabinet 100, can remove the condensed water, and can then insert the water storage tank 120 again into the cabinet 100. Thereby, the laundry treating apparatus can be installed even in a place in which there is no drain.

The water storage tank 120 can be disposed above the door 130. Therefore, when the user withdraws the water storage tank 120 from the front panel 110, the user can bend his/her back relatively little and thus user convenience can be increased.

Figure 4:
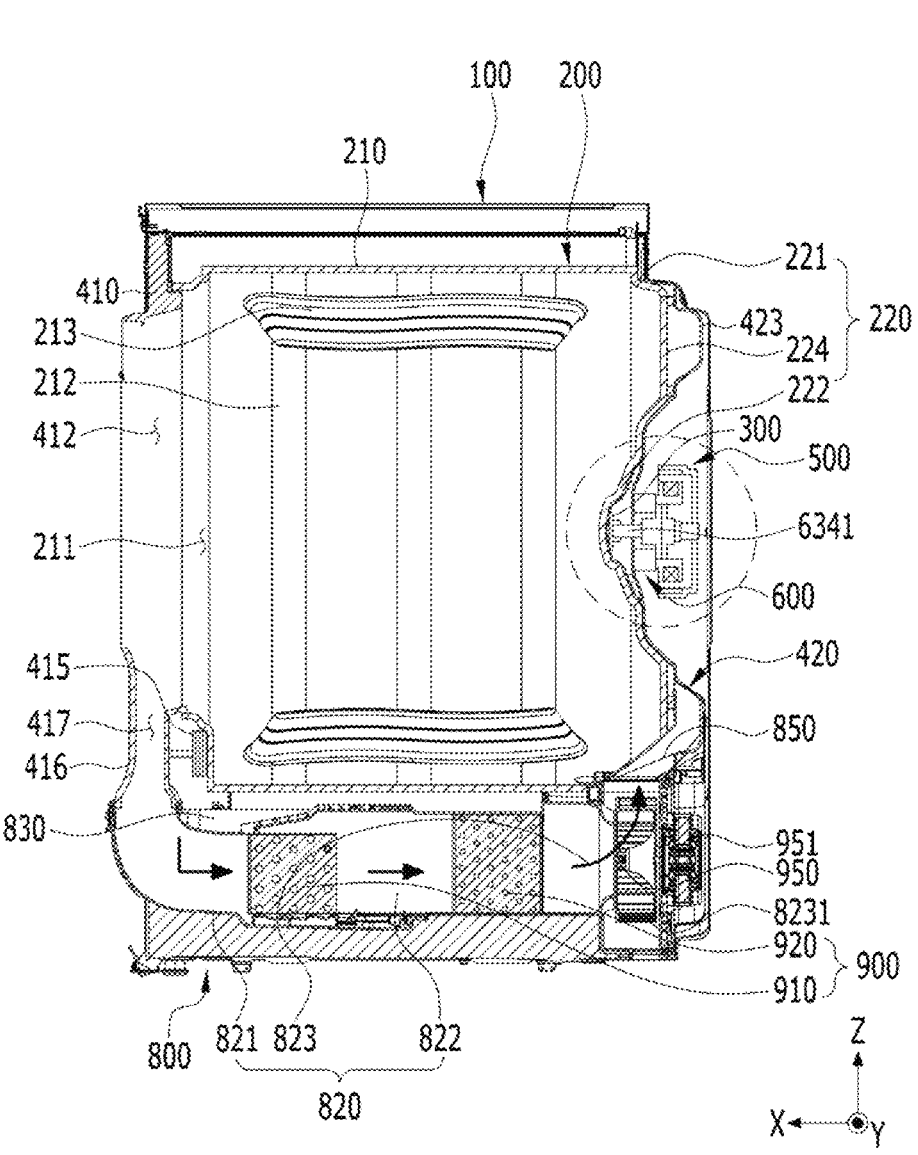
FIG. 4 is a cross-sectional view illustrating an example an inside of the laundry treating apparatus.

FIG. 4 schematically illustrates the inside of the laundry treating apparatus. The laundry treating apparatus can include a drum 200 provided in the cabinet 100 so as to accommodate laundry, a driving unit configured to rotate the drum 200, a heat exchange unit 900 provided to supply hot air to the drum 20, and a base 800 provided with a circulation flow path part 820 formed therein. The circulation flow path part 820 is provided to communicate with the drum 200. Air discharged from the drum 200 can be supplied to the circulation flow path part 820. Further, air discharged from the circulation flow path part 820 can be supplied again to the drum 200. The circulation flow path part 820 can refer to a structure that defines a circulation flow path. In some cases, the circulation flow path part 820 can refer to the circulation flow path.

The driving unit can include a motor 500 configured to provide power to rotate the drum 200. The driving unit can be directly connected to the drum 200 so as to rotate the drum 200. For example, the driving unit can be provided in a direct drive unit (DD) type. Therefore, the driving unit can directly rotate the drum 200 while omitting components, such as a belt, a pulley, etc., thus being capable of controlling the direction of rotation of the drum 200 or the rotational velocity of the drum 200.

The motor 500 can be rotated at a high RPM. For example, the motor 500 can be rotated at a much higher RPM than the RPM at which the drum 200 can be rotated in the state in which laundry is adhered to the inner wall of the drum 200.

However, when the drum 200 is continuously rotated in the state in which the laundry is adhered to the inner wall of the drum 200, portions of the laundry adhered to the inner wall of the drum 200 are not exposed to hot air, and thus, drying efficiency can be reduced.

When a rotor 520 is rotated at a low RPM in order to tumble or agitate the laundry in the drum 200 without being adhered to the inner wall of the drum 200, output or torque which can be generated by the driving unit is not properly used.

Therefore, the driving unit of the laundry treating apparatus can further include a reducer 600 configured to increase torque while reducing the RPM so as to utilize the maximum output of the motor 500.

Further, the driving unit can include a drum rotating shaft 6341 connected to the drum 200 so as to rotate the drum 200.

The drum 200 is provided in a cylindrical shape so as to accommodate laundry. Further, in contrast to a drum used in the washing cycle, in case of the drum 200 used only in the drying cycle, water may not be provided into the drum 200 and water in a condensed liquid state may not be discharged from the drum 200 to the outside of the drum 200. Therefore, through holes formed through the circumferential surface of the drum 200 can be omitted. That is, the drum 200 used only in the drying cycle can be formed in a different structure from the drum used also in the washing cycle.

The drum 200 can be formed in an integrated cylindrical shape, and can be configured such that a drum body 210 including a circumferential surface and a drum rear surface 220 forming the rear surface of the drum 200 are coupled to each other.

An inlet 211 through which laundry enters or exits the drum 200 can be provided in the front surface of the drum body 210. The driving unit configured to rotate the drum 200 can be connected to the drum rear surface 220. The drum body 210 and the drum rear surface 220 can be coupled to each other by fastening members, such as bolts, but the present disclosure is not limited thereto and the drum body 210 and the drum rear surface 220 can be coupled to each other using various methods as long as the drum body 210 and the drum rear surface 220 can be coupled to each other so as to be rotatable together therewith.

Lifts 213 configured to move laundry in the drum body 210 upwards so as to mingle the laundry depending on rotation of the drum 200 can be provided on the drum body 210. When the drum 200 is rotated, laundry accommodated in the drum 200 can be repeatedly lifted and dropped, and can thus evenly contact hot air. Therefore, drying efficiency can be increased, and a drying time can be shortened.

Reinforcing beads 212 can be formed on the circumferential surface of the drum body 210. The reinforcing beads 212 can be provided to be recessed from or protrude from the inner or outer circumferential surface of the drum 200. The reinforcing beads 212 can be provided in plural, and can be spaced apart from each other. The reinforcing beads 212 can be provided in a designated pattern on the inner or outer circumferential surface of the drum 200.

The reinforcing beads 212 can increase stiffness of the drum body 210. Therefore, even when a large amount of laundry is accommodated in the drum body 210 or sudden rotational power is transmitted to the drum body 210 through the driving unit, torsion of the drum body 210 can be prevented. Further, the reinforcing beads 212 can increase a distance between the inner circumferential surface of the drum body 210 and the laundry compared to the case in which the circumferential surface of the drum body 210 is flat, thereby allowing hot air supplied to the drum 200 to more effectively flow to a gap between the laundry and the drum 200. The reinforcing beads 212 can increase durability of the drum 200 and increase drying efficiency of the laundry treating apparatus.

In general, in a conventional DDT-type washer, a driving unit can be fixedly coupled to a tub configured to receive a drum, and the drum can be coupled to the driving unit so as to be supported by the tub. However, the laundry treating apparatus is provided so as to concentratedly perform the drying cycle, and thus omits a tub fixed to the cabinet 100 so as to accommodate the drum 200.

Therefore, the laundry treating apparatus can further include a support unit 400 provided to support or fix the drum 200 or the driving unit to the inside of the cabinet 100.

The support unit 400 can include a front plate 410 disposed in front of the drum 200, and a rear plate 420 disposed behind the drum 200. The front plate 410 and the rear plate 420 are provided in a plate shape, and can be disposed so as to face the front and rear ends of the drum 200. The distance between the front plate 410 and the rear plate 420 can be set to be equal to the length of the drum 200, or to be greater than the length of the drum 200. The front plate 410 and the rear plate 420 can be fixedly supported by the bottom surface of the cabinet 100 or the base 800.

The front plate 410 can be disposed between the front panel 110 defining the front surface of the cabinet 100 and the drum 200. Further, an inlet communication hole 412 configured to communicate with the inlet 211 can be provided in the front plate 410. Since the inlet communication hole 412 is provided in the front plate 410, the front surface of the drum 200 can be supported and laundry can be put into or withdrawn from the drum 200.

The front plate 410 can include a duct connector 416 provided under the inlet communication hole 412. The duct connector 416 can form the lower portion of the front plate 410.

The front plate 410 can include a duct communication hole 417 formed through the duct connector 416. The duct communication hole 417 can be provided in a hollow shape, and can guide air discharged from the inlet 211 of the drum 200 to a region under the drum 200. Further, the duct communication hole 417 can guide air discharged from the drum 200 to the circulation flow path part 820 located under the drum 200.

A filter can be installed in the duct communication hole 417 so as to filter out lint or foreign substances having a large particle size generated from laundry. The filter can filter air discharged from the drum 200, and can thus prevent accumulation of foreign substances in the laundry treating apparatus and disturbance of air circulation due to the accumulated foreign substances.

Since the inlet 211 is disposed at the front part of the laundry treating apparatus, the inlet can be installed on the rear plate 420 rather than the front plate 410. The driving unit can be mounted on the rear plate 420 so as to be supported thereby. Therefore, the driving unit can rotate the drum 200 in the state in which the position of the driving unit is stably fixed by the rear plate 420.

At least one of the front plate 410 or the rear plate 420 can be rotatably support the drum 200. At least one of the front plate 410 or the rear plate 420 can rotatably accommodate the front end or the rear end of the drum 200.

For example, the front part of the drum 200 can be rotatably supported by the front plate 410, and the rear part of the drum 200 can be spaced apart from the rear plate 420 so as to be connected to the motor 500 mounted on the rear plate 420 and can thus be indirectly supported by the rear plate 420. Therefore, a contact or friction area between the drum 200 and the support unit 400 can be minimized, and generation of noise and vibration can be prevented.

Of course, the drum 200 can be provided to be rotatably supported by both the front plate 410 and the rear plate 420.

One or more support wheels 415 configured to support the front part of the drum 200 can be provided at the lower part of the front plate 410. The support wheels 415 can be rotatably provided on the rear surface of the front plate 410. The support wheels 415 can be rotated in the state in which the support wheels 415 come into contact with the lower surface of the drum 200.

When the drum 200 is rotated by the driving unit, the drum 200 can be supported by the drum rotating shaft 6341 connected to the rear surface of the drum 200. When laundry is accommodated in the drum 200, load applied to the drum rotating shaft 6341 can be increased due to the laundry. Therefore, the drum rotating shaft 6341 can be bent by the load.

When the support wheels 415 support the lower surface of the front part of the drum 20, the support wheels 415 can alleviate the load applied to the drum rotating shaft 6341. Therefore, the support wheels 415 can prevent the drum rotating shaft 6341 from being bent, and can prevent generation of noise due to vibration.

The support wheels 415 can be provided at positions symmetrical to each other with respect to the center of rotation of the drum 200 so as to support the load of the drum 200. The support wheels 415 can be provided at the lower parts of the left and right sides of the drum 200 so as to support the drum 200. However, the present disclosure is not limited thereto, and a larger number of support wheels 415 can be provided depending on the operating environment of the drum 200.

The circulation flow path part 820 provided on the base 800 can form a flow path along which air in the drum 200 is circulated and is then returned to the inside of the drum 200.

The circulation flow path part 820 can include an inflow duct 821 configured such that air discharged from the drum 200 flows thereinto, a discharge duct 823 configured to supply air to the drum 200, and a transfer duct 822 configured to connect the inflow duct 821 to the discharge duct 823. In some examples, the ducts 821-823 can refer to parts of the circulation flow path 820. In some examples, the laundry treating apparatus can include the ducts 821-823 that define the circulation flow path 820.

When air is discharged from the front part of the drum 200, the inflow duct 821 can be located at the front portion of the circulation flow path part 820. Further, the discharge duct 823 can be located at the rear portion of the circulation flow path part 820.

The discharge duct 823 can include an air blowing part 8231 configured to discharge air to the outside of the circulation flow path part 820. The air blowing part 8231 can be provided at the rear part of the discharge duct 823. Air discharged through the air blowing part 8231 can flow towards the drum 200.

A duct cover 830 can be coupled to the upper portion of the circulation flow path part 820 so as to shield a part of the opened upper surface of the circulation flow path part 820. The duct cover 830 can prevent air from leaking to the outside of the circulation flow path part 820. That is to say, the duct cover 830 can form one surface of the flow path in which air is circulated.

Further, the heat exchange unit 900 provided on the base 800 can include a first heat exchanger 910 provided inside the circulation flow path part 820 so as to cool air, and a second heat exchanger 920 provided inside the circulation flow path part 820 so as to heat the air cooled by the first heat exchanger 910.

The first heat exchanger 910 can dehumidify air discharged from the drum 20, and the second heat exchanger 920 can heat the dehumidified air. The heated air can be supplied again to the drum 200 so as to dry laundry accommodated in the drum 200.

The first heat exchanger 910 and the second heat exchanger 920 can be provided as heat exchangers in which a refrigerant flows. When the first heat exchanger 910 and the second heat exchanger 920 are provided as heat exchangers in which the refrigerant flows, the first heat exchanger 910 can be provided as an evaporator, and the second heat exchanger 920 can be provided as a condenser. The first heat exchanger 910 and the second heat exchanger 920 can be provided such that the refrigerant flowing along the first heat exchanger 910 and the second heat exchanger 920 exchanges heat with air discharged from the drum 200.

The heat exchange unit 900 can include a circulation flow path fan 950 installed in the circulation flow path part 820 so as to generate air flow in the circulation flow path part 820. Further, the heat exchange unit 900 can further include a circulation flow path fan motor 951 configured to rotate the circulation flow path fan 950. The circulation flow path fan 950 can be rotated by rotational power supplied from the circulation flow path fan motor 951. When the circulation flow path fan 950 is operated, air dehumidified by the first heat exchanger 910 and heated by the second heat exchanger 920 can flow towards the rear part of the drum 200.

The circulation flow path fan 950 can be installed in any one of the inflow duct 821, the transfer duct 822 and the discharge duct 823. The circulation flow path fan 950 is provided to be rotated and, thus, when the circulation flow path fan 950 is rotated, noise can be generated. Therefore, the circulation flow path fan 950 can be disposed at the rear portion of the circulation flow path part 820.

The circulation flow path fan 950 can be installed at the air blowing part 8231. Further, the circulation flow path fan motor 951 can be located behind the air blowing part 8231. When the circulation flow path fan 950 is rotated by the circulation flow path fan motor 951, air inside the circulation flow path part 820 can be discharged to the outside of the circulation flow path part 820 through the air blowing part 8231.

The inlet 211 of the drum 200 can be disposed at a relatively high position in order to allow a user to easily take laundry out of the drum 200, and thus, the circulation flow path part 820 and the heat exchange unit 900 can be disposed under the drum 200.

The rear plate 420 configured to guide air discharged from the circulation flow path part 820 to the drum 200 can be provided behind the drum 200. The rear plate 420 can be spaced apart from the drum rear surface 220. The circulation flow path part 820 can receive air from the inside of the drum 200 through the front plate 410, and can supply air to the drum 200 through the rear plate 420. Air discharged from the circulation flow path part 820 can pass through the rear plate 420 and can then be guided to the drum 200.

The base 800 can further include a connector 850 configured to guide air discharged from the circulation flow path part 820 to the rear plate 420. The connector 850 can uniformly disperse the air discharged from the circulation flow path part 820 throughout the rear plate 420.

The connector 850 can be installed at the air blowing part 8231. That is, the connector 850 can guide air discharged from the circulation flow path part 820 to the rear plate 420. Hot air supplied to the rear plate 420 can flow into the drum 200 through the drum rear surface 220.

The drum 200 of the laundry treating apparatus is not coupled to a belt or the like so as to be indirectly rotated, and can be directly connected to the driving unit located behind the drum 200 so as to be rotated. Therefore, in contrast to the drum of the conventional dryer provided as a cylindrical shape having open front and rear ends, the rear end of the drum 200 of the laundry treating apparatus can be closed so as to be directly connected to the driving unit.

As described above, the drum 200 can include the drum body 210 provided in a cylindrical shape so as to accommodate laundry and the drum rear surface 220 coupled to the rear end of the drum body 210 so as to form the rear surface of the drum 200.

The drum rear surface 220 can provide a coupling surface provided to close the rear part of the drum body 210 and directly coupled to the driving unit. That is, the drum rear surface 220 can be connected to the driving unit, and can rotate the entirety of the drum 200 by rotational power supplied from the driving unit. Accordingly, the inlet 211 configured to put laundry into the drum 200 therethrough can be formed through the front part of the drum body 210, and the rear part of the drum body 210 can be closed by the drum rear surface 220.

A bushing 300 configured to connect the driving unit to the drum rear surface 220 can be provided on the drum rear surface 220. The bushing 300 provided on the drum rear surface 220 can form the center of rotation of the drum 200. The bushing 300 can be provided integrally with the drum rear surface 220, or can be formed of a material having greater stiffness and durability than the drum rear surface 220 so as to be firmly coupled to the rotating shaft configured to transmit power. The bushing 300 can be seated on the drum rear surface 220 and be coupled to the drum rear surface 220 so as to form a concentric axis with the center of rotation of the drum rear surface 220.

The drum rear surface 220 can include a flange part 221 coupled to the outer circumferential surface of the drum body 210, and a mounting plate 222 provided inside the flange part 221 so as to be coupled to the driving unit. The bushing 300 can be placed on the mounting plate 222. The rotating shaft configured to rotate the drum 200 is coupled to the mounting plate 222 through the bushing 300, thus being capable of being more firmly coupled to the mounting plate 222. Further, the bushing 300 can prevent deformation of the drum rear surface 220.

The drum rear surface 220 can include intake holes 224 formed therethrough between the flange part 221 and the mounting plate 222 so that regions in front of and behind the drum rear surface 220 communicate with each other through the intake holes 224. Hot air supplied through the circulation flow path part 820 can flow into the drum body 210 through the intake holes 224. The intake holes 224 can be provided as a plurality of holes formed through the drum rear surface 220 or can be provided as a mesh-type net.

The driving unit configured to rotate the drum 200 can be located behind the rear plate 420. The driving unit can include the motor 500 configured to generate rotational power and the reducer 600 configured to reduce the rotational power of the motor 500 and to transmit the reduced power to the drum 200.

The motor 500 can be disposed behind the rear plate 420. Further, the motor 500 can be connected to the rear surface of the rear plate 420 through the reducer 600.

The reducer 600 can be fixed to the rear surface of the rear plate 420, and the motor 500 can be coupled to the rear surface of the reducer 600. That is, the rear plate 420 can provide a support plane configured to support the reducer 600 and the motor 500. However, the present disclosure is not limited thereto, and the motor 500 can be coupled to the rear plate 420.

Figure 5:
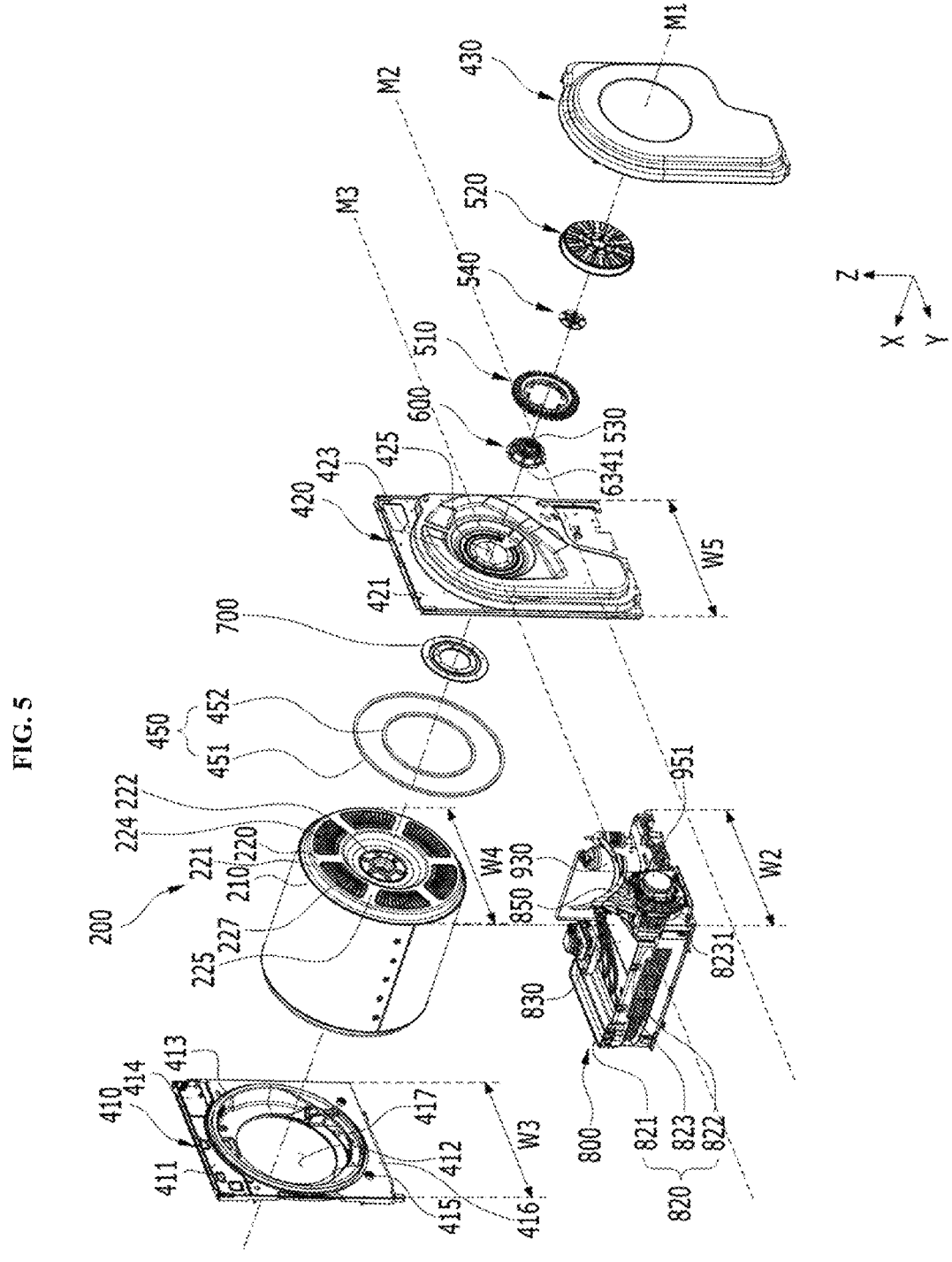
FIG. 5 is an exploded perspective view illustrating the laundry treating apparatus.

FIG. 5 is an exploded perspective view illustrating the inner elements of the laundry treating apparatus.

The laundry treating apparatus can include the drum 200 configured to accommodate laundry, the front plate 410 configured to support the front surface of the drum 200, the rear plate 420 located behind the drum 200, the base 800 provided under the drum 200 and configured to provide a space in which air in the drum 200 is circulated or moisture in the air is condensed, the motor 500 located behind the drum 200 so as to provide rotational power to the drum 200, the reducer 600 configured to reduce the rotational power of the motor 500 and to transmit the reduced rotational power to the drum 200, and a rear cover 430 coupled to the rear plate 420 so as to prevent the motor 500 from being exposed to the outside.

The base 800 can include the circulation flow path part 820 configured to communicate with the drum 200 so as to receive air supplied from the drum 200 or to discharge air to the drum 200.

The front plate 410 can include a front panel 411 that defines the front plate 410, and the inlet communication hole 412 formed through the front panel 411 so as to communicate with the drum 200. The front plate 410 can further include a front gasket 413 provided on the rear surface of the front panel 411 and configured to surround the radially outer surface of the inlet communication hole 412 so as to accommodate a part of the drum body 210.

The front gasket 413 can rotatably support the drum body 210, and can be provided to come into contact with the outer circumferential surface or the inner circumferential surface of the inlet 211. The front gasket 413 can prevent hot air in the drum 200 from leaking through a gap between the drum body 210 and the front plate 410. The front gasket 413 can be formed of plastic resins or an elastomer, and a separate sealing member can be additionally coupled to the front gasket 413 so as to prevent laundry or hot air from being released from the drum body 210 to the front plate 410.

The front plate 410 can include the duct communication hole 417 formed through the inner circumferential surface of the inlet communication hole 412. Further, the front plate 410 can include the duct connector 416 configured to extend from the lower part of the duct communication hole 417 so as to form a flow path through which the drum body 210 and the circulation flow path part 820 communicate with each other.

The duct connector 416 can communicate with the drum body 210 through the duct communication hole 417, and air discharged from the drum body 210 can flow into the duct connector 416 through the duct communication hole 417 and be guided to the circulation flow path part 820. The air discharged from the drum body 210 can be guided to the circulation flow path part 820 by the duct connector 416, and thus, leakage of air in the drum 200 to the outside can be prevented.

A filter member configured to filter out lint or foreign substances from air discharged from the drum 200 so as to prevent the foreign substances from entering the circulation flow path part 820 can be installed in the duct connector 416.

The support wheels 415 rotatably installed on the rear surface of the front panel 411 so as to support the lower part of the drum 200 can be installed on the front plate 410. The support wheels 415 can support the front part of the drum 20, thereby being capable of preventing the rotating shaft connected to the drum 200 from being bent.

A water storage tank support hole 414 provided to pass through the front panel 411 such that the water storage tank 120 (with reference to FIG. 3) configured to store condensed water produced during the drying cycle can be withdrawn therefrom or be supported thereby can be provided in the front plate 410. When the water storage tank support hole 414 is provided at the upper part of the front plate 410, the user does not need to bend his/her back so as to withdraw the water storage tank 120 and thus user convenience can be increased.

The drum 200 configured to accommodate laundry can include the drum body 210 provided with the inlet 211 formed through the front surface thereof so that laundry enters or exits the drum 200 therethrough, and the drum rear surface 220 that defines the rear surface of the drum 200.

The drum rear surface 220 can include the flange part 221 coupled to the drum body 210, the intake holes 224 formed through the drum rear surface 220 inside the flange part 221, and the mounting plate 222 provided at the center of rotation of the drum rear surface 220 so as to be coupled to the rotating shaft. Air can flow into the rear region of the inside of the drum 200 through the intake holes 224.

The drum rear surface 220 can further include reinforcing ribs 225 configured to extend from the flange part 221 to the center of rotation of the drum rear surface 220. The reinforcing ribs 225 can extend while avoiding the intake holes 224. The reinforcing ribs 225 can prevent reduction in stiffness of the drum rear surface 220 due to the intake holes 224. The reinforcing ribs 225 can be provided to radially extend from the outer circumferential surface of the mounting plate 222 towards the inner circumferential surface of the flange part 221.

In addition, the drum rear surface 220 can further include circumferential ribs 227 configured to extend in the circumferential direction of the drum rear surface 220 so as to connect the reinforcing ribs 225 to each other. The intake holes 224 can be disposed among the reinforcing ribs 225, the circumferential ribs 227 and the flange part 221. The reinforcing ribs 225 and the circumferential ribs 227 can prevent deformation of the drum rear surface 220 even when rotational power from the motor 500 is transmitted to the drum rear surface 220.

The inflow duct 821 can be provided to communicate with the duct communication hole 417 of the front plate 410 so as to communicate with the flow path formed in the front plate 410. The transfer duct 822 can be provided to extend from the end of the inflow duct 821 towards the rear part of the drum 200, and the discharge duct 823 can be provided at the end of the transfer duct 822 so as to guide air to the drum 200.

The air blowing part 8231 can be located at the downstream part of the discharge duct 823, and can provide a space in which the circulation flow path fan 950 is installed. When the circulation flow path fan 950 is operated, air flowing into the inflow duct 821 can be discharged upwards from the air blowing part 8231.

The heat exchange unit 900 configured to cool and heat air circulated from the drum 200 can be installed on the base 800. The heat exchange unit 900 can include a compressor 930 connected to the first heat exchanger 910 and the second heat exchanger 920 so as to supply a compressed refrigerant. The compressor 930 can be provided so as not to directly exchange heat with circulated heat, and can be located outside the circulation flow path part 820.

Further, the heat exchange unit 900 can include the circulation flow path fan motor 951 supported by the rear part of the air blowing part 8231 so as to rotate the circulation flow path fan 950. The circulation flow path fan motor 951 can be coupled to the rear part of the air blowing part 8231.

The laundry treating apparatus can further include the connector 850 coupled to the circulation flow path part 820 so as to guide hot air discharged from the circulation flow path part 820 to the rear part of the drum 200 or the rear plate 420.

The connector 850 is disposed above the discharge duct 823, and can thus guide hot air acquired through the second heat exchanger 920 to a region above the discharge duct 823. Further, the connector 850 can be coupled to an opening provided in the upper part of the air blowing part 8231.

The connector 850 can be provided to form a flow path therein. The connector 850 can be provided to guide the flow of air generated by the circulation flow path fan 950 uniformly to the rear plate 420. That is, the connector 850 can be provided such that the area of the flow path in the connector 850 increases as the distance from the air blowing part 8231 increases.

The rear plate 420 can be coupled to or supported by the base 800, and can be located behind the drum 200. The rear plate 420 can include a rear panel 421 located to face the front plate 410, and a duct 423 provided to be recessed from the rear panel 421 so as to form a flow path in which air is circulated and to guide air discharged from the circulation flow path part 820 to the drum 200.

The rear plate 420 can include a mounting part 425 configured such that the driving unit is coupled thereto or supported thereby. The mounting part 425 can be provided to pass through the rear panel 421, and can be disposed in the inner circumferential surface of the duct 423. The mounting part 425 can be provided to be spaced radially inwards apart from the inner circumferential surface of the duct 423.

Here, the driving unit can indicate an assembly of the reducer 600 and the motor 500, as described above. Otherwise, the driving unit can indicate only the motor 500. That is, an element configured to generate rotational power and to transmit the rotational power to the drum 200 can be referred to as the driving unit.

The driving unit can be mounted in the mounting part 425. The mounting part 425 can support the load of the driving unit. The driving unit can be connected to the drum 200 in the state in which the driving unit is supported by the mounting part 425.

The duct 423 can be provided to accommodate a part of the drum rear surface 220. The duct 423 can form a flow path along which air flows, together with the drum rear surface 220.

The driving unit can be installed in the mounting part 425 so as to prevent interference with the duct 423. That is, the driving unit can be disposed to be spaced radially inwards apart from the inner circumferential surface of the duct 423. The driving unit can be installed in the mounting part 425 such that the rear part of the driving unit is exposed to the outside, thus being capable of being cooled by external air.

The driving unit can include the motor 500 configured to generate power to rotate the drum 200. The motor 500 can include a stator 510 configured to generate a rotating magnetic field, and the rotor 520 rotated by the stator 510.

The rotor 520 can be provided in an outer rotor type configured to accommodate the stator 510 and to be rotated along the circumference of the stator 510. Here, a drive shaft 530 can be coupled to the rotor 520 so as to pass through the stator 510 and the mounting part 425, and thus, the rotor 520 can be directly connected to the drum 200. In this case, the rotor 520 can directly transmit power to rotate the drum 200 to the drum 200.

The rotor 520 can be coupled to the drive shaft 530 through a washer 540. The washer 540 can perform a function of connecting the drive shaft 530 to the rotor 520. A contact area between the rotor 520 and the drive shaft 530 can be increased by the washer 540, and thus, rotation of the rotor 520 can be more effectively transmitted to the drum 200.

The reducer 600 can be provided to connect the motor 500 to the drum 200. The reducer 600 can convert power of the motor 500 so at to rotate the drum 200. The reducer 600 can be disposed between the motor 500 and the drum 200, can receive power from the motor 500, can convert the power, and can then transmit the converted power to the drum 200. The reducer 600 can be provided to increase the torque value of the rotor 520 while reducing the RPM of the rotor 520 and then to transmit the converted power to the drum 200.

Specifically, the reducer 600 can be coupled to the drive shaft 530 coupled to the rotor 520 and rotated together with the rotor 520. The reducer 600 can include a gear assembly engaged with the drive shaft 530 and rotated so as to increase the torque of the drive shaft 530 while converting the RPM of the drive shaft 530, and the gear assembly can be connected to the drum rotating shaft 6341 coupled to the drum 200 so as to rotate the drum 200. Therefore, when the drive shaft 530 is rotated, the drum rotating shaft 6341 can be rotated at a lower RPM than the RPM of the drive shaft 530 and a greater torque than the torque of the drive shaft 530.

The performance of the reducer 600 depends on whether or not the drive shaft 530 and the drum rotating shaft 6341 can remain coaxial with each other. That is, when the drive shaft 530 and the drum rotating shaft 6341 are misaligned with each other, coupling of components forming the gear assembly in the reducer 600 to at least one of the drive shaft 530 and the drum rotating shaft 6341 can be loosened or released. Therefore, the power of the drive shaft 530 may not be properly transmitted to the drum rotating shaft 6341, or the drive shaft 530 can be rotated idle.

Further, when the drive shaft 530 and the drum rotating shaft 6341 are even temporarily misaligned with each other, gears in the reducers 600 can be dislocated and can thus collide with each other, and thus, vibration or noise can be caused.

Further, when the misalignment angle between the drive shaft 530 and the drum rotating shaft 6341 is severe even temporarily, the reducer 600 can completely deviate from the original position thereof, or can be damaged.

In order to prevent such problems, laundry treating apparatuses including a reducer can be generally configured such that the reducer and a motor are fixed to a support which can maintain the original state thereof without being deformed even when external force is applied thereto.

For example, in a washer, a tub configured to accommodate a drum can be primarily fixed to a cabinet, and a motor and a reducer can be secondarily fixed to a bearing housing produced as a rigid body embedded in the tub through injection molding. Thereby, even when the tub generates considerable vibration, the reducer and the motor, i.e., a driving unit, can be tilted or vibrated together with the bearing housing or a fixed steel plate. Consequently, the coupling state between the reducer and the driving unit can be maintained, and the coaxial state between a drive shaft and a rotating shaft can be maintained.

However, the laundry treating apparatus is provided as a dryer, and thus, a tub fixed to the cabinet 100 is omitted. Further, the rear panel 421 of the cabinet 100 is provided as a relatively thin plate, and thus, although the stator 510 is fixed, the rear panel 421 can be easily vibrated or bent due to repulsive power when the rotor 520 is rotated. When the rear panel 421 is vibrated or bent even temporarily, the centers of rotation of the reducer 600 and the motor 500, which are coupled to the drum 200, are misaligned with each other.

Further, the rear panel 421 is provided as a thin steel plate, and thus, it can be difficult for the rear panel 421 to support both the reducer 600 and the motor 500. For example, in the case in which the reducer 600 and the motor 500 are coupled to the rear panel 421 in parallel to each other, moment of inertia can occur due to the overall length of the reducer 600 and the motor 500 and gravity, and thus, the reducer 600 can sag. Accordingly, the drum rotating shaft 6341 of the drum 200 deviates from the original position thereof due to the reducer 600, and can thus not remain coaxial with the drive shaft 530.

The motor 500 can be supported by coupling the stator 510 to the rear plate 420. When a large amount of laundry is accommodated in the drum 200 or the laundry in the drum 200 is unbalanced, the drum rotating shaft 6341 can deviate from the original position thereof depending on the disposition of the laundry whenever the drum 200 is rotated. Here, since the stator 510 is separated from the drum 200 and is fixed to the rear plate 420, the drive shaft 530 can be vibrated at a different amplitude from the stator 510 or be tilted at a different angle from the stator 510. Therefore, the drum rotating shaft 6341 and the drive shaft 530 may not remain coaxial with each other.

From another point of view, the position of the drum 200 supported by the front plate 410 and the rear plate 420 can be fixed to a certain degree. Therefore, the position of the drum rotating shaft 6341 coupled to the drum 200 can be fixed to a certain degree. Accordingly, even when the drum 200 is vibrated, vibration of the drum 200 can be attenuated by at least one of the front plate 410 or the rear plate 420.

However, in the case in which vibration of the drum 200 is transmitted to the motor 500, although the reducer 600 and the motor 500 are fixed to the rear plate 420, the vibration amplitude of the motor 500 and the rear plate 420 can be greater than the vibration amplitude of the drum rotating shaft 6341. Here, the drum rotating shaft 6341 and the drive shaft 530 may not remain coaxial with each other also.

In order to solve the above problems, in the laundry treating apparatus, the motor 500 can be coupled to the reducer 600 so as to be fixed. That is to say, the reducer 600 can serve as a control point of the entirety of the driving unit. That is, the reducer 600 can serve as a reference to determine the vibration and the tilt angle amount of the driving unit.

Since the motor 500 is fixed only to the reducer 600 without being fixed to other elements of the laundry treating apparatus, when vibration or external force is transmitted to the driving unit, the motor 500 can be tilted or vibrated together with tilting or vibration of the reducer 600.

Accordingly, the reducer 600 and the motor 500 can form one vibration system, and the reducer 600 and the motor 500 can remain fixed to each other without moving relative to each other.

The stator 510 of the motor 500 can be directly coupled to the reducer 600 so as to be fixed. Therefore, the installed position of the drive shaft 530 may not be varied with respect to the reducer 600. The drive shaft 530 and the reducer 600 can be disposed such that the center of the drive shaft 530 and the center of the reducer 600 coincide with each other, and the drive shaft 530 can be rotated in the state in which the drum rotating shaft 6341 and the drive shaft 530 remain coaxial with each other.

A first axis M1 can indicate a virtual line extending in the forward and rearward directions along the center of rotation of the drum 200. That is, the first axis X can be provided parallel to the X-axis.

A second axis M2 and a third axis M3 can indicate virtual lines extending from the front part of the laundry treating apparatus to the upper region of the rear part of the laundry treating apparatus. That is, the second axis M2 and the third axis M3 can be provided parallel to the XZ plane, or can be provided orthogonal to the Y-axis.

The first axis M1 and the second axis M2 can cross each other in the reducer 600. Further, the first axis M1 and the third axis M3 can cross each other in the mounting part 425.

The reducer 600 and the motor 500 can be designed to be disposed along the first axis M1 parallel to the ground when there is no load in the drum 200 or the motor 500 is not operated.

However, when the drum 200 or the motor 500 is vibrated, vibration of the drum 200 or the motor 500 is transmitted to the reducer 600 and thus the reducer 600 is tilted, and thereby, the reducer 600 can be temporarily tilted along the second axis M2.

Here, the motor 500 is coupled to the reducer 600, and can thus be vibrated or tilted together with the reducer 600. Therefore, the motor 500 can be disposed parallel to the reducer 600 on the second axis M2. Accordingly, the drum rotating shaft 6341 and the drive shaft 530 can be disposed in parallel along the second axis M2.

Consequently, even when the reducer 600 is tilted, the motor 500 can be moved integrally with the reducer 600 and the drive shaft 530 and the drum rotating shaft 6341 can remain coaxial with each other.

The reducer 600 can be coupled to the rear plate 420 so as to be fixed. Since the reducer 600 is tilted or vibrated in the state in which the reducer 600 is coupled to the rear plate 420, it can be considered that the rear plate 420 serves as the center of the vibration system including the reducer 600, the motor 500 and the drum 200. In this case, the motor 500 is not directly coupled to the rear plate 420, and can be coupled to only the reducer 600 so as to be fixed.

The reducer 600, the motor 50 and the drum 200 are disposed in parallel along the first axis M1, and then, the reducer 600 can be tilted parallel to the third axis M3 due to vibration of the drum 200 or the motor 500. The third axis M3 can pass through the reducer 600 coupled to the rear plate 420. Here, since the reducer 600 and the motor 500 are coupled to each other, the motor 500 can be tilted parallel to the third axis M3 in the same manner as the reducer 600.

Accordingly, the motor 500 and the drum 200 are coupled to the reducer 600, and thus, the motor 500 and the drum 200 can be tilted parallel to the reducer 600 or vibrated simultaneously with the reducer 600.

The above-described term "coaxial" or "coinciding" may not mean that two elements are physically perfectly coaxial with each other or coincide with each other, but conceptually means that the elements are within a mechanically allowable error range or are within a range recognized as in a coaxial state or a coinciding state by those skilled in the art. For example, the state in which the drive shaft 530 and the drum rotating shaft 6341 are misaligned within 5 degrees can be defined as the coaxial state or the coinciding state. However, such an angle value is only one example, and an error allowed by design can be changed.

Since the drive shaft 530 is rotated relative to the reducer 600 but is fixed so as not to be tilted and the stator 510 is also fixed to the reducer 600, the distance between the stator 510 and the rotor 520 can be maintained. Accordingly, collision between the stator 510 and the rotor 520 can be prevented, and noise or vibration caused by change in the center of rotation of the rotor 520 around the stator 510 can be fundamentally blocked.

The drum rotating shaft 6341 can be provided to extend towards the drum 200 within the reducer 600, and can be vibrated and tilted together with the reducer 600. That is, the drum rotating shaft 6341 can be provided to be rotated in the reducer 600, but the installed position of the drum rotating shaft 6341 can be fixed. Accordingly, the drum rotating shaft 6341 and the drive shaft 530 can be disposed parallel to each other, and can thus form a concentric axis. That is to say, the drum rotating shaft 6341 and the drive shaft 530 can maintain the state in which the center of the drum rotating shaft 6341 and the center of the drive shaft 530 coincide with each other.

A sealing unit 450 can be provided between the drum rear surface 220 and the rear plate 420. The sealing unit 450 can seal a gap between the drum rear surface 220 and the rear plate 420 so that air flowing into the duct 423 of the rear plate 420 flows into the intake holes 224 without leaking to the outside.

The sealing unit 450 can be disposed on the outer surface and the inner surface of the duct 423. A first sealing member 451 can be provided outside the duct 423 in the radial direction, and a second sealing member 452 can be provided inside the duct 423 in the radial direction. The first sealing member 451 can prevent hot air between the drum rear surface 220 and the duct 423 from leaking radially outwards, and the second sealing member 452 can prevent hot air between the drum rear surface 220 and the duct 423 from leaking radially inwards.

That is to say, the sealing unit 450 can be disposed outside and inside of the intake holes 224 in the radial direction. The first sealing member 451 can be provided outside the intake holes 224 in the radial direction, and the second sealing member 452 can be provided inside the intake holes 224 in the radial direction.

In order to prevent hot air from leaking, the sealing unit 450 can be provided to come into contact with both the drum rear surface 220 and the rear plate 420. The drum 200 is rotated during the operating process of the laundry treating apparatus, and thus, the drum rear surface 220 continuously applies friction to the sealing unit 450. Therefore, the sealing unit 450 can be formed of a material which can seal the gap between the drum rear surface 220 and the duct 423 without performance degradation even by frictional force or frictional heat generated due to rotation.

Since the motor 500 or the reducer 600 can be coupled to the rear surface of the rear plate 420 and the rear plate 420 can be formed of a thin steel plate, the rear plate 420 can be bent or deformed by load of the reducer 600 or load transmitted to the reducer 600 by the drum 200. That is, in order to install the reducer 600 and the motor 500 on the rear plate 420, the rear plate 420 needs to secure stiffness.

For this purpose, the rear plate 420 can further include a bracket 700 configured to increase stiffness of the rear plate 420. The bracket 700 can be additionally coupled to the rear plate 420, and the reducer 600 and the motor 500 can be coupled to the rear plate 420 by the bracket 700.

The reducer 600 can be simultaneously coupled to the bracket 700 and the rear plate 420. The reducer 600, the rear plate 420 and the bracket 700 can be simultaneously coupled to each other using fastening members passing therethrough. The rear plate 420 can secure stiffness by coupling the bracket 700 thereto. The reducer 600 and the motor 500 can be coupled to the rear plate 420 having secured stiffness.

The reducer 600 can be first coupled to the bracket 700, and then, the bracket 700 can be coupled to the rear plate 420. That is, the reducer 600 is not directly coupled to the rear plate 420, and can be fixed to the rear plate 420 through the bracket 700.

When the motor 500 or the reducer 600 is coupled to the rear surface of the rear plate 420, the motor 500 and the reducer 600 can be exposed to the outside. In some implementations, the motor 50, which is coupled to the rear surface of the rear plate 420, may not be exposed to the outside. Further, the duct 423 can be heated by hot air.

In some examples, the rear surface of the duct 423 can be isolated from heat. The rear cover 430 can be coupled to the rear surface of the rear plate 420 so as to prevent the duct 423 and the motor 500 or the reducer 600 from being exposed to the outside. The rear cover 430 can be spaced apart from the duct 423 and the driving unit.

The rear cover 430 can prevent the motor 500 from being damaged due to external interference or the duct 423 from generating heat loss, thereby being capable of preventing reduction in drying efficiency.

Figure 6A:
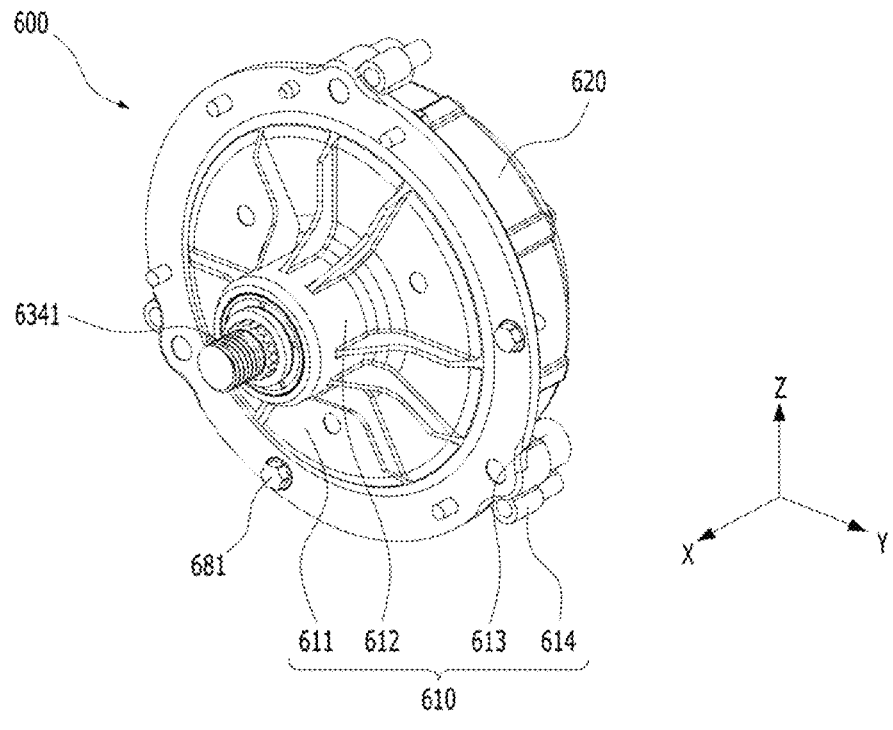
FIGS. 6A and 6B are perspective views illustrating an example of a reducer of the laundry treating apparatus.
Figure 6B:
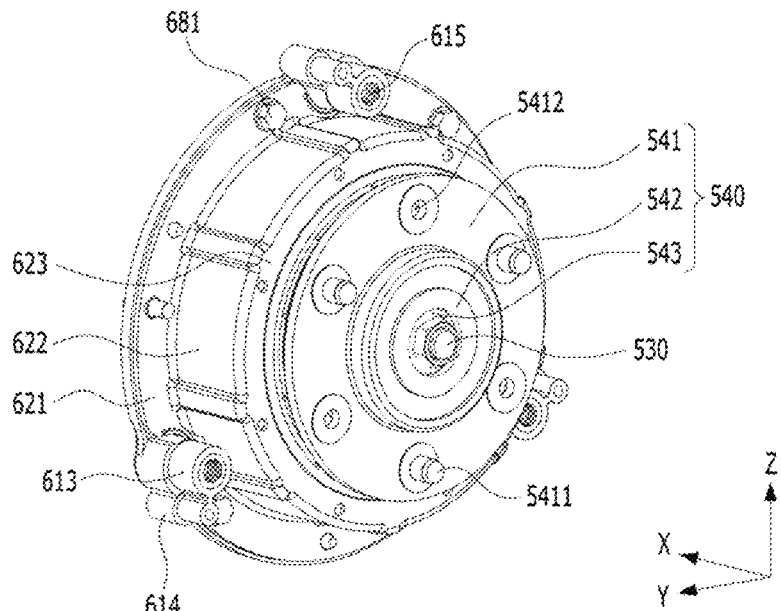

FIGS. 6A and 6B illustrate the external appearance of the reducer.

The reducer 600 can include a reducer housing unit that defines the external appearance of the reducer 600. The reducer housing unit can include a first housing 610 provided to face the drum, and a second housing 620 provided to face the motor.

The reducer 600 can include a gear box. The gear box can be provided to receive power transmitted from the motor, to increase the torque value of the motor while reducing the RPM of the motor, and then to transmit the converted power to the drum. A great part of the gear box can be accommodated in the second housing 620, and the first housing 610 can be provided to shield the inside of the reducer 600. Thereby, the total thickness of the reducer 600 can be reduced. A detailed description of the gear box will be given later.

The first housing 610 can include a first housing shield body 611 provided to shield the second housing 620, and a first housing shaft receiver 612 configured to extend from the first housing shield body 611 in a direction away from the second housing 620. The first housing shaft receiver 612 can accommodate the drum rotating shaft 6341, and can rotatably support the drum rotating shaft 6341.

The first housing 610 can include the stator couplers 613. The stator couplers 613 can be provided to extend from the circumferential surface of the first housing shield body 611 in a direction away from the first housing shaft receiver 612.

Each of the stator couplers 613 can include a stator fastening hole 615 to which the motor is fastened. The stator fastening hole 615 can be recessed from the stator coupler 613. A separate fastening member can be inserted into the stator fastening hole 615. The stator couplers 613 can be coupled to the motor using the fastening members.

The first housing 610 can further include coupling guides 614 configured to guide coupling of the motor to the first housing 610. The coupling guides 614 can be provided to extend from the circumferential surface of the first housing shield body 611 in the direction away from the first housing shaft receiver 612. The coupling guides 614 can extend from the first housing shield body 611 so as to be connected to the stator couplers 613. The coupling guides 614 can guide the position of the stator 510 when the stator 510 is coupled to the stator couplers 613. Thereby, assemblability can be improved.

Referring to FIGS. 6A and 6B, the second housing 620 can accommodate the gear assembly therein. In general, the gear box coupled to the reducer 600 can include a sun gear, planet gears rotated around the sun gear, and a ring gear configured to accommodate the planet gears so as to guide rotation of the planet gears. The second housing 620 can include a second housing coupling body 621 coupled to the first housing 610, a second housing shield body 622 configured to extend from the second housing coupling body 621 in a direction away from the first housing 610 and to form a space for accommodating the gear box, and a second housing shaft receiver 623 configured to extend from the inner circumferential surface of the second housing shield body 622 in the direction away from the first housing 610 so as to support the drive shaft 530.

The first housing 610 and the second housing 620 can be designed such that the center of the first housing 610 and the center of the second housing 620 are coaxial with each other. Coaxial location of the drive shaft 530 and the drum rotating shaft 6341 is favorable to power transmission. Therefore, the first housing shaft receiver 612 configured to rotatably support the drum rotating shaft 6341 and the second housing shaft receiver 623 configured to rotatably support the drive shaft 530 can be coaxially coupled to each other.

The drive shaft 530 can be inserted into the second housing 620 so as to be rotatably supported in the second housing 620. The washer 540 configured to rotatably support the rotor 520 can be coupled to the drive shaft 530. The washer 540 can include an accommodation body 542 provided with a shaft support hole 543 formed through the center thereof so as to accommodate the drive shaft 530, and a washer coupling body 541 configured to extend from the outer circumferential surface of the accommodation body 542 so as to form a plane to which the rotor 520 is coupled. The shaft support hole 543 can be provided to have a recess shape corresponding to the shape of a protrusion formed on the outer circumferential surface of the drive shaft 530.

The washer 540 can include one or more washer coupling protrusions 5411 provided to protrude from the washer coupling body 541 in a direction away from the reducer 600. Further, the washer 540 can include one or more washer coupling holes 5412 formed through the washer coupling body 541.

The washer coupling protrusions 5411 can be coupled to receiving recesses formed in the rotor 520. Fastening members passing through the rotor 520 can be inserted into the washer coupling holes 5412, and can thus be used to couple the rotor 520 and the washer 540.

The washer coupling protrusions 5411 and the washer coupling holes 5412 can be provided in plural so as to be alternately arranged on the surface of the washer coupling body 541 in the circumferential direction.

Figure 7:
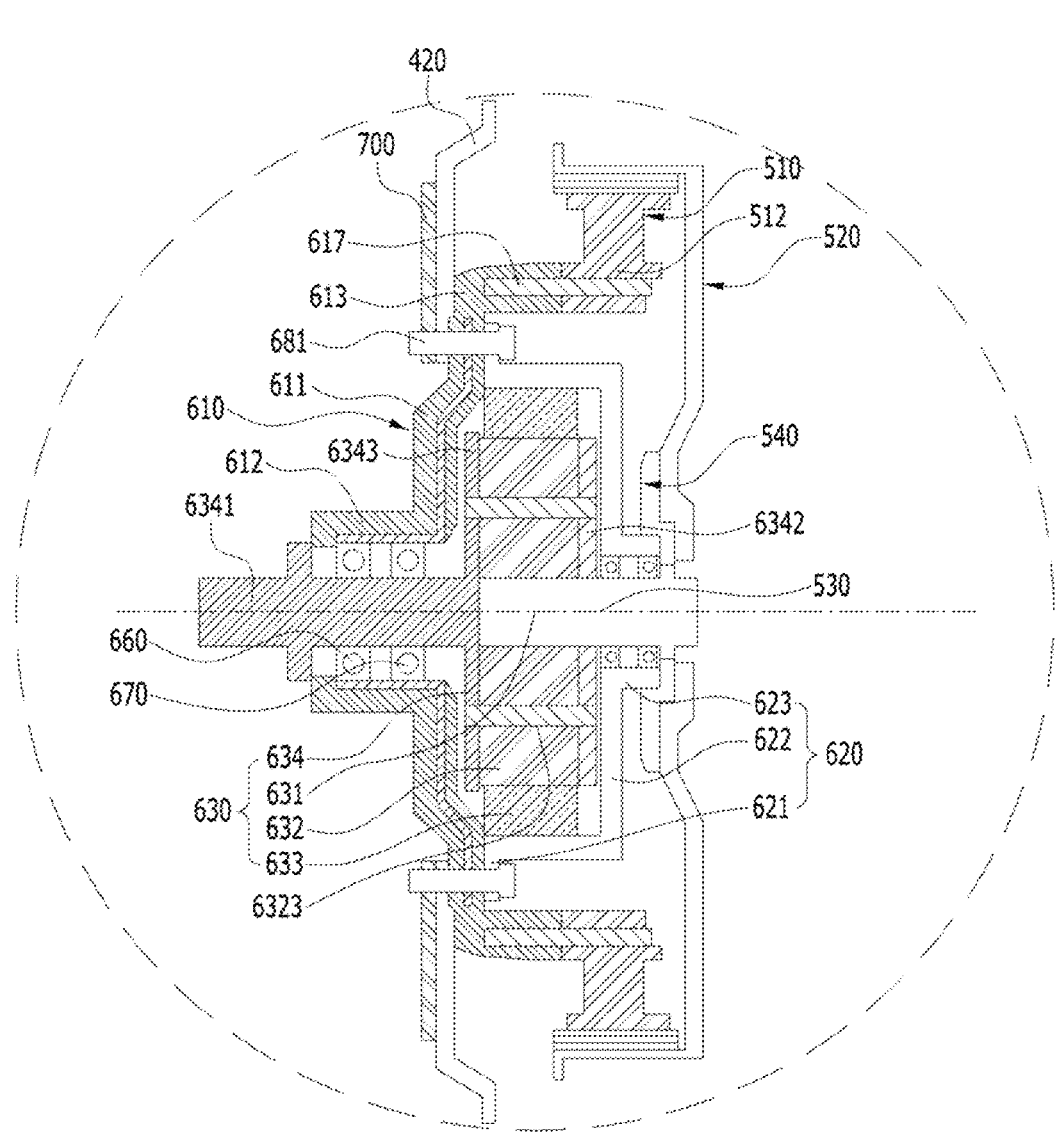
FIG. 7 is an enlarged cross-sectional view of a portion of FIG. 4 shown in a dotted line.

FIG. 7 is an enlarged cross-sectional view illustrating the driving unit, shown in brief in FIG. 4, in more detail.

The driving unit can include the motor 500 configured to generate rotational power and the reducer 600 configured to reduce the rotational velocity of the motor 500 and then to transmit the reduced rotational velocity to the drum 200. The reducer 600 can include the drum rotating shaft 6341 configured to rotate the drum 200.

The motor 500 can include the stator 510 configured to generate a rotating magnetic field by external power, and the rotor 520 provided to surround the outer circumferential surface of the stator 510. Permanent magnets can be arranged on the inner circumferential surface of the rotor 520.

The permanent magnets located on the inner circumferential surface of the rotor 520 can be moved in a specific direction by the rotating magnetic field generated by the stator 510, and the permanent magnets can be fixed to the inner circumferential surface of the rotor 520. Therefore, the rotor 520 can be rotated by the rotating magnetic field of the stator 510.

The drive shaft 530 rotated together with the rotor 520 so as to transmit the rotational power of the rotor 520 can be coupled to the center of rotation of the rotor 520. The drive shaft 530 can be provided to be rotated together with the rotor 520. The drive shaft 530 can be coupled to the rotor 520 through the washer 540.

Although the drive shaft 530 can be directly coupled to the rotor 520, the drive shaft 530 can be more firmly coupled to the rotor 520 through the washer 540 and thus, in this case, can more effectively transmit the rotational power of the rotor 520. Further, in this case, concentrated application of load to the drive shaft 530 can be prevented, and thus, durability of the drive shaft 530 can be increased.

The drive shaft 530 can be directly connected to the drum 200, and the drive shaft 530 can be rotated at the same velocity as the rotational velocity of the rotor 520, in some cases. In some examples, the rotational velocity of the drive shaft 530 can be reduced. For example, the drive shaft 530 can be connected to the reducer 600, and the reducer 600 can be connected to the drum 200. That is, the reducer 600 can reduce the rotational velocity of the drive shaft 530 so that the drum 200 is rotated at the reduced rotational velocity.

The reducer 600 can include the first housing 610 and the second housing 620 that define the external appearance of the reducer 600, and a gear box 630 configured to reduce the power of the drive shaft 530. The second housing 620 can provide a space for accommodating the gear box 630, and the first housing 610 can shield the space provided by the second housing 620.

The second housing 620 can include the second housing coupling body 621 coupled to the first housing 610, the second housing shield body 622 configured to extend rearwards from the inner circumferential surface of the second housing coupling body 621 so as to form the space for accommodating the gear box 630, and the second housing shaft receiver 623 configured to extend rearwards from the second housing shield body 622 so as to accommodate the drive shaft 530.

The gear box 630 can include a ring gear 633 installed along the inner circumferential surface of the second housing shield body 622. One or more planet gears 632 engaged with the ring gear 633 can be provided on the inner circumferential surface of the ring gear 633, and a sun gear 631 engaged with the planet gears 632 and rotated together with the drive shaft 530 can be provided inside the ring gear 633.

The sun gear 631 can be provided to be coupled to the drive shaft 530 so as to be rotated. The sun gear 631 can be provided as a member separately from the drive shaft 530, but the present disclosure is not limited thereto and the sun gear 631 can be formed integrally with the drive shaft 530.

The sun gear 631, the planet gears 632 and the ring gear 633 can be provided as helical gears. When the respective gears 631, 632, and 633 are provided as helical gears, noise can be reduced and power transmission efficiency can be increased. However, the present disclosure is not limited thereto, and the sun gear 631, the planet gears 632 and the ring gear 633 can be provided as spur gears.

As one example of operation of the gear box 630, when the drive shaft 530 and the sun gear 631 coupled to the drive shaft 530 are rotated as the rotor 520 is rotated, the planet gears 632 engaged with the outer circumferential surface of the sun gear 631 can be rotated through engagement between the ring gear 633 and the sun gear 631.

Each of the planet gears 632 can include a planet gear shaft 6323 inserted into the center of rotation of the planet gear 632. The planet gear shaft 6323 can rotatably support the planet gear 632.

The reducer 600 can further include a first carrier 6342 and a second carrier 6343 configured to support the planet gear shafts 6323 of the planet gears 632. The front parts of the planet gear shafts 6323 can be supported by the second carrier 6343, and the rear parts of the planet gear shafts 6323 can be supported by the first carrier 6342.

The drum rotating shaft 6341 can be provided to extend from the center of rotation of the second carrier 6343 in a direction away from the motor 500. The drum rotating shaft 6341 can be provided as an element separately from the second carrier 6343, and can be coupled to the second carrier 6343 so as to be rotated together therewith. In contrast, the drum rotating shaft 6341 can be formed integrally from the second carrier 6343 so as to extend from the second carrier 6343.

The drum rotating shaft 6341 can be coupled to the drum so as to rotate the drum. As described above, the drum rotating shaft 6341 can be coupled to the drum via a connector, such as the bushing, as described above, or can be directly coupled to the drum without a separate connector.

The drum rotating shaft 6341 can be supported by the first housing 610. The first housing 610 can include the first housing shield body 611 provided to shield the accommodating space of the second housing 620, and the first housing shaft receiver 612 configured to extend from the first housing shield body 611 in the direction away from the second housing 620 so as to accommodate the drum rotating shaft 6341. A first bearing 660 and a second bearing 670 can be provided on the inner circumferential surface of the first housing shaft receiver 612 by press fit, thus being capable of rotatably supporting the drum rotating shaft 6341.

The first housing 610 and the second housing 620 can be coupled to each other by reducer fastening members 681. Further, the reducer fastening members 681 can simultaneously pass through both the first housing 610 and the second housing 620 so as to couple the two housings 610 and 620 to each other. In addition, the reducer fastening members 681 can simultaneously pass through the first housing 610, the second housing 620 and the rear plate 420 so as to fix the reducer 600 to the rear plate 420 simultaneously with coupling of the first housing 610 and the second housing 620.

The rear plate 420 can be formed as a steel plate having a small thickness. Therefore, it can be difficult to secure stiffness of the rear plate 420 so as to support all of the reducer 600, the motor 500 coupled to the reducer 600, and the drum 200 connected to the reducer 600. Accordingly, in order to secure stiffness of the rear plate 420 when the reducer 600 is coupled to the rear plate 420, the bracket 700 can be used. The bracket 700 can be formed of a material having higher stiffness than the rear plate 420, and can be coupled to the front or rear surface of the rear plate 420.

The bracket 700 can be coupled to the front surface of the rear plate 420 so as to secure stiffness of the rear plate 420 to couple the reducer 600 to the rear plate 420, and the reducer 600 can be simultaneously coupled both to the rear plate 420 and the bracket 700. In order to couple the rear plate 420, the bracket 700 and the reducer 600, fastening members, such as bolts, can be used.

Further, in order to fix the reducer 600 to the rear plate 420, the reducer fastening members 681 used to couple the first housing 610 and the second housing 620 can be used. That is, the reducer fastening members 681 can pass through the second housing 620, the first housing 610, the rear plate 420 and the bracket 700 at once, thus being capable of coupling the same. In this case, the front surface of the rear plate 420 can be supported by the bracket 700 and the rear surface of the rear plate 420 can be supported by the first housing 610, and thus, the rear plate 420 can secure stiffness even when the reducer 600 is coupled thereto. However, the present disclosure is not limited thereto, and the first housing 610 and the second housing 620 can be first coupled using the reducer fastening members 681 and then the reducer 600 can be coupled to the rear plate 420 using separate fastening members.

Further, stator couplers 613 configured such that the motor 500 is coupled thereto can be provided at the radially outer part of the first housing 610. Each of the stator couplers 613 can include a coupling recess.

The stator 510 can be directly coupled to the rear plate 420, or can be coupled to the stator couplers 613. The stator 510 can include fixing ribs 512 provided on the inner circumferential surface of the stator 510 so as to support the stator 510. The fixing ribs 512 can be coupled to the stator couplers 613. The fixing ribs 512 and the stator couplers 613 can be coupled to each other by stator coupling pins 617.

The motor 500 is coupled to the reducer 600 while being spaced apart from the rear plate 420, and thus, the motor 500 and the reducer 600 can form one vibrator. Therefore, even when vibration is applied from the outside, the drive shaft 530 coupled to the rotor 520 and the drum rotating shaft 6341 connected to the reducer 600 can easily remain coaxial with each other.

The axial direction of the drum rotating shaft 6341 is in danger of deviating from the original direction thereof due to vibration of the drum 200. However, since the motor 500 is coupled to the first housing 610 configured to support the drum rotating shaft 6341, when the axial direction of the drum rotating shaft 6341 can deviate from the original direction thereof, the axial direction of the drive shaft 530 also deviates from the original direction thereof in a similar manner to the drum rotating shaft 6341. That is, the motor 500 is moved integrally with the reducer 600, and thus, the drum rotating shaft 6341 and the drive shaft 530 can remain coaxial with each other even when external force is applied from the outside.

The above-described coupling structure can increase efficiency and reliability in transmission of power generated by the motor 500 to the drum 200, and can prevent abrasion of the gear box 630, reduction in power transmission efficiency, and reduction in durability and reliability due to misalignment between the drum rotating shaft 6341 and the drive shaft 530.

Figure 8:
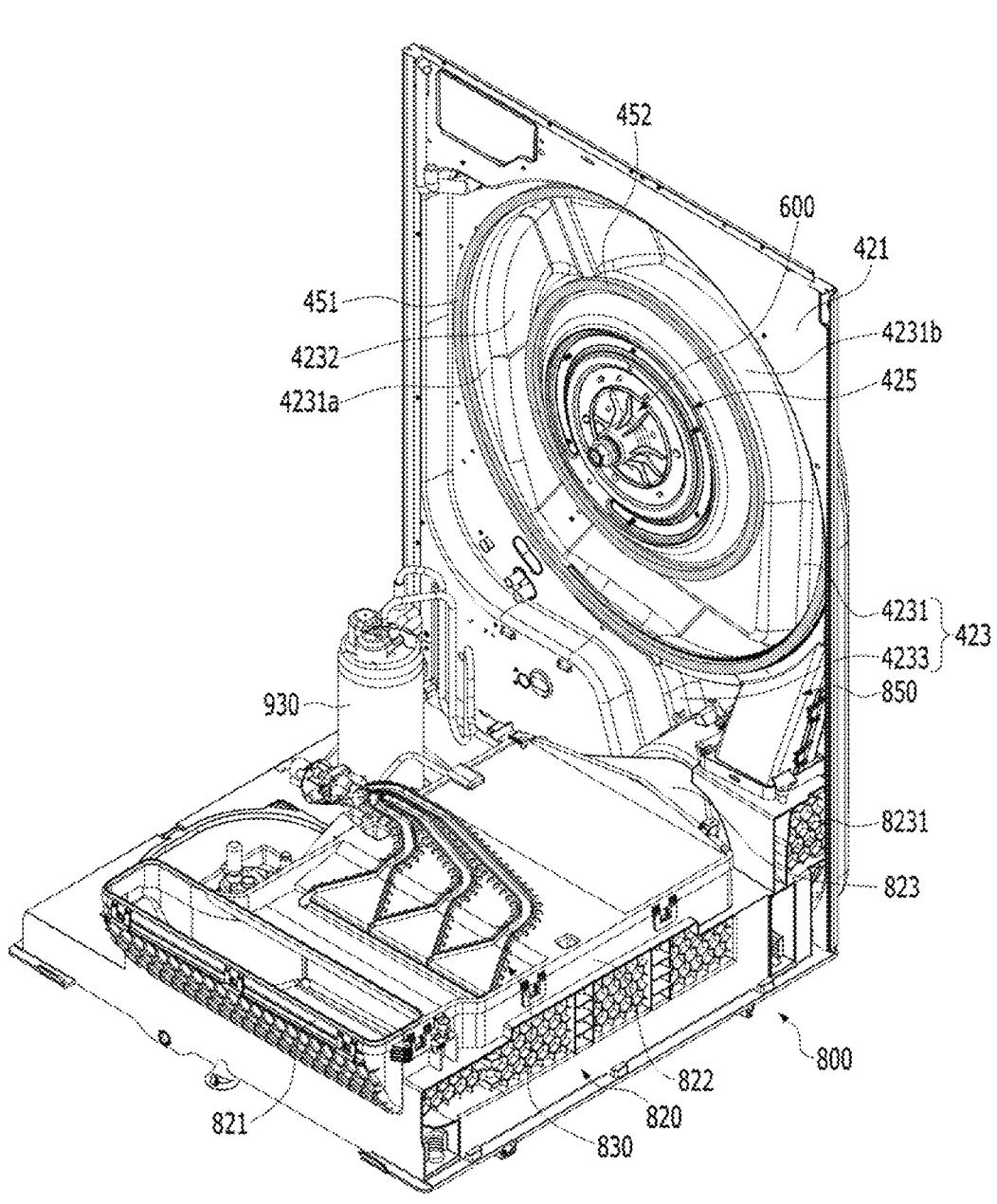
FIG. 8 is a front view illustrating an example of a coupling structure between a rear plate and a base of the laundry treating apparatus.

FIG. 8 illustrates the base and the rear plate.

Referring to FIG. 8, the rear plate 420 can be located behind the drum. The rear plate 420 can guide hot air discharged from the circulation flow path part 820 to the drum. That is, the rear plate 420 can be located behind the drum, and can form a flow path part so as to uniformly supply hot air to the entirety of the drum.

The rear plate 420 can include the rear panel 421 provided to face the drum rear surface, and the duct 423 recessed rearwards from the rear panel 421 so as to form the flow path. The duct 423 can be provided by pressurizing the rear panel 421 rearwards. The duct 423 can be provided to accommodate a part of the drum rear surface.

The duct 423 can include an inlet part 4233 located behind the circulation flow path part 820, and a flowing part 4231 located behind the drum. The flowing part 4231 can be provided to accommodate a part of the drum. The flowing part 4231 can accommodate the part of the drum, and can form a flow path provided behind the drum.

The flowing part 4231 can be provided in a ring shape so as to face the intake holes formed in the drum rear surface. The flowing part 4231 can be recessed from the rear panel 421. That is, the flowing part 4231 can be provided with an opened front surface, and the flowing part 4231 and the rear surface of the drum can form the flow path.

When the front surface of the flowing part 4231 is opened, hot air moved to the flowing part 4231 can be moved directly to the drum without passing through any separate elements. Therefore, heat loss caused when hot air passes through other elements can be prevented. That is, drying efficiency can be increased by reduction in heat loss of hot air.

The rear plate 420 can include the mounting part 425 provided inside the flowing part 4231 in the radial direction. The mounting part 425 can provide a space to which the reducer 600 or the motor 500 is coupled. That is, the rear plate 420 can include the mounting part 425 provided at the inner part thereof, and the flowing part 4231 provided in a ring shape outside the mounting part 425 in the radial direction.

Specifically, the flowing part 4231 can include an outer circumferential surface 4231a configured to surround an inner space in which hot air flows. Further, the flowing part 4231 can include an inner circumferential surface 4231b configured to surround the inner space in which hot air flows. That is, the outer circumferential surface 4231a can form the outer circumference of the flowing part 4231, and the inner circumferential surface 4231b can form the inner circumference of the flowing part 431.

Further, the flowing part 4231 can include a recessed surface 4232 that defines the rear surface of the flow path along which hot air moves. The recessed surface 4232 can be provided to connect the outer circumferential surface 4231a and the inner circumferential surface 4231b. That is, the outer circumferential surface 4231a, the inner circumferential surface 4231b and the recessed surface 4232 can form the space in which hot air discharged from the circulation flow path part flows.

Further, the recessed surface 4232 can prevent hot air from leaking rearwards, and can thus guide the hot air towards the drum. That is, the recessed surface 4232 can indicate the recessed surface of the flowing part 4231.

The inlet part 4233 can be located to face the circulation flow path part 820. The inlet part 4233 can be located to face the air blowing part 8231. The inlet part 4233 can be recessed rearwards from the rear panel 421 so as to prevent interference with the air blowing part 8231. The upper portion of the inlet part 4233 can be connected to the flowing part 4231.

The laundry treating apparatus can include the connector 850 connected to the air blowing part 8231. The connector 850 can guide hot air discharged from the air blowing part 8231 to the flowing part 4231. The connector 850 can form a flow path therein, and thereby, can guide hot air discharged from the air blowing part 8231 to the flowing part 4231. That is, the connector 850 can form the flow path for connecting the air blowing part 8231 to the flowing part 4231. The connector 850 can be provided such that the cross-sectional area of the flow path in the connector 850 increases as the distance from the air blowing part 8231 increases.

The connector 850 can be located to face the inlet part 4233. The inlet part 4233 can be recessed rearwards so as to prevent interference with the connector 850. Further, the upper end of the connector 850 can divide the flowing part 4231 and the inlet part 4233 from each other. That is, hot air discharged from the connector 850 can flow into the flowing part 4231, and inflow of the hot air into the inlet part 4233 can be prevented.

The connector 850 can be provided to uniformly supply hot air to the flowing part 4231. The connector 850 can be provided such that the width thereof increases as the distance from the air blowing part 8231 increases. The upper end of the connector 850 can be located along the extension line of the outer circumferential surface 4231*a* in the circumferential direction.

Therefore, hot air discharged from the connector 850 does not flow towards the inlet part 4233, and can be uniformly supplied to the flowing part 4231. The connector 850 prevents the hot air from being concentrated on one side of the flowing part 4231, thus being capable of uniformly supplying the hot air to the inside of the drum. Therefore, laundry drying efficiency can be increased.

The connector 850 can be provided such that the width thereof increases in the upstream direction, and thus, the velocity of hot air moving along the connector 850 can be decreased in the flow direction of the hot air. That is, the connector 850 can function as a diffuser configured to control the velocity of the hot air. The connector 850 can decrease the velocity of the hot air so as to prevent the hot air from being concentratedly supplied to a specific region.

Due to the above-described shape of the connector 850, the inlet part 4233 provided to face the connector 850 and to prevent interference with the connector 850 can be provided such that the width thereof increases as the distance from the air blowing part 8231 increases. The duct 423 can be generally shaped like the number 9, as seen from the front, due to the shape of the inlet part 4233.

Since the drum is provided to be rotated during the drying cycle, the drum can be spaced apart from the flowing part 4231 by a designated distance. Hot air can leak through such a space.

Therefore, the laundry treating apparatus can further include the sealing unit 450 configured to prevent hot air from leaking through the space between the drum and the flowing part 4231. The sealing unit 450 can be located along the circumference of the flowing part 4231.

The sealing unit 450 can include the first sealing member 451 provided along the outer circumference of the flowing part 4231. The first sealing member 451 can be provided between the drum and the outer circumference of the flowing part 4231. Further, the first sealing member 451 can be provided to come into contact with both the drum rear surface 220 and the rear plate 420 so as to more effectively prevent leakage of hot air.

The first sealing member 451 can be provided to come into contact with the front surface of the connector 850. Further, the first sealing member 451 can be provided to come into contact with the upper end of the connector 850. The connector 850 together with the flowing part 4231 can form the flow path in which hot air flows. Therefore, the first sealing member 451 can be provided to come into contact with the connector 850 so as to prevent hot air from leaking through a gap between the drum and the connector 850.

The sealing unit 450 can include the second sealing member 452 provided along the inner circumference of the flowing part 4231. The second sealing member 452 can be provided between the drum and the inner circumference of the flowing part 4231. Further, the second sealing member 452 can be provided to come into contact with both the drum rear surface 220 and the rear plate 420. The second sealing member 452 can prevent hot air flowing along the flowing part 4231 from leaking towards the mounting part 425.

The drum 200 is rotated during the operating process of the laundry treating apparatus, and thus, friction is continuously applied to the sealing unit 450 by the drum rear surface 220. Therefore, the sealing unit 450 can be formed of a material which can seal a gap between the drum rear surface 220 and the flowing part 4231 without performance degradation even by frictional force or frictional heat generated due to rotation.

Figure 9:
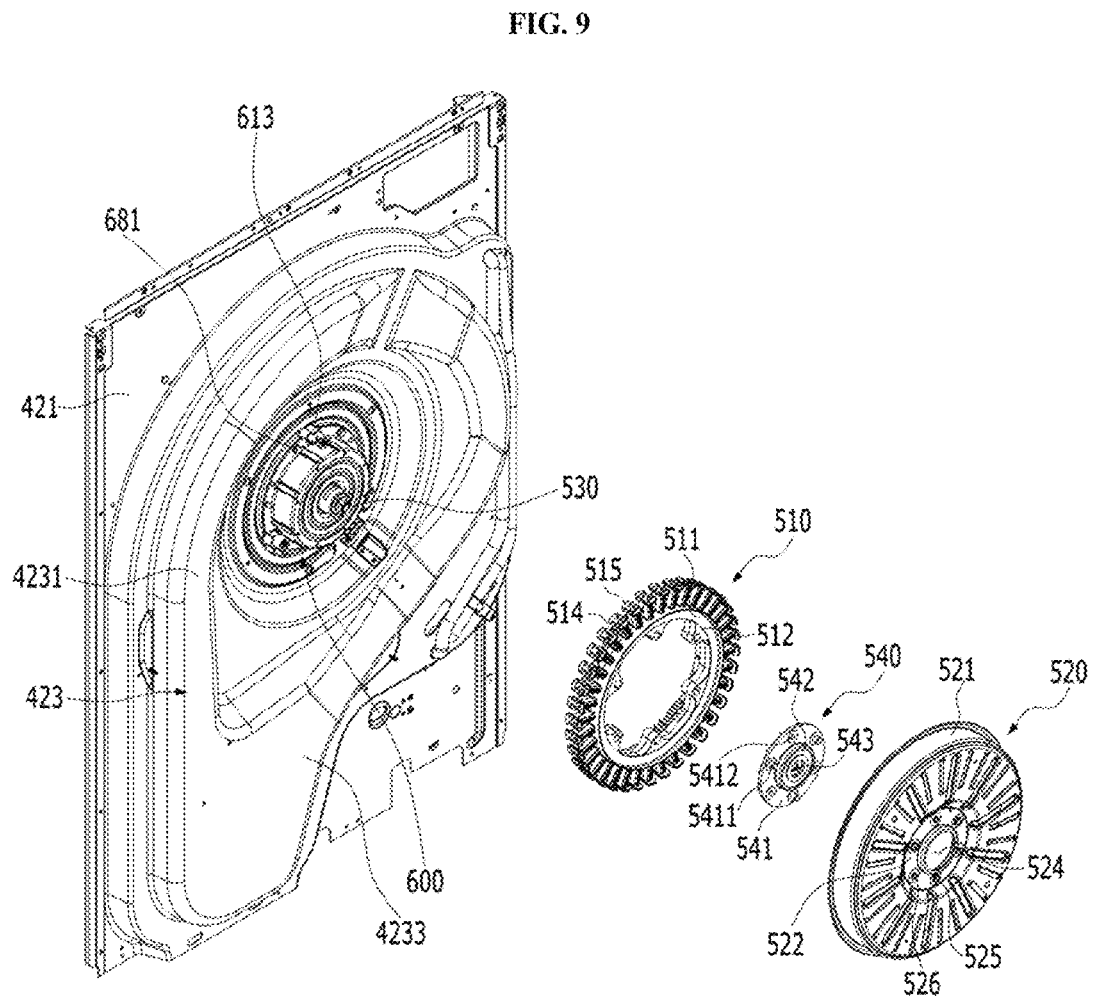

FIG. 9 illustrates a coupling structure between the rear plate, and the reducer and the motor.

Referring to FIG. 9, the reducer 600 can be supported by the rear plate 420, and the motor 500 can be coupled to the reducer 600. That is, the rear plate 420 can be provided to support both the reducer 600 and the motor 500.

The motor 500 configured to provide rotational power and the reducer 600 configured to reduce the power of the motor 500 and then to transmit the reduced power to the drum can be located behind the rear plate 420.

The reducer 600 can be installed on the rear plate 420 so as to be located inside the duct 423. The reducer 600 can be located inside the flowing part 4231 in the radial direction so as to prevent interference with the flowing part 4231.

The gear assembly in the reducer 600 can be damaged by heat of hot air moving along the flowing part 4231. Therefore, the flowing part 4231 and the reducer 600 can be provided to be spaced apart from each other by a designated distance.

The reducer 600 can be coupled to the rear plate 420 so as to pass through the rear plate 420. Therefore, the reducer 600 can be connected to the drum located in front of the rear plate 420.

The stator 510 can be coupled to the reducer 600. The stator 510 can be coupled to the reducer 600 so as to be spaced apart from the rear plate 420. Here, the reducer 600 can be located between the drum and the motor 500, and can support the drum and the motor 500 so as to be spaced apart from the rear plate 420. That is, the reducer 600 can become a center of support of the drum and the motor 500.

The stator 510 can include a main body 511 provided in a ring shape, the fixing ribs 512 configured to extend from the inner circumferential surface of the main body 511 and coupled to the stator couplers 613 of the reducer 600, teeth 514 configured to extend from the outer circumferential surface of the main body 511 along the circumference thereof and provided such that coils are wound on the teeth 514, and pole shoes 515 provided at the free ends of the teeth 514 so as to prevent the coils from being released from the teeth 514.

The rotor 520 can include a rotor body 521 provided in a hollow cylindrical shape. The rotor 520 can include an installation body 522 recessed forwards from the rear surface of the rotor body 521. The permanent magnets can be arranged along the inner circumferential surface of the rotor body 521.

The rotor 520 can be coupled to the drive shaft 530 so as to transmit the rotational power of the rotor 520 to the outside through the drive shaft 530. The drive shaft 530 can be connected to the rotor 520 through the washer 540.

Further, the motor 500 can include the washer 540 configured to support the drive shaft 530. The washer 540 can include the washer coupling body 541 coupled to the rotor 520. The washer coupling body 541 can be provided in a disk shape.

The washer 540 can include the accommodation body 542 accommodated in the rotor 520. The accommodation body 542 can be provided to protrude rearwards from the washer coupling body 541. The washer 540 can include the shaft support hole 543 formed through the center of the accommodation body 542. The drive shaft 530 can be inserted into the shaft support hole 543 so as to be supported by the washer 540.

Further, the washer 540 can include the washer coupling holes 5412 formed through the washer coupling body 541. Further, the installation body 522 can include rotor coupling holes 526 provided at positions thereof corresponding to the washer coupling holes 5412. That is, the washer 540 and the rotor 520 can be coupled to each other by coupling members simultaneously passing through both the washer coupling holes 5412 and the rotor coupling holes 526. The washer 540 and the rotor 520 can be coupled to each other to be rotated together therewith.

Further, the washer 540 can include the washer coupling protrusions 5411 protruding rearwards from the washer coupling body 541. Further, the installation body 522 can include washer protrusion accommodation holes 525 provided to correspond to the washer coupling protrusions 5411. The washer coupling protrusions 5411 can be inserted into the washer protrusion accommodation holes 525 so as to support coupling between the washer 540 and the rotor 520.

Further, the rotor 520 can include a rotor installation hole 524 formed through the center of the installation body 522. The rotor installation hole 524 can accommodate the accommodation body 542. Thereby, the washer 540 can be rotated together with the drive shaft 530 by the rotor 520, and can firmly support coupling between the drive shaft 530 and the rotor 520. Therefore, durability and reliability of the entirety of the motor 500 can be secured.

Figure 10:
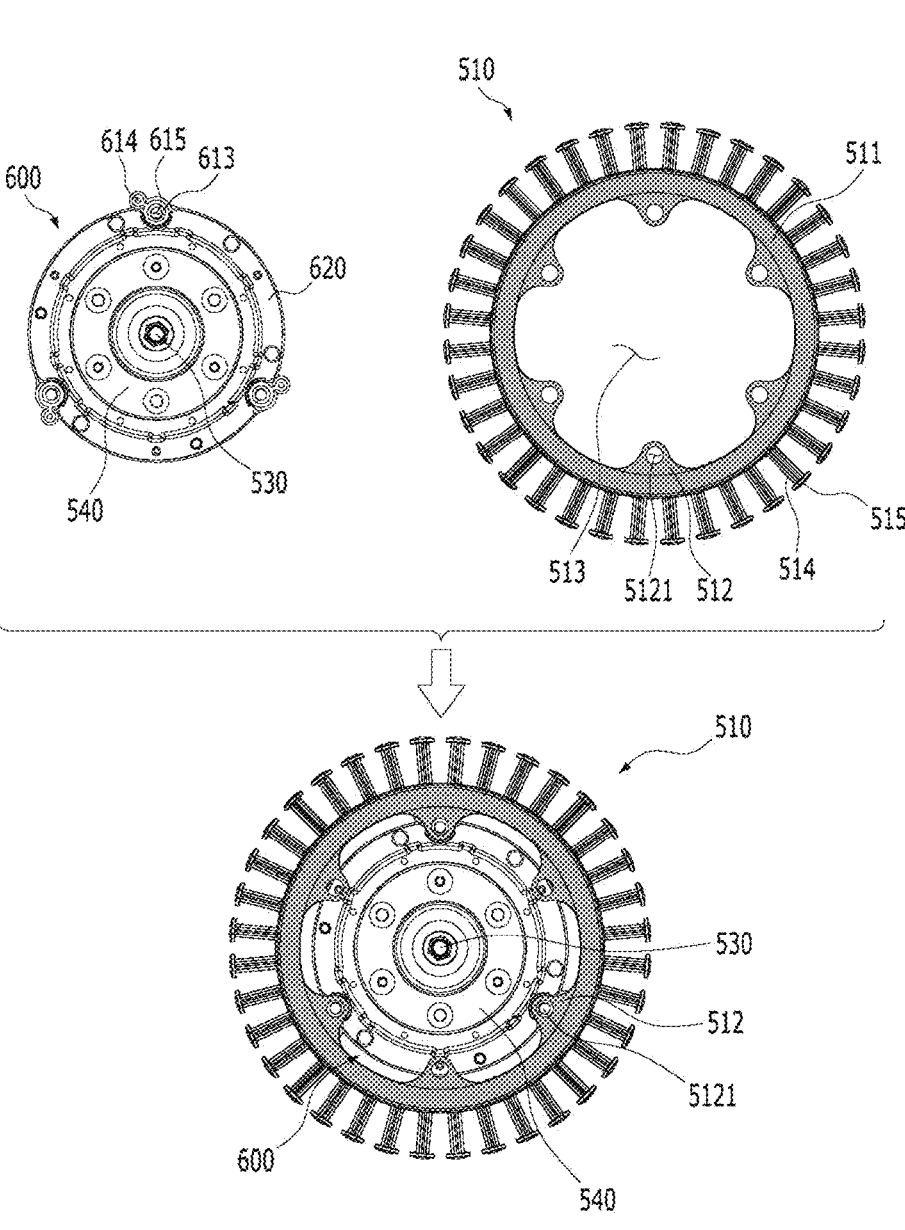
FIG. 10 is a view illustrating an example of a coupling structure between the reducer and a stator of the laundry treating apparatus.

FIG. 10 is a rear view illustrating a coupling structure between the reducer and the stator.

The stator 510 can include the main body 511 fixed to the reducer 600 and provided in a ring shape, the fixing ribs 512 configured to extend from the inner circumferential surface of the main body 511 and coupled to the stator coupling holes 615 of the reducer 600, the teeth 514 configured to extend from the outer circumferential surface of the main body 511 along the circumference thereof and provided such that the coils are wound on the teeth 514, the pole shoes 515 provided at the free ends of the teeth 514 so as to prevent the coils from being released from the teeth 514, and a terminal controlled to supply current to the coils.

The stator 510 can include an accommodation space 513 formed through the main body 511 and provided inside the main body 511. A plurality of fixing ribs 512 can be provided inside the main body 511 to be spaced apart from each other by a designated angle in the accommodation space 513, fixing rib holes 5121 can be provided in the fixing ribs 512 so that fixing members are installed in the fixing rib holes 5121, and thus, the fixing rib holes 5121 and the stator coupling holes 615 of the reducer 600 can be coupled using the fixing members, such as pins.

When the stator 510 is directly coupled to the reducer 600, a part of the reducer 600 can be accommodated in the stator 510. Particularly, when the reducer 600 is accommodated in the stator 510, the total thickness of the driving unit including the reducer 600 and the motor 500 can be reduced and thus the volume of the drum can be expanded.

For this purpose, the reducer 600 can have a smaller diameter than the diameter of the main body 511. That is, the maximum diameter out of the diameters of the first housing 610 and the second housing 620 can be smaller than the diameter of the main body 511. Thereby, at least a part of the reducer 600 can be accommodated in the main body 511. However, the stator couplers 613 can extend to overlap the fixing ribs 512 in the housing unit of the reducer 600. Thereby, the stator couplers 613 can be coupled to the fixing ribs 512, and a portion of the first housing 610 and the second housing 620 can be located in the main body 511.

Figure 11:
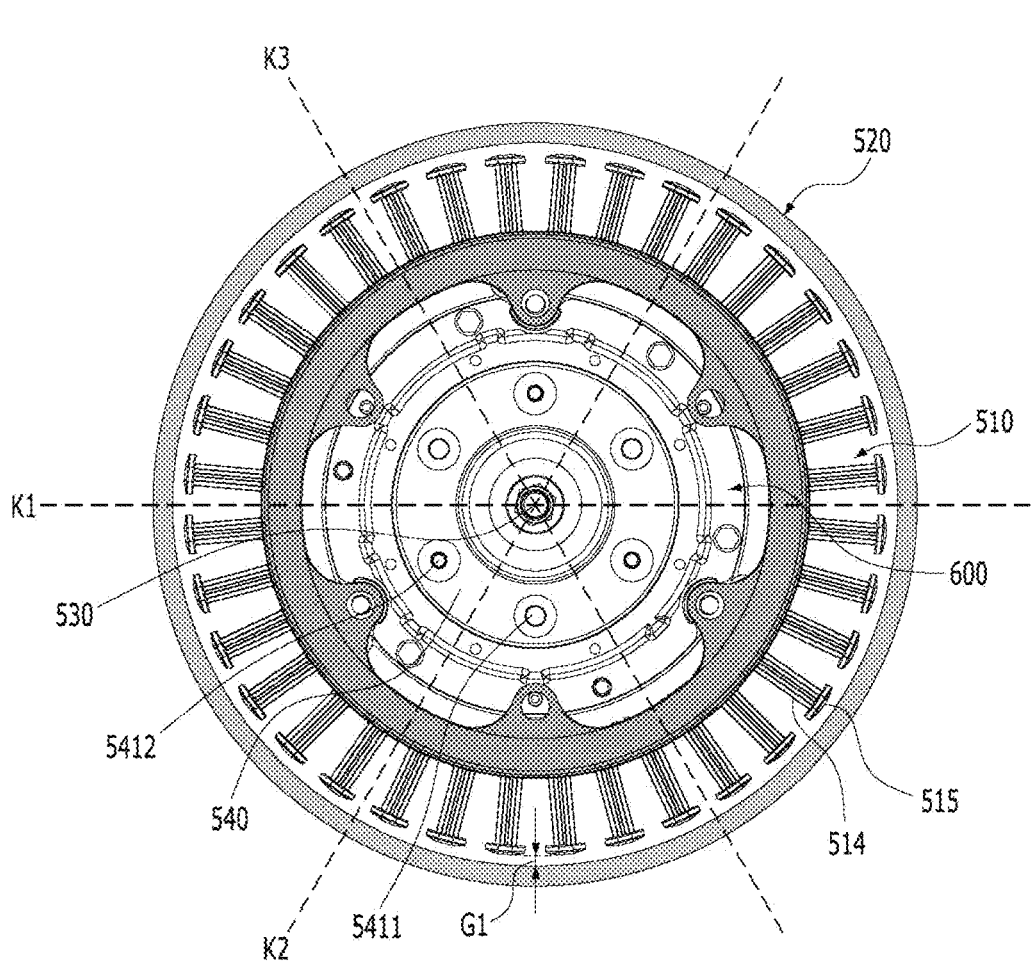
FIG. 11 is a plan view illustrating an example of a coupling structure between the reducer and the motor of the laundry treating apparatus.

FIG. 11 illustrates coupling between the reducer and the motor.

The stator 510 can be coupled to the reducer 600. At least a portion of the reducer 600 can be accommodated in the main body 511 by coupling the stator 510 to the stator couplers 613 protruding outwards from the housing unit of the reducer 600. Thereby, the center of the main body 511, the drive shaft 530 and the center of the reducer 600 can remain coaxial with one another.

The rotor 520 can be disposed so as to accommodate the stator 510 in the state in which the rotor 520 is spaced apart from the pole shoes 515 by a designated distance. Since the rotor 520 is fixed to the reducer 600 in which the drive shaft 530 is accommodated in the main body 511, a distance G1 between the rotor 520 and the stator 510 can be maintained.

Therefore, collision between the rotor 520 and the stator 510 or temporary torsional rotation of the rotor 520 on the stator 510 can be prevented, and thus, noise or vibration can be blocked.

A first virtual diameter line K1 passing through the center of the reducer 600 and the center of the drive shaft 530, a second virtual diameter line K2 passing through the center of the main body 511, and a third virtual diameter line K3 passing through the center of the rotor 520 can all be disposed at the center of rotation of the reducer 600.

Thereby, since the reducer 600 becomes the center of rotation of the drive shaft 530 and the stator 510 is directly fixed to the reducer 600, misalignment of the drive shaft 530 with the reducer 600 can be prevented. Accordingly, reliability of the reducer 600 can be secured.

Figure 12:
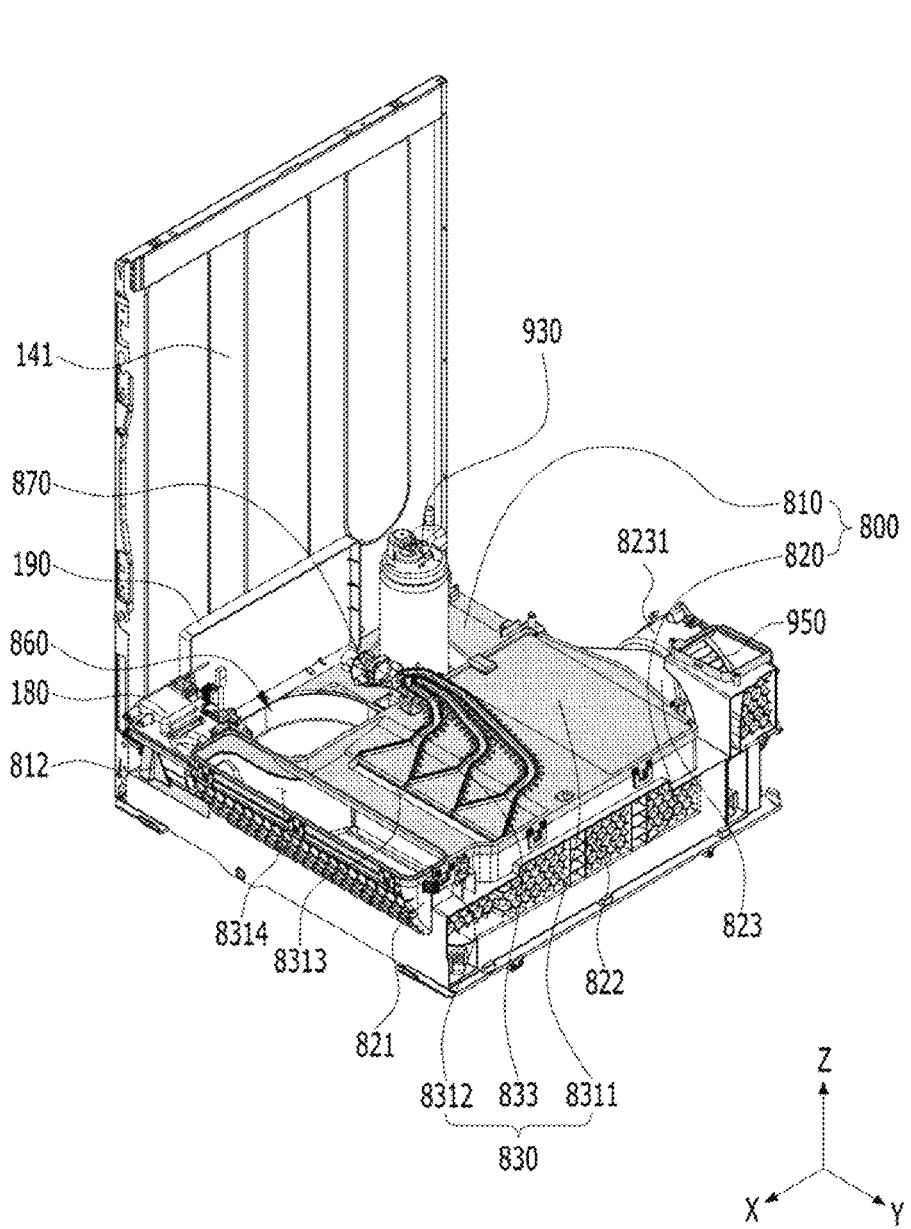
FIG. 12 is a perspective view illustrating an example of a base of the laundry treating apparatus.

FIG. 12 is a perspective view illustrating the base of the laundry treating apparatus.

Referring to FIG. 12, the base 800 can include the circulation flow path part 820 provided on one side of the base 800 so as to circulate air in the drum. Further, a device installation part 810 configured to provide a space that accommodates elements for operating the dryer can be provided on the other side of the base 800. The device installation part 810 can be provided outside the circulation flow path part 820.

In the case of the conventional dryer, the circulation flow path part 820 is provided on the base 800, and the driving unit configured to drive the drum 200 is also installed on the base 800. Since the driving unit occupies a majority part of the installation space on the base 800, the device installation part 810 formed in the space on the base 800 rather than the circulation flow path part 820 has a narrow space, and thus, it is not easy to install other elements of the laundry treating apparatus at the device installation part 810.

However, in the laundry treating apparatus, the motor 500 configured to rotate the drum 200 can be spaced apart from the base 800 and disposed behind the drum 200, and thus, the space on the base 800 in which the driving unit was conventionally installed can be used in various ways.

The compressor 930 configured to compress a refrigerant for heat exchange can be installed at the device installation part 810. Further, the base 800 can include a water collection part 860 provided to be spaced apart from the compressor 930 and configured to collect condensed water generated in the circulation flow path part 820. A control box 190 configured to control the compressor 930, the motor, etc. can be installed at the device installation part 810. The water collection part 860 can refer to a structure that defines a water collection space. In some cases, the water collection part 860 can refer to the water collection space.

The control box 190 can be installed on the base 800 so as to be firmly supported. Further, connection wires for connecting the control box 190 to the elements controlled by the control box 190 can also be firmly supported by the base 800.

As another example, the water collection part 860 may not be disposed between the compressor 930 and the circulation flow path part 820, and can be disposed to overlap the compressor 930 in the forward and rearward directions. The water collection part 860 is located in the space in which the motor was conventionally disposed, and thus, the volume of the water collection part 860 can be expanded. When the volume of the water collection part 860 is increased, the frequency of drainage of collected condensed water can be reduced and thus user convenience can be improved.

The side panels that define the side surfaces of the cabinet can be coupled to the side surfaces of the base 800. The side panels can include the left side panel 141 and the right side panel. The control box 190 can be installed at the device installation part 810 close to any one of the side panels.

The control box 190 can control the overall operation of the laundry treating apparatus. Therefore, the control box 190 can often be checked or repaired.

When the control box 190 is provided close to the left side panel 141, a user can approach the control box 190 only by removing the left side panel 141. Therefore, ease of maintenance can be increased.

When the left side panel 141 is removed, easy access to various elements, such as the compressor 930 and the control box 190, is possible, and thus, the left side panel 141 can be referred to as a service panel.

FIG. 12 illustrates the state in which the device installation part 810 is located at the left side of the base 800 and thus, when the left side panel 141 is removed, the user can approach the control box 190. However, the present disclosure is not limited thereto, and, in the case in which the circulation flow path part 820 is formed at the left side of the base 800 and the device installation part 810 is formed at the right side of the base 800, the control box 190 or compressor 930 can be repaired or checked by removing the right side panel.

The circulation flow path part 820 can further include the duct cover 830 located above the circulation flow path part 820 so as to form the flow path in which air discharged from the drum flows. The duct cover 830 can be coupled to the open upper surface of the circulation flow path part 820.

The upper surfaces of the inflow duct 821 and the transfer duct 822 are open, and thus, air can enter and exit the inflow duct 821 and the transfer duct 822 through the open upper surfaces thereof. The duct cover 830 can shield the open upper surface of the transfer duct 822. Therefore, the duct cover 830 can allow air of the drum to enter the inflow duct 821, and can prevent the air having entered the inflow duct 821 from leaking through the open upper surface of the transfer duct 822. That is, the duct cover 830 can form one surface of the flow path guiding the air having entered the inflow duct 821 to the discharge duct 823.

The discharge duct 823 can include the air blowing part 8231 configured to discharge air to the outside of the discharge duct 823. The air blowing part 8231 can discharge air having passed through the inflow duct 821 and the transfer duct 822 to the outside of the discharge duct 823.

The air blowing part 8231 can provide a space in which the circulation flow path fan 950 configured to circulate air in the drum is installed. The circulation flow path fan 950 can forcibly circulate air to increase the circulation rate of air, and can thus increase the drying rate of laundry and shorten a time taken to dry the laundry.

When the circulation flow path fan 950 is rotated, air can be discharged through the opening formed at the upper part of the air blowing part 8231. The air discharged from the air blowing part 8231 can again enter the drum so as to be used to dry laundry in the drum.

Various types of fans can be applied as the circulation flow path fan 950. For example, a sirocco fan can be applied so as to enable air to enter in the direction of a rotating shaft and then to discharge air in the radial direction. However, the present disclosure is not limited thereto, and various fans can be used to generate air flow depending on the purposes of design.

The duct cover 830 can include a communication cover body 8312 coupled to the upper part of the inflow duct 821, and a shield cover body 8311 coupled to the upper part of the transfer duct 822. The shield cover body 8311 can extend from the communication cover body 8312, and the shield cover body 8311 can be provided integrally with the communication cover body 8312.

The communication cover body 8312 can include an inflow communication hole 8314 configured such that the drum and the inflow duct 821 communicate with each other therethrough. The inflow communication hole 8314 can guide air discharged from the drum to the inflow duct 821 even when the communication cover body 8312 is coupled to the inflow duct 821.

Further, the shield cover body 8311 can shield the upper surface of the transfer duct 822, and thus, air having entered the inflow duct 821 can be guided to the discharge duct 823 without leaking to the outside of the circulation flow path part 820 through the transfer duct 822.

The shield cover body 8311 can include washing flow path parts 833 provided on the upper surface thereof such that water can flow along the washing flow path parts 833. The washing flow path parts 833 can receive water, and can spray water towards the first heat exchanger located under the duct cover 830.

A cover through hole 8313 vertically formed through the shield cover body 8311 can be provided at the downstream region of each of the washing flow path parts 833. Water moving along the washing flow path parts 833 can be sprayed under the shield cover body 8311 through the cover through hole 8313.

The first heat exchanger configured to dehumidify air discharged from the drum can be provided under the cover through hole 8313. Therefore, water having passed through the cover through hole 8313 can be sprayed towards the first heat exchanger so as to wash the first heat exchanger.

A nozzle cover can be coupled to the upper parts of the washing flow path parts 833. The nozzle cover can shield the open upper surfaces of the washing flow path parts 833. The nozzle cover can prevent air moving along the transfer duct 822 from leaking through the cover through hole 8313. Further, the nozzle cover can shield the upper surfaces of the washing flow path parts 833 so as to prevent water moving along the washing flow path parts 833 from scattering to the outside.

In contrast, the circulation flow path part 820 can further include a duct filter provided in front of the first heat exchanger and configured to filter out foreign substances from air having passed through the inflow duct 821. The duct filter can be disposed between the inflow duct 821 and the first heat exchanger so as to prevent foreign substances from being accumulated on the front surface of the first heat exchanger, and can thus improve drying efficiency and heat exchange efficiency of the first heat exchanger.

When foreign substances are accumulated on the duct filter, circulation of air passing through the inflow duct 821 and the transfer duct 822 can be disturbed. In order to solve such a problem, the washing flow path parts 833 can spray water towards the duct filter so as to remove the foreign substances accumulated on the duct filter due to water pressure.

However, for convenience of description, the laundry treating apparatus from which the duct filter is omitted will be described below.

A flow path switch valve 870 coupled to the washing flow path parts 833 so as to supply water for washing to the washing flow path parts 833 can be further provided. The flow path switch valve 870 can be connected to a water supply source, and can thus selectively supply water to the washing flow path parts 833. The water supply source can include the water collection part 860.

The flow path switch valve 870 can be connected to the water collection part 860 by a hose, and can guide water collected in the water collection part 860 to the washing flow path parts 833. The flow path switch valve 870 can guide water collected in the water collection part 860 to the water storage tank 120 (with reference to FIG. 3).

Figure 27:
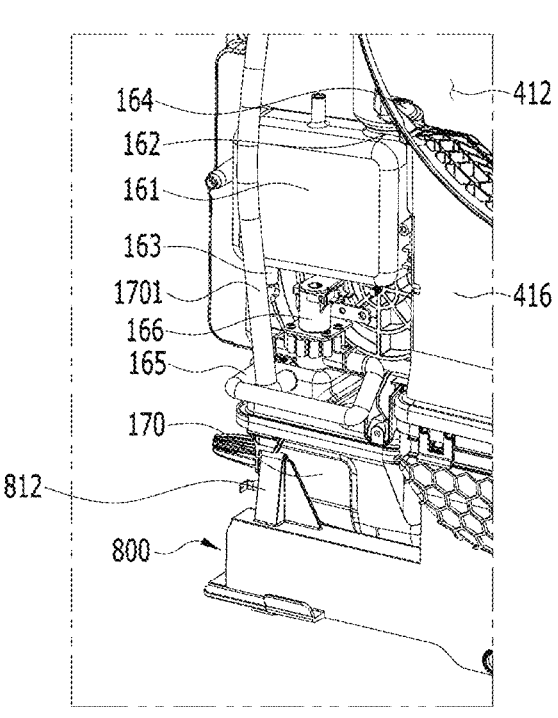
FIG. 27 is an enlarged view illustrating a steam generator of the laundry treating apparatus.
Figure 29:
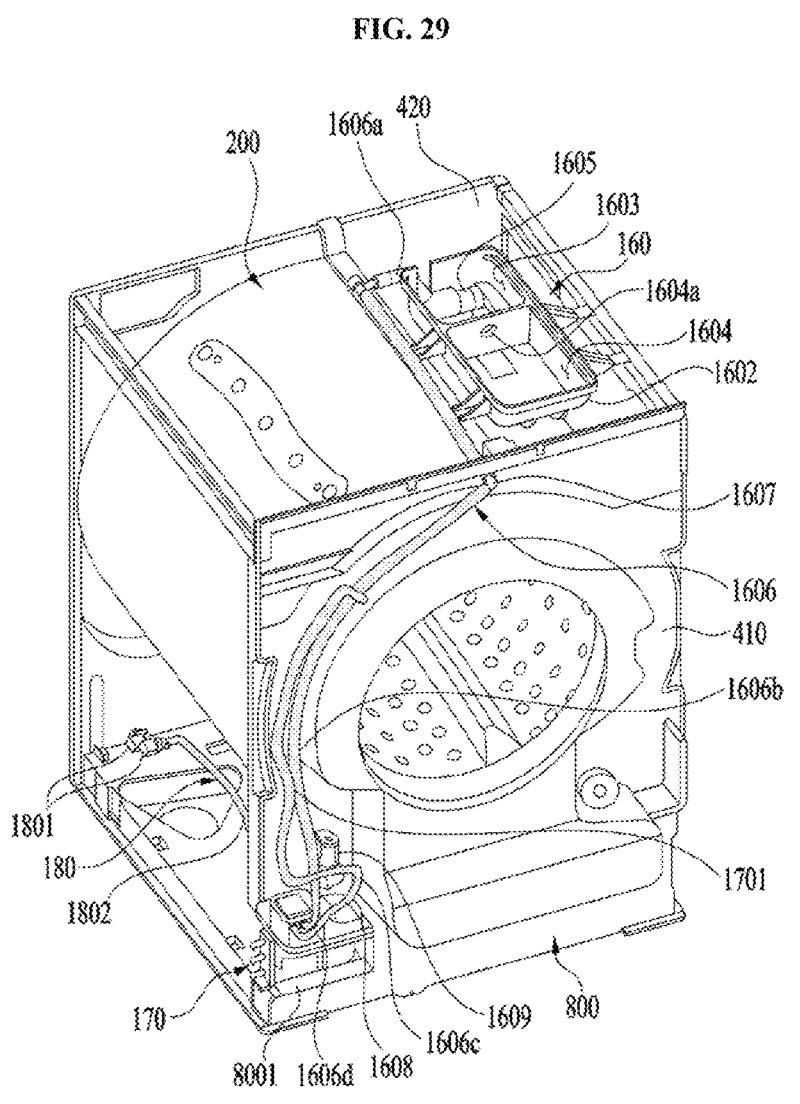

The laundry treating apparatus can include a steam generator 170 provided to supply steam to laundry or the inside of the drum (with reference to FIG. 27 or 29). The steam generator 170 can indicate an apparatus which applies heat to water so as to generate steam, and then injects the generated steam. However, the steam generator 170 is not limited thereto, and can generate steam using ultrasonic waves.

The steam generator 170 can be provided to supply steam before the drying cycle, during the drying cycle or after the drying cycle. The steam generator 170 generates steam and sprays the generated steam to laundry, thus being capable of easily removing contaminants from the surface of the laundry. Further, the steam can be sprayed to sterilize the laundry.

The base 800 can include a steam generator installation part 812 spaced apart from the circulation flow path part 820 so as to provide a space in which the steam generator 170 is mounted. The steam generator installation part 812 can be provided on the base 800, and can support the steam generator 170.

The steam generator installation part 812 can be provided as brackets protruding upwards from the base 800. The brackets can be provided to support the steam generator 170 in the forward and rearward directions. The steam generator 170 can be mounted between the brackets, and can thus be supported thereby.

The steam generator installation part 812 can be provided adjacent to the front portion rather than the rear portion of the base 800. Therefore, the steam generator installation part 812 can locate the steam generator 170 adjacent to the front portion rather than the rear portion of the base 800.

As described above, the drum can include the drum rear surface. Therefore, when the steam generator 170 supplies the generated steam to the inside of the drum through the rear portion thereof, the drum rear surface can disturb supply of the steam. However, the inlet is formed through the front surface of the drum, and thus, disturbance of supply of the steam through the drum rear surface can be prevented. Therefore, it can be desirable that the steam generator 170 supplies steam to the inside of the drum through the front surface thereof.

Therefore, when the steam generator 170 is provided adjacent to the front portion of the base 800, the distance between the steam generator 170 and the front portion of the drum can be shortened. Therefore, the steam generator 170 can more easily supply steam.

In order to generate steam, water can be supplied to the steam generator 170. A structure or elements for supplying water to the steam generator 170 will be described later.

Figure 13:
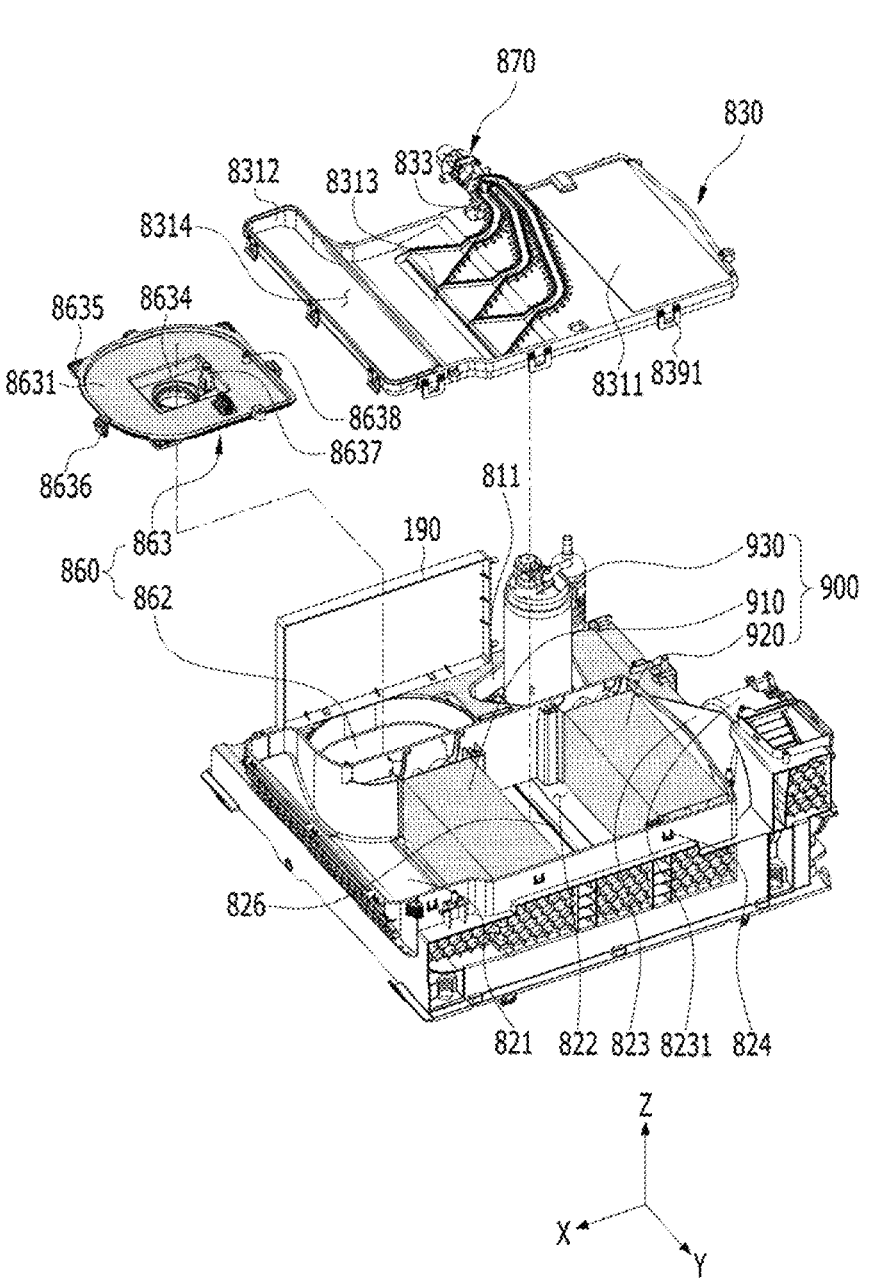
FIG. 13 is an exploded perspective view illustrating an example of a water collection cover and an example of a duct cover coupled to the base of the laundry treating apparatus.

FIG. 13 is an exploded perspective view illustrating the duct cover and a water collection cover separated from the base of FIG. 12.

Referring to FIG. 13, the first heat exchanger 910 and the second heat exchanger 920 configured to sequentially exchange heat with air in the drum 200 can be installed under the duct cover 830 so as to be spaced apart from each other in the forward and rearward directions. Air in the drum 200 having entered into the inflow duct 821 can be dehumidified through heat exchange by the first heat exchanger 910, and the dehumidified air can be heated through heat exchange by the second heat exchanger 920. The heated air can pass through the discharge duct 823, and can be supplied again to the inside of the drum 200.

The circulation flow path part 820 can further include a water cover 826 provided between the first heat exchanger 910 and the bottom surface of the transfer duct 822. The water cover 826 can be provided to be supported by the transfer duct 822.

The water cover 826 can be located under the first heat exchanger 910, and can be provided to support the lower surface of the first heat exchanger 910. The water cover 826 can support the first heat exchanger 910 so that the first heat exchanger 910 is spaced apart from the bottom surface of the transfer duct 822.

The first heat exchanger 910 can produce condensed water through condensation of wet steam discharged from the drum 200. When the condensed water remains in the laundry treating apparatus without being discharged to the outside, odor can be generated or drying efficiency can be reduced. For this purpose, the condensed water can be collected in a position spaced apart from the first heat exchanger 910 or the second heat exchanger 920, and the collected condensed water can be discharged.

The water cover 826 can support the first heat exchanger 910 so that the first heat exchanger 910 is spaced apart from the bottom surface of the transfer duct 822, and can thus form a space between the bottom surface of the transfer duct 822 and the water cover 826. Condensed water can flow into the water collection part 860 along the space formed by the water cover 826.

The air dehumidified by the first heat exchanger 910 is heated by the second heat exchanger 920, air having passing through the second heat exchanger 920 has a small moisture content and has an increased amount of saturated water vapor depending on heating, and thus, it is difficult to produce condensed water. Therefore, the water cover 826 can be located on the bottom surface of the transfer duct 822 adjacent to the first heat exchanger 910, and can be spaced apart from the second heat exchanger 920.

FIG. 13 illustrates a part of the upper surface of the water cover 826, and thus, a description of the shape of the flow path formed by the water cover 826 and the detailed structure of the water cover 826 will be described later.

The base 800 can include the water collection part 860 provided to be spaced apart from the circulation flow path part 820 so as to collect condensed water generated in the circulation flow path part 820. The water collection part 860 can include a water collection body 862 that defines a space in which the condensed water is collected.

The water collection part 860 can further include a water collection cover 863 configured to shield the open upper surface of the water collection body 862. Elements vulnerable to moisture can be installed around the water collection part 860. The condensed water collected in the water collection body 862 can be blocked from scattering to the outside. For example, the water collection cover 863 can be coupled to the water collection body 862, and can thus prevent the condensed water from leaking through the upper surface of the water collection body 862.

Further, the water collection part 860 can include a pump configured to move the condensed water collected in the water collection body 862 to the outside. In order to enable the pump to function properly, the inside of the water collection body 862 can be sufficiently sealed. The water collection cover 863 can seal the inside of the water collection body 862 so as to increase reliability of the pump.

The water collection cover 863 can include a water collection cover body 8631 that defines the shield surface of the water collection body 862. Further, the water collection cover 863 can include at least one of support bodies 8635 provided to support the water collection cover body 8631, and fastening hooks 8636 provided to couple the water collection cover body 8631 to the water collection body 862.

The support bodies 8635 can protrude from the circumference of the water collection cover body 8631, and can be seated on the base. The fastening hooks 8636 can protrude from the water collection cover body 8631. The fastening hooks 8636 can firmly fix the water collection cover body 8631 to the water collection body 862. The fastening hooks 8636 can be inserted into hook holes which will be described later, so as to be fixed.

The condensed water generated in the circulation flow path part 820 is collected in the water collection body 862. The upper surface of the water collection body 862 is open, and thus, the condensed water can scatter to the outside. However, since the water collection body 862 is located adjacent to the control box 190, the compressor 930, etc., the condensed water scattering to the outside of the water collection body 862 can cause failure of these devices.

The water collection cover 863 can shield the open upper surface of the water collection body 862 using the water collection cover body 8631 so as to prevent the condensed water from scattering, and the support bodies 8635 and the fastening hooks 8636 can firmly fix the water collection cover body 8631 to the water collection body 862. Therefore, failure of the devices due to scattering of the condensed water can be prevented.

Further, the water collection cover 863 can include a pump installation part 8634 formed through the water collection cover body 8631 and provided such that the pump is inserted into the pump installation part 8634. Further, the water collection cover 863 can include a drain flow path 8637 configured to protrude upwards from the water collection cover body 8631 and provided in a pipe shape configured to enable the inside and the outside of the water collection body 862 to communicate with each other therethrough.

The pump provided to move the condensed water collected in the water collection body 862 to the outside of the water collection body 862 can be installed at the pump installation part 8634. When the pump is operated, the condensed water collected in the water collection body 862 can be discharged through the drain flow path 8637.

A hose can be connected to the drain flow path 8637 so as to guide the condensed water discharged therefrom to the outside of the water collection body 862. One end of the hose can be coupled to the drain flow path 8637, and the other end of the hose can be connected to the flow path switch valve 870. However, the present disclosure is not limited thereto, and the other end of the hose can be located outside the cabinet so as to directly discharge the condensed water to the outside of the cabinet. The other end of the hose can be connected to the water storage tank 120 (with reference to FIG. 3) located in the upper part of the cabinet so as to guide the condensed water collected in the water collection body 862 to the water storage tank 120.

The water collection cover 863 can further include a return flow path 8638 spaced apart from the drain flow path 8637 and configured to enable the inside and the outside of the water collection body 862 to communicate with each other therethrough. The return flow path 8638 can be provided such that the water collection body 862 and the water storage tank communicate with each other therethrough. The return flow path 8638 can guide water in the water storage tank again to the water collection body 862.

The return flow path 8638 can be connected to the water storage tank 120 (with reference to FIG. 3) formed in the upper part of the cabinet through a hose. In order to prevent the water storage tank 120 from overflowing with water, when the water storage tank 120 is completely filled with water, the water stored in the water storage tank 120 can be moved to the water collection body 862 through the hose configured to connect the return flow path 8638 to the water storage tank 120. Therefore, the frequency of direct drainage of water stored in the water storage tank 120 by the user can be reduced and thus user convenience can be improved.

The flow path switch valve 870 configured to switch the flow path along which the condensed water collected in the water collection part 860 moves can be further provided. The pump can be connected to the flow path switch valve 870 through the hose. Water stored in the water collection body 862 can be moved to the flow path switch valve 870 by the pump. The flow path switch valve 870 can guide the moved water along various paths.

The flow path switch valve 870 can be connected to the washing flow path parts 833 so as to guide the water to the washing flow path parts 833. The water guided to the washing flow path parts 833 can be used to wash the first heat exchanger.

Further, the flow path switch valve 870 can be connected to the water storage tank 120 by the hose so as to guide condensed water moved from the water collection body 862 to the water storage tank 120. The user can directly drain the water storage tank 120 by withdrawing the water storage tank 120 in which the condensed water is stored.

The flow path switch valve 870 can be controlled by the control box 190, can be variably operated depending on a point in time of operation of the laundry treating apparatus. For example, when operation of the first heat exchanger 910 is finished during the drying cycle, the control box 190 can control the flow path switch valve 870 so as to guide the condensed water to the washing flow path parts 833. Further, at a point in time when washing of the first heat exchanger 910 is terminated, the control box 190 can control the flow path switch valve 870 so as to guide the condensed water to the water storage tank 120.

As described above, in order to normally operate the pump, the inside of the space from which water is drained by the pump can be sealed. The water collection cover 863 can be firmly coupled to the water collection body 862 using the support bodies 8635 and the fastening hooks 8636, and can thus easily seal the space in which the condensed water is stored. Thereby, reliability in operation of the pump can be improved. A sealing member can be additionally provided on the contact surface between the water collection cover 863 and the water collection body 862 so as to improve space sealability.

The water collection cover 863 provided to seal the inside of the water collection body 862 can be detachably provided on the water collection body 862. Foreign substances, such as lint included in the condensed water generated by the first heat exchanger 910, can enter the water collection body 862. When foreign substances having a large particle size enter the water collection body 862, the foreign substances can disturb operation of the pump.

Therefore, in order to remove foreign substances having entered the water collection body 862, the water collection cover 863 can be released from the water collection body 862. Therefore, the water collection cover 863 can be detachably provided on the water collection body 862. Here, the water collection cover 863 can be easily released from the water collection body 862 using the fastening hooks 8636.

That is, in the general service environment, the water collection cover 863 can firmly shield the open upper surface of the water collection body 862 using the support bodies 8635 and the fastening hooks 8636, thus being capable of preventing the condensed water from scattering to the outside.

In some examples, to release the water collection cover 863 from the water collection body 862 so as to remove foreign substances accumulated in the water collection body 862, the water collection cover 863 can be easily released from the water collection body 862 using the fastening hooks 8636.

The duct cover 830 can include cover mounting hooks 8391 formed along the circumference of the duct cover 830, and the circulation flow path part 820 can include duct protrusions 824 protruding along the circumferential of the circulation flow path part 820 and provided to be fastened to the cover mounting hooks 8391.

The duct cover 830 can be coupled to the circulation flow path part 820 by fastening the duct protrusions 824 to the cover mounting hooks 8391. That is, the duct cover 830 can be firmly coupled to the circulation flow path part 820 by fastening the duct protrusions 824 to the cover mounting hooks 8391 in the state in which the duct cover 830 is placed along the circumferences of the inflow duct 821 and the transfer duct 822.

A sealing member can be additionally provided on the contact surface between the duct cover 830 and the circulation flow path part 820 so as to prevent air in the circulation flow path part 820 from leaking to the outside.

Figures 14A, 14B:
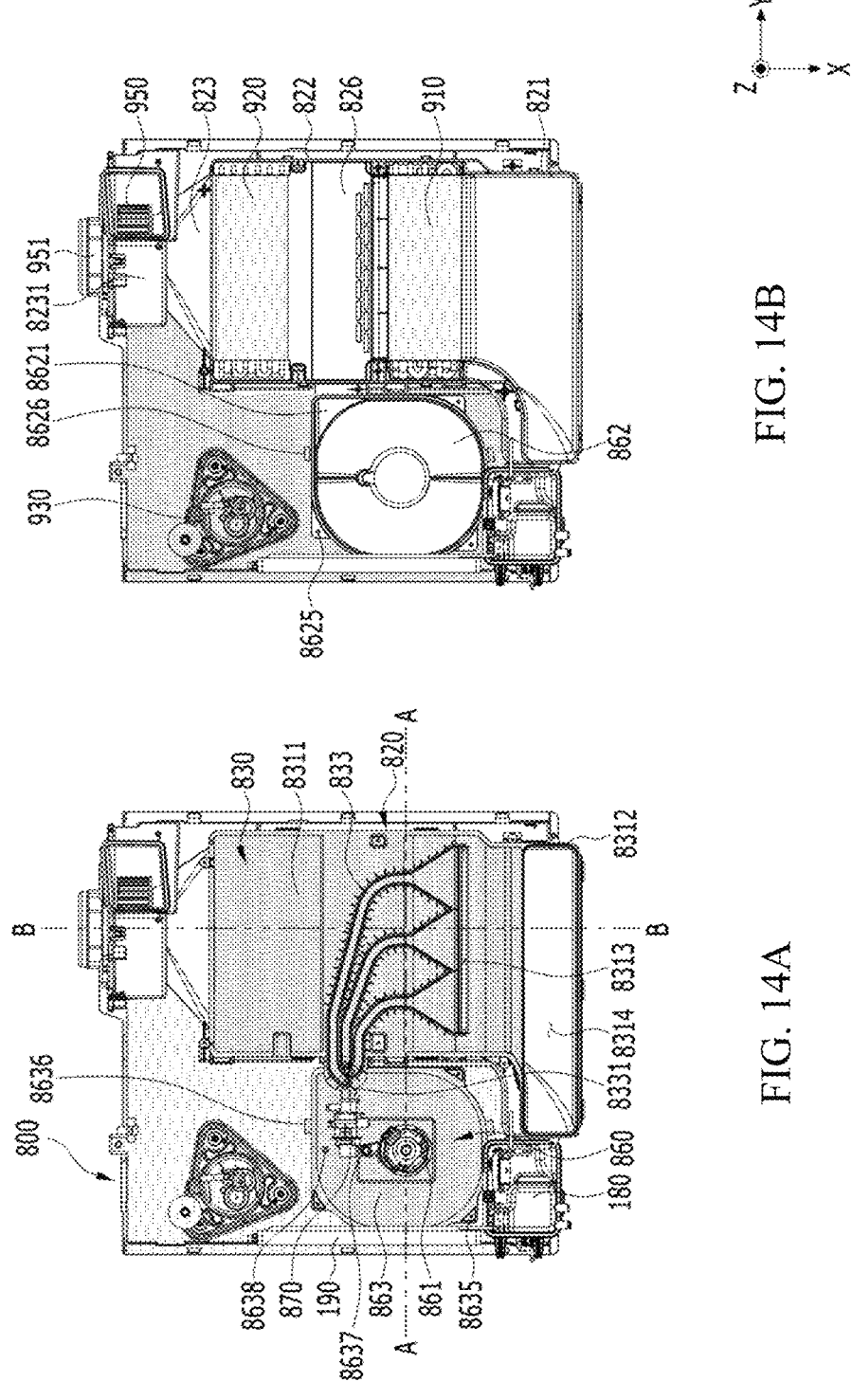
FIGS. 14A and 14B are top views of the base of the laundry treating apparatus.

FIG. 14A is a top view of the base to which the above-described water collection cover and the duct cover are coupled. FIG. 14B is a top view of the base from which the water collection cover and the duct cover are separated.

The conventional dryer includes the motor configured to generate power to rotate the drum, and the motor is provided in the space in which the water collection part 860 is located in these figures. The motor has a structure which rotates the drum using a pulley or a belt. Further, the water collection body configured to store condensed water is disposed between the compressor 930 and the circulation flow path part 820 due to the limit of the physical space. Therefore, the amount of condensed water accommodated in the water collection body is small, and thereby, the frequency of drainage of a water storage tank configured to store the condensed water by a user can be increased.

Further, in the conventional dryer, a space for installation of the control box 190 on the base 800 is not secured due to the above-described disposition of the motor. Therefore, the control box 190 is not supported by the base 800 and is disposed in the upper part of the cabinet, and thus, the distances between the control box and elements requiring control by the control box 190 are increased.

In addition, as control wires for connecting the control box 190 to other elements, such as the motor, are increased, noise of the laundry treating apparatus is increased. Further, the control wires can interfere with the drum.

In some implementations, the motor 500 can be disposed behind the drum 200 and spaced apart from the base 800, the water collection part 860 configured to store condensed water can be disposed in the space in which the motor 500 was mounted, and the control box 190 can also be disposed in the corresponding space.

Further, the control box 190 mounted on the base 800 can be stably connected to other elements, and can prevent problems, such as short circuit of control wires connected to the control box 190 due to interference. In addition, the base 800 can include a control box installation part 813 (with reference to FIG. 16) which will be described later, and thus, the control box 190 can be more firmly supported by the base 800.

Since the base 800 secures the space for mounting the above-described elements therein, the capacity of the water collection body 862 configured to store condensed water can be expanded, and thus, a larger amount of condensed water can be stored in the water collection body 862. Therefore, a larger amount of water can be used to wash the first heat exchanger 910, thus being capable of more effectively washing the first heat exchanger 910. Further, the amount of condensed water accommodated in the water collection body 862 is increased, and thereby, the frequency of drainage of the water storage tank 120 by the user so as to discharge the condensed water can be reduced. That is, user convenience can be increased.

Referring to FIG. 14A, the duct cover 830 can be coupled to the upper portion of the circulation flow path part 820, and the washing flow path parts 833 can be formed on the upper surface of the duct cover 830. The cover through hole 8313 can be formed at the downstream region of each of the washing flow path parts 833 so as to spray water flowing along the washing flow path parts 833 towards the first heat exchanger.

In some implementations, the nozzle cover configured to shield the open upper surfaces of the washing flow path parts 833 so as to prevent water from scattering can be coupled to the upper surfaces of the washing flow path parts 833.

The flow path switch valve 870 can be coupled to the upstream ends of the washing flow path parts 833. The flow path switch valve 870 can selectively supply water to a plurality of flow paths formed in the washing flow path parts 833. The flow path switch valve 870 can receive water supplied from an external water supply source, and can then supply the received water to the washing flow path parts 833.

Further, condensed water generated during the drying cycle can be used to wash the first heat exchanger 910. The water collection cover 863 can be coupled to the upper surface of the water collection body 862 so as to prevent water in the water collection body 862 from scattering to the outside. The pump 861 configured to move water to the flow path switch valve 870 can be provided to pass through the water collection cover 863, and can be installed in the water collection body 862. In some examples, the pump 861 can be connected to the flow path switch valve 870 through a connection pipe, such as the hose.

In some cases, to wash the first heat exchanger 910, the pump 861 can move condensed water stored in the water collection body 862 to the flow path switch valve 870, and the flow path switch valve 870 can supply the condensed water to the washing flow path parts 833 so as to wash the first heat exchanger 910.

FIG. 14B illustrates the base 800 from which the water collection cover 863 and the duct cover 830 are separated. The water collection body 862 can include cover support planes 8625 recessed from the upper surface of the base 800 so that the support bodies 8635 of the water collection cover 863 are placed thereon. Further, the water collection body 862 can include the hook holes 8626 provided such that the fastening hooks 8636 of the water collection cover 863 are inserted thereinto.

The support bodies 8635 can be placed on the cover support planes 8625, and can be firmly fixed thereto using separate fastening members. Further, the fastening hooks 8636 can be inserted into the hook holes 8626. The fastening hooks 8636 can be formed of an elastic material, and can be inserted into the hook holes 8626 so as to be firmly supported thereby.

The control box 190 configured to control operation of the laundry treating apparatus can be installed at the left side of the water collection part 860. Further, the compressor 930, which defines the heat exchange unit 900 together with the first heat exchanger 910 and the second heat exchanger 920, can compress the refrigerant exchanging heat with air in the drum and be installed behind the water collection part 860.

The water collection cover 863 can be firmly coupled to the upper surface of the water collection body 862, and can prevent condensed water collected in the water collection body 862 from scattering towards the control box 190, the compressor 930 or the like. Therefore, failure of such an element by the condensed water can be prevented.

The first heat exchanger 910 and the second heat exchanger 920 can be accommodated and disposed in the circulation flow path part 820 from which the duct cover 830 is removed, in the forward and rearward directions. The water cover 826 configured to support the first heat exchanger 910 can be provided under the first heat exchanger 910. The detailed installed structure of the water cover 826 and the shape thereof will be described later.

In the conventional dryer, as described above, the driving unit is installed on the base and occupies a large area on the base, and thus, it is difficult to mount a steam generator on the base. Therefore, the steam generator of the conventional dryer is spaced apart from the base, and is provided in the upper portion of the dryer.

However, in the laundry treating apparatus, the driving unit can be spaced apart from the base 800 to be disposed behind the drum 200. Therefore, the steam generator 170 can be mounted on the base 800. The steam generator 170 can be disposed to overlap the water collection part 860 in the forward and rearward directions. Further, the steam generator 170 can be disposed in front of the water collection part 860. Further, the steam generator 170 can be disposed to overlap a compressor installation part 811. Further, the steam generator 170 can be disposed in front of the compressor installation part 811.

When the steam generator 170 is disposed to overlap the water collection part 860 or the compressor installation part 811 in the forward and rearward directions, the space on the base 800 can be more effectively used. Further, when the steam generator 170 is disposed in front of the water collection part 860 or the compressor installation part 811, the distance between the steam generator 170 and the front portion of the drum can be reduced, and thus, the steam generator 170 can easily supply steam to the front portion of the drum.

Figure 15:
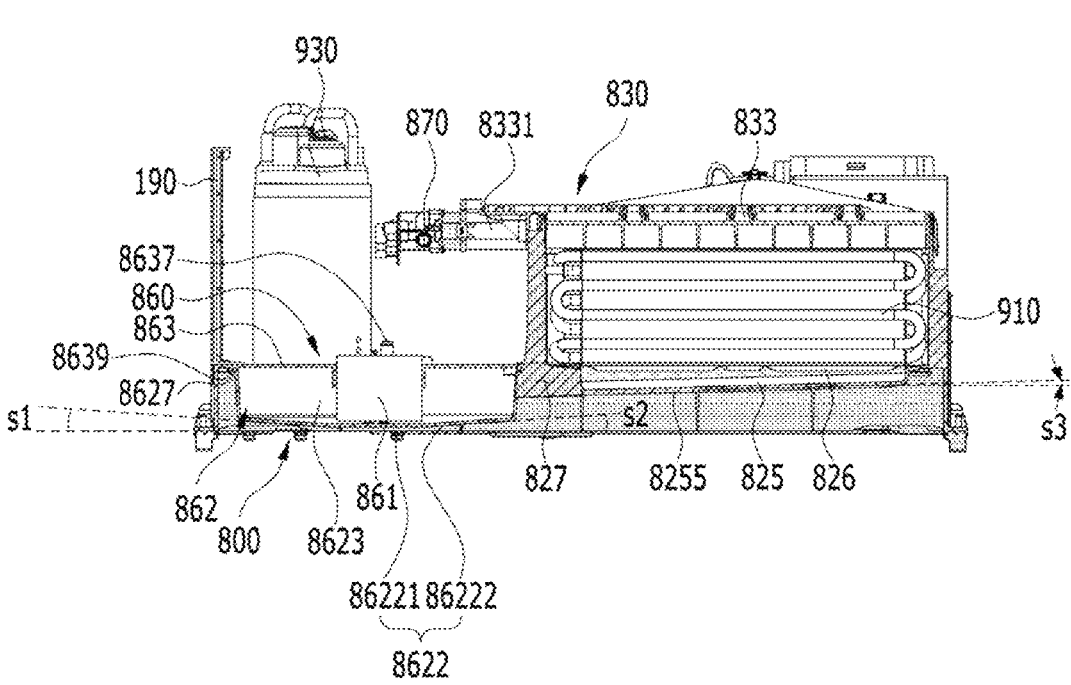
FIG. 15 is a cross-sectional view taken along line A-A of FIG. 14A.
Figure 15:
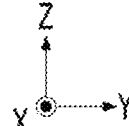

FIG. 15 is a cross-sectional view taken along line A-A of FIG. 14A, as seen from the front.

Referring to FIG. 15, the water cover 826 configured to support the first heat exchanger 910 can be located under the first heat exchanger 910 located at the right side (in the Y-axis direction). The water cover 826 can be placed on the transfer duct 822, and can support the first heat exchanger 910 so that the first heat exchanger 910 is spaced apart from the bottom surface of the transfer duct 822.

The base 800 can include a collection guide part 825 configured to guide condensed water generated in the circulation flow path part 820 to the water collection part 860. The water can be generated when air in the drum is cooled in the first heat exchanger 910. The collection guide part 815 can be recessed from the bottom surface of the circulation flow path part 820.

The collection guide part 825 can be located below the water cover 826, and can guide the condensed water generated by the first heat exchanger 910 to the water collection part 860. The collection guide part 825 can be formed to be stepped downwards from the bottom surface of the transfer duct 822, and can thus form a flow path along which the condensed water flows. The collection guide part 825 can guide the condensed water to the water collection part 860.

The circulation flow path part 820 can include a water collection communication hole 827 through which the collection guide part 825 and the water collection part 860 communicate with each other. The condensed water flowing through the collection guide part 825 can pass through the water collection communication hole 827, and can be stored in the water collection body 862.

The water collection communication hole 827 can be provided to pass through one surface of the circulation flow path part 820 facing the water collection part 860, and the collection guide part 825 and the water collection part 860 can communicate with each other through the water collection communication hole 827.

In this figure, the water collection communication hole 827 is marked with oblique lines. The water collection communication hole 827 can actually be located behind the position illustrated in this figure (i.e., in the negative X-axis direction). The water collection communication hole 827 can be formed through the side wall of the transfer duct 822. The condensed water generated by the first heat exchanger 910 can flow along the collection guide part 825 inclined towards the water collection communication hole 827, can pass through the water collection communication hole 827, and can then be stored in the water collection body 862.

The collection guide part 825 can include a guide bottom surface 8255 configured to form the bottom surface on which the condensed water moves. The guide bottom surface 8255 can be provided to form a designated angle with the ground so that the condensed water on the guide bottom surface 8255 can be naturally moved towards the water collection communication hole 827. The angle between the lateral direction, i.e., the leftward and rightward directions, of the guide bottom surface 8255 and the ground can be defined as a third inclination angle s3. The third inclination angle s3 can be formed as an angle at which the distance between the guide bottom surface 8255 and the ground decreases as the distance from the water collection communication hole 827 decreases.

The flow rate of the condensed water can be adjusted by controlling the third inclination angle s3. When the flow rate of the condensed water is equal to or greater than a specific value, the condensed water is not capable of sweeping lint or foreign substances located on the guide bottom surface 8255 down. Therefore, the third inclination angle s3 can be provided as a designated angle at which the condensed water is capable of sweeping lint or foreign substances down.

The water collection body 862 can include a water collection bottom surface 8622 configured to form the bottom surface of the space in which the condensed water is collected, and a water collection side surface 8623 configured to form the side surface of the space. The water collection bottom surface 8622 can be provided at a lower position than the collection guide part 825. Therefore, the condensed water can be collected on the water collection bottom surface 8622 by gravity.

The water collection body 862 can include the water collection side surface 8623 configured to form the side surface of the space in which the condensed water is collected. The water collection side surface 8623 can connect the water collection bottom surface 8622 which is recessed from the base 800, to the base 800.

The water collection bottom surface 8622 can be inclined towards a part thereof facing the pump. The water collection bottom surface 8622 can include an inflow surface 86221 configured to face the pump, and a guide surface 86222 configured to extend from the inflow surface 86221 towards the water collection side surface 8623.

The inflow surface 86221 can be flat, and the guide surface 86222 can be inclined. Here, a specific surface which is flat can indicate that the specific surface has an angle to maintain the stationary state of liquid located on the specific surface.

That is to say, the inflow surface 86221 can be formed parallel to the ground at the center of the water collection bottom surface 8622, and the guide surface 86222 configured to connect the inflow surface 86221 to the water collection side surface 8623 can be provided such that the distance between the guide surface 86222 and the ground is increased in the direction from the inflow surface 86221 to the water collection side surface 8623.

In other words, the inflow surface 86221 and the guide surface 86222 can be disposed with designated inclinations. As seen from the front, the guide surface 86222 extending leftwards from the inflow surface 86221 can be inclined from the inflow surface 86221 at a first inclination angle s1, and the guide surface 86222 extending rightwards from the inflow surface 86221 can be inclined from the inflow surface 86221 at a second inclination angle s2.

The first inclination angle s1 and the second inclination angle s2 can be the same. However, the present disclosure is not limited thereto, and the first inclination angle s1 and the second inclination angle s2 can be designed to be specific different angles at which water accommodated in the water collection body 862 can more smoothly flow.

The third inclination angle s3 can be equal to or less than the first inclination angle s1 and the second inclination angle s2. The condensed water on the collection guide part 825 can have an initial flow rate due to the flow of air on the circulation flow path part 820. Therefore, when the third inclination angle s3 is equal to or greater than a specific value, the flow rate of the condensed water can be excessively increased, and thus, the condensed water is not moved towards the water collection communication hole 827, and can be moved to the side surface of the second heat exchanger. That is, the condensed water does not move along the collection guide part 825, and can overflow to the outside. Therefore, the third inclination angle s3 can be less than the first inclination angle s1 and the second inclination angle s2. However, overflow of the condensed water can be prevented using various methods other than control of the third inclination angle s3.

Relationships among the collection guide part 825, the water collection communication hole 827 and the water collection body 862 will be described later.

The pump 861 can be accommodated in the water collection cover 863 which shields the open upper surface of the water collection body 862. Referring to FIG. 13, the pump 861 is accommodated in the pump installation part 8634. When the condensed water is stored in the water collection body 862, the condensed water stagnant in the water collection body 862 for a long time can be contaminated, and the contaminated water can generate odor or algal blooms. In order to prevent such a problem, the pump 861 can discharge water collected in the water collection body 862 as much as possible so as to minimize the amount of residual water.

In order to normally operate the pump 861, the pump 861 can be spaced apart from the water collection bottom surface 8622 by a designated distance or more. However, when the pump 861 is spaced apart from the water collection bottom surface 8622, water accommodated between the pump 861 and the water collection bottom surface 8622 can remain. Therefore, in order to minimize the amount of residual water between the pump 861 and the water collection bottom surface 8622 while spacing the pump 861 apart from the water collection bottom surface 8622, the water collection bottom surface 8622 can be inclined.

When the water collection bottom surface 8622 is provided to be flat without any inclination, water equal to a volume acquired by multiplying the area of the water collection bottom surface 8622 by the distance between the water collection bottom surface 8622 and the pump 861 can remain in the water collection body 862. In some examples, when the water collection bottom surface 8622 includes the inflow surface 86221 and the guide surface 86222 and is provided to be inclined, water can be concentrated on the inflow surface 86221, and thus, a small amount of water can remain compared to the case in which the water collection bottom surface 8622 is provided to be flat.

That is, when the guide surface 86222 extends from the water collection side surface 8623 to the inflow surface 86221 and thus the distance from the ground is reduced, generation of odor or algal blooms due to water remaining in the water collection body 862 can be prevented.

The flow path switch valve 870 can be coupled to a guide flow path 8331 protruding from the side surface of the duct cover 830. The guide flow path 8331 can extend from the upstream ends of the washing flow path parts 833. The flow path switch valve 870 can be coupled to the guide flow path 8331, and can shorten a process compared to coupling of the washing flow path parts 833 to the flow path switch valve 870 by a rubber hose, and can prevent water leakage between the flow path switch valve 870 and the washing flow path parts 833.

Figure 16:
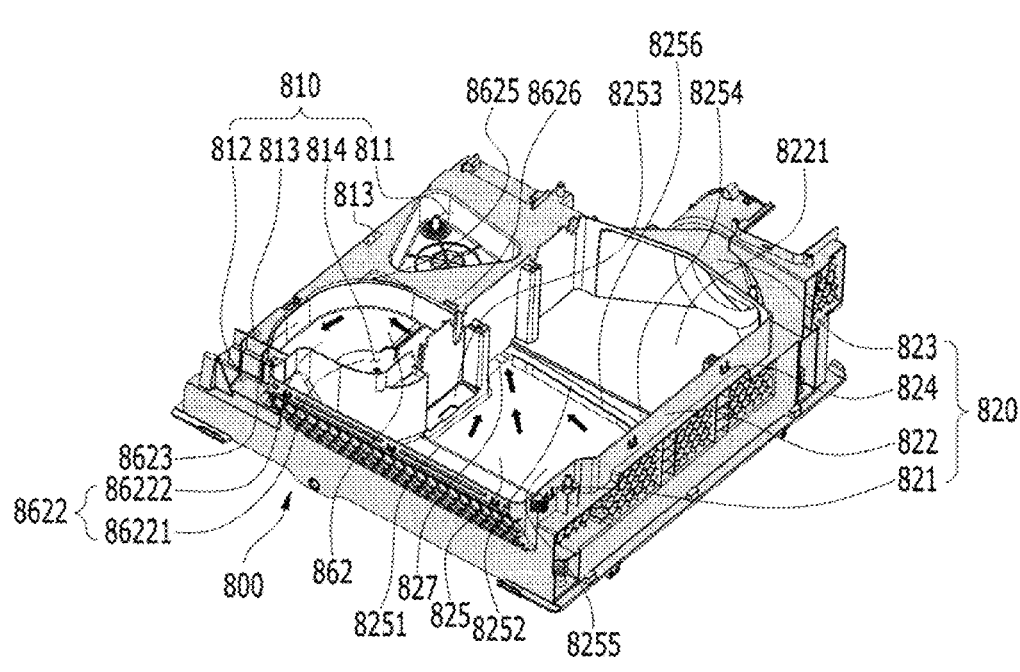
FIG. 16 is a perspective view illustrating the base of the laundry treating apparatus.
Figure 16:
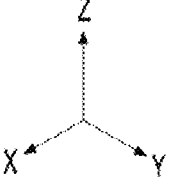
Figure 17:
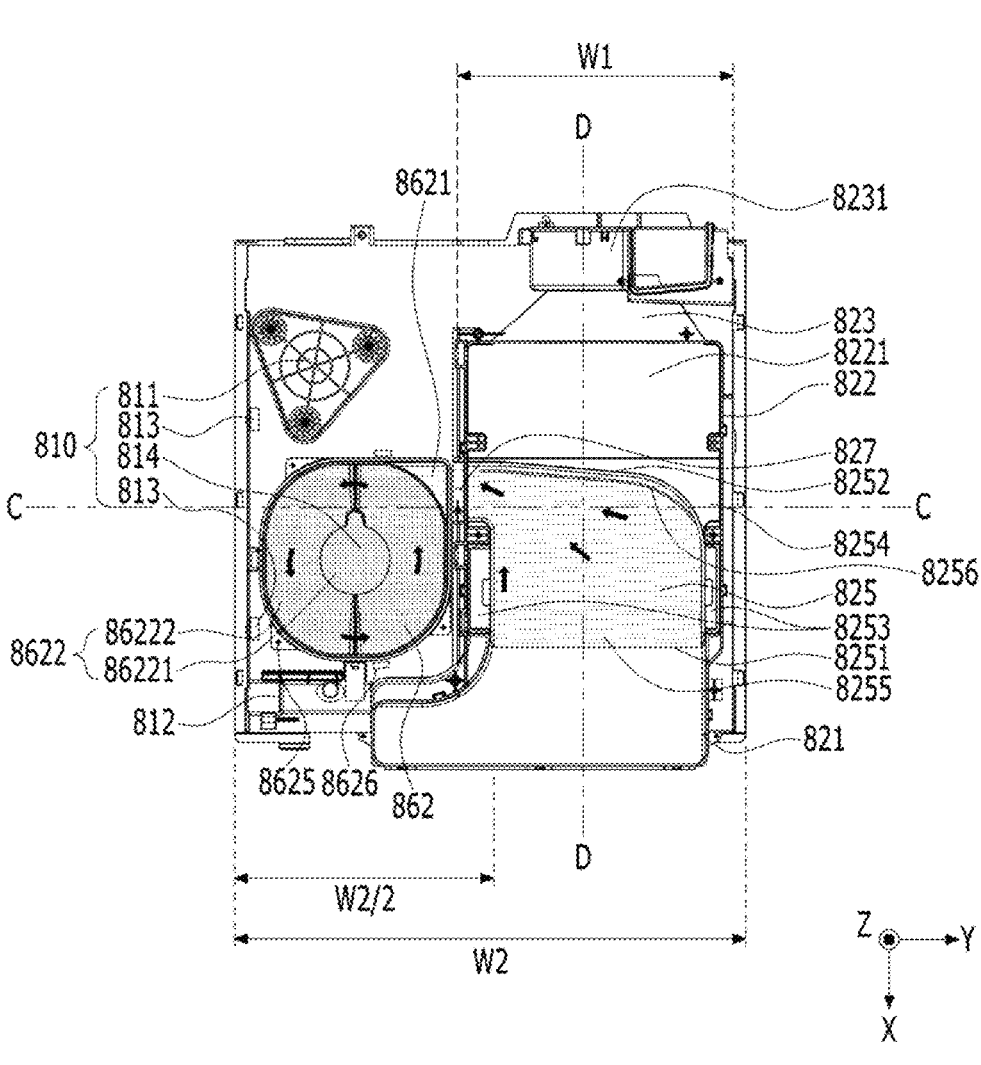
FIG. 17 is a top view illustrating the base of the laundry treating apparatus.

FIGS. 16 and 17 are a perspective view and a top view illustrating the base from which all the elements installed on the base are removed.

Referring to FIGS. 16 and 17, the base 800 can include the circulation flow path part 820 provided on one side of the base 800 so as to circulate air in the drum therethrough, and the device installation part 810 provided on the other side of the base 800 so as to provide the space in which the devices to operate the laundry treating apparatus are installed, as described above.

The base 800 can include the water collection part 860 provided to communicate with the circulation flow path part 820 so as to collect condensed water generated in the circulation flow path part 820. The water collection part 860 can include the water collection body 862 configured to form the space in which water is stored. The water collection body 862 can be recessed downwards from the base 800. The water collection bottom surface 8622 configured to form the water collection surface of the water collection body 862 in which water is stored can be recessed downwards from the device installation part 810. The water collection side surface 8623 configured to form the side wall of the water collection body 862 can connect the water collection bottom surface 8622 which is recessed from the base 800, to the base 800.

The water collection bottom surface 8622 can include the inflow surface 86221 formed on one surface thereof facing the pump 861 parallel to the ground, and the guide surface 86222 configured to extend from the inflow surface 86221 towards the water collection side surface 8623 so as to be inclined upwards.

The condensed water entering the water collection body 862 along the guide surface 86222 can generate a rotating flow in a direction represented by arrows shown in these figures. Since the rotating flow is generated using the guide surface 86222, foreign substances, such as lint, included in the condensed water may not be moved to the inflow surface 86221 by centrifugal force, and can be accumulated adjacent to the water collection side surface 8623. When the foreign substances reach the inflow surface 86221, the foreign substances enter the pump 861 and can thus damage the pump 861. Therefore, the guide surface 86222 can prevent the foreign substances from entering the pump 861 by generating the above-described flow of the condensed water.

The control box 190 configured to control operation of the laundry treating apparatus can be installed at the side of the water collection part 860 away from the circulation flow path part 820. The base 800 can include the control box installation part 813 configured to provide the space in which the control box 190 is installed. The control box installation part 813 can include recesses formed in the device installation part 810. The control box 190 can be coupled to the base 800 by fitting into the recesses provided in the control box installation part 813.

The control box installation part 813 can indicate the entirety of one surface of the base 800 coming into contact with the control box 190. Further, the control box installation part 813 can indicate one surface of the device installation part 810 facing the control box 190.

That is, a plane of projection of the control box 190 onto the base 800 when the control box 190 installed on the base 800 is projected onto the base 800 from the top can be defined as the control box installation part 813.

The water collection part 860 can be disposed between the control box installation part 813 and the circulation flow path part 820. Further, the control box installation part 813 can be disposed to overlap the water collection part 860 in the leftward and rightward directions.

Since the water collection part 860 can be spaced apart from the circulation flow path part 820, when the water collection part 860 is disposed between the circulation flow path part 820 and the control box installation part 813, the space on the base 800 rather than the space on which the circulation flow path part 820 is disposed can be more effectively used.

When the control box 190 is exposed to an excessive amount of moisture, an error or failure of the control box 190 can occur. Therefore, the control box installation part 813 can be disposed to be spaced apart from the circulation flow path part 820 in which wet steam flows, and thereby, stability of the control box 190 can be increased.

That is, damage to the control box 190 can be prevented by disposing the water collection part 860 between the circulation flow path part 820 and the control box installation part 813.

Further, the control box installation part 813 can be located such that at least a portion thereof overlaps the collection guide part 825 in the leftward and rightward directions. Further, the control box installation part 813 can be located such that at least a portion thereof overlaps the water collection communication hole 827 in the leftward and rightward directions.

When the control box installation part 813 is located to overlap the collection guide part 825 or the water collection communication hole 827 in the leftward and rightward directions, the control box installation part 813 can be located adjacent to the water collection part 860 connected to the water collection communication hole 827 so as to collect water. Further, when the control box installation part 813 is located adjacent to the water collection part 860, the control box installation part 813 can be located adjacent to the pump.

The control box 190 can be connected to the pump through the control wire, and can thus control the pump. Therefore, the control box 190 can be easily connected to the pump.

The control box 190 can include coupling protrusions protruding downwards from the lower end thereof, and the coupling protrusions can be fixedly inserted into the recesses provided in the control box installation part 813. However, the present disclosure is not limited thereto, and the control box 190 can be installed in the control box installation parts 813 by various methods through which the control box 190 can be firmly fixed to the control box installation parts 813.

The cover support planes 8625 and the hook holes 8626 can be formed around the circumference of the water collection side surface 8623 so as to couple the water collection cover to the water collection body. The coupling structure between the water collection cover and the water collection body has already been described above with reference to FIG. 13.

The base 800 can include the compressor installation part 811 configured to provide a space in which the compressor is mounted. The device installation part 810 can include the compressor installation part 811.

The compressor installation part 811 can be disposed to overlap the water collection cover 863 in the forward and rearward directions. Further, the compressor installation part

811 can be located behind the water collection cover 863. The compressor installation part 811 can be recessed downwards from the device installation part 810. The compressor installation part 811 can be provided to support the bottom surface of the compressor.

The compressor installation part 811 can be located to overlap the water collection part 860 in the forward and rearward directions. In the conventional dryer, the motor is installed on the base 800, and thus, the space on the base 800 is narrow. Therefore, the water collection part 860 be provided between the compressor installation part 811 and the circulation flow path part 820. However, the space between the compressor installation part 811 and the circulation flow path part 820 is narrow, and thus, the amount of water collected by the water collection body is not sufficient.

However, in the laundry treating apparatus, the motor is installed behind the drum 200, and thus, the space on the base 800 which was conventionally occupied by the motor can be used. The water collection part 860 and the compressor installation part 811 can be disposed in the forward and rearward directions. Therefore, the volume of the water collection body 862 can be expanded, and the water collection body 862 can store a larger amount of condensed water. Therefore, the frequency of drainage of the condensed water by a user can be reduced. Accordingly, user convenience can be increased.

Further, the compressor installation part 811 can be located to overlap the second heat exchanger in the leftward and rightward directions. The refrigerant compressed by the compressor can be supplied to the second heat exchanger, and can heat the circulation flow path part 820. When the compressor installation part 811 is located to overlap the second heat exchanger in the leftward and rightward directions, the distance between the two elements is reduced, and generation of heat loss of the refrigerant moving from the compressor to the second heat exchanger can be prevented. Therefore, heat exchange efficiency can be increased.

Further, the water collection part 860 can be located to overlap the first heat exchanger in the leftward and rightward directions. In general, condensed water is generated by the first heat exchanger. Therefore, when the water collection part 860 is located to overlap the first heat exchanger in the leftward and rightward directions, the flow path along which the condensed water generated by the first heat exchanger moves can be shortened. Therefore, generation of odor or algal blooms due to residual water can be prevented.

The compressor installation part 811 can be located behind the water collection part 860. The compressor can generate noise during operation. Therefore, when the compressor installation part 811 is disposed in the rear portion of the laundry treating apparatus, transfer of noise to a user can be prevented. That is, when the compressor installation part 811 is disposed in the rear portion of the laundry treating apparatus, user convenience can be improved.

Further, when the water collection part 860 is disposed in the front portion of the laundry treating apparatus, the distance between the water collection part 860 and the first heat exchanger can be reduced. The condensed water collected in the water collection body 862 can be used to wash the first heat exchanger and, when the distance between the first heat exchanger and the water collection part 860 is reduced, the length of a hose connecting the two elements can be shortened.

The transfer duct 822 can include a transfer bottom surface 8221 provided to face the second heat exchanger. The transfer bottom surface 8221 can be provided to support the second heat exchanger.

The base 800 can further include the collection guide part 825 formed on the bottom surface of the circulation flow path part 820 facing the first heat exchanger so as to guide the condensed water to the water collection part 860, and the compressor installation part 811 can be located behind the collection guide part 825.

The collection guide part 825 can perform a function of preventing the condensed water generated by the first heat exchanger 910 installed thereon from remaining in the lower portion thereof, and guiding the condensed water to the water collection part 860. The collection guide part 825 can extend rearwards from a spot at which the first heat exchanger 910 is installed to a spot located between the first heat exchanger 910 and the second heat exchanger 920. The collection guide part 825 can be disposed in front of the transfer bottom surface 8221.

The collection guide part 825 can include a recessed stepped portion 8251 provided to prevent the condensed water from overflowing towards the inflow duct 821.

The recessed stepped portion 8251 can connect the inflow duct 821 to the bottom surface of the transfer duct 822 stepwise. The recessed stepped portion 8251 can be provided at the front portion of the collection guide part 825.

The recessed stepped portion 8251 can indicate a portion in which the height of the bottom surface extending along the inflow duct 821 is drastically decreased. The collection guide part 825 can extend rearwards from the recessed stepped portion 8251.

The collection guide part 825 can include an extending stepped portion 8252 configured to prevent the condensed water from overflowing towards the second heat exchanger 920. The extending stepped portion 8252 can be located between the first heat exchanger 910 and the second heat exchanger 920. The extending stepped portion 8252 can indicate a portion in which the height of the bottom surface of the transfer duct 822 is increased stepwise.

Further, the extending stepped portion 8252 can have a curved surface so as to guide the flow of the condensed water flowing therein towards the water collection part 860 in one direction.

The circulation flow path part 820 and the water collection part 860 can communicate with each other through the water collection communication hole 827. Further, the water collection communication hole 827 can guide the condensed water moving along the collection guide part 825 to the water collection body 862. That is, the water collection communication hole 827 can spatially connect the circulation flow path part 820 and the water collection body 862.

The water collection communication hole 827 can be located in front of the second heat exchanger 920. When the water collection communication hole 827 is located in front of the second heat exchanger, contact of the condensed water moving along the collection guide part 825 with the second heat exchanger 920 can be prevented. Further, the condensed water can be guided to the water collection part 860 while being spaced apart from the second heat exchanger 920.

Therefore, reduction in heat exchange efficiency of the second heat exchanger 920 due to evaporation of the condensed water heated by the second heat exchanger 920 can be prevented. Therefore, drying efficiency can be improved.

Referring to FIG. 17, the extending stepped portion 8252 can be provided to be inclined so as to naturally transfer water, moving along the collection guide part 825, towards the water collection communication hole 827. Further, the extending stepped portion 8252 can have a curved surface.

That is to say, the extending stepped portion 8252 can be provided such that the distance between the extending stepped portion 8252 and the recessed stepped portion 8251 increases as the distance from the water collection communication hole 827 decreases. The extending stepped portion 8252 is not limited to the shape which is shown in the figures or described above, and can be provided in various shapes.

The collection guide part 825 can include the guide bottom surface 8255 configured to form the bottom surface on which the condensed water moves. The guide bottom surface 8255 can connect the recessed stepped portion 8251 and the extending stepped portion 8252 to each other. The guide bottom surface 8255 can be provided such that the distance between the guide bottom surface 8255 and the ground is less than the distance between the bottom surface of the inflow duct 821 and the ground. Therefore, overflow of the condensed water transferred on the guide bottom surface 8255 towards the inflow duct 821 can be prevented.

The collection guide part 825 can further include a guide partition 8256 configured to prevent the condensed water from overflowing towards the second heat exchanger 920. The guide partition 8256 can protrude upwards from the guide bottom surface 8255. The guide partition 8256 can serve as a partition which prevents the condensed water flowing on the guide bottom surface 8255 from overflowing towards the second heat exchanger 920 by the volume of air circulating in the circulation flow path part 820.

The second heat exchanger 920 functions to heat circulating air and, when the condensed water overflows towards the second heat exchanger 920, the second heat exchanger 920 can also heat the condensed water, and thus, the condensed water can be evaporated. However, since air heated by the second heat exchanger 920 is supplied to the drum so as to dry laundry in the drum, when the condensed water is evaporated and thus the humidity of air supplied to the drum is increased, drying efficiency can be reduced. Further, when the second heat exchanger 920 configured to heat air supplied to the drum exchanges heat with the condensed water, heat exchange efficiency can also be reduced.

The guide partition 8256 can be formed parallel to the extending stepped portion 8252. That is, the guide partition 8256 can serve to assist the condensed water overflow prevention function performed by the extending stepped portion 8252. The guide partition 8256 can protrude from the guide bottom surface 8255 and be spaced apart from the extending stepped portion 8252 by a designated distance. However, in order to assist the condensed water overflow prevention function, the guide partition 8256 can be provided close to the extending stepped portion 8252.

The guide partition 8256 and the extending stepped portion 8252 can prevent the condensed water from overflowing to the outside of the collection guide part 825, and thereby, heat exchange efficiency and laundry drying efficiency of the laundry treating apparatus can be improved. Although the figures show one guide partition 8256, the present disclosure is not limited thereto and a plurality of guide partitions can be provided.

Further, the guide partition 8256 and the extending stepped portion 8252 can form an accommodation surface. A cover partition 8267 (with reference to FIG. 20) of the water cover 826, which will be described later, can be inserted into the accommodation surface. The cover partition 8267 can be inserted into a space between the guide partition 8256 and the extending stepped portion 8252, and can thus couple the water cover 826 to the collection guide part 825.

The collection guide part 825 serves to guide the condensed water to the water collection part 860. However, the side wall of the transfer duct 822 can be located between the water collection body 862 and the collection guide part 825. Therefore, the water collection communication hole 827 through which the collection guide part 825 and the water collection body 862 communicate with each other can be formed through the lower portion of the side wall of the transfer duct 822.

The guide bottom surface 8255 can be provided to have designated inclination angles s3 and s4 (with reference to FIGS. 15 and 18) so as to allow the condensed water to flow towards the water collection communication hole 827 by gravity. The guide bottom surface 8255 can be provided to have a gradient in the forward and rearward directions such that the height thereof from the ground decreases in a direction from the recessed stepped portion 8251 to the extending stepped portion 8252. Further, as shown in the figures, the guide bottom surface 8255 can be provided to have a gradient in the leftward and rightward directions such that the height thereof from the ground decreases in a direction closer to the water collection part 860. In other words, the guide bottom surface 8255 can be provided such that the distance between the guide bottom surface 8255 and the ground at the water collection communication hole 827 is the minimum and the distance between the guide bottom surface 8255 and the ground gradually increases as the distance from the water collection communication hole 827 increases.

When the guide bottom surface 8255 is provided to have the above-described gradients, the condensed water generated by the first heat exchanger can naturally flow towards the water collection communication hole 827 in the direction represented by arrows shown in these figures, and thus, generation of various problems, such as odor and reduction in drying efficiency, due to residual water on the guide bottom surface 8255 can be prevented.

The water collection body 862 can include a connection flow path 8621 configured to connect the space in which water is stored to the water collection communication hole 827. The connection flow path 8621 can be provided to be stepped upwards from the water collection bottom surface 8622. The connection flow path 8621 can guide the condensed water having passed through the water collection communication hole 827 to the water collection body 862 in the circumferential direction thereof.

The connection flow path 8621 can be provided outside the circumference of the water collection bottom surface 8622. Therefore, the connection flow path 8621 can connect the water collection bottom surface 8622 to the water collection communication hole 827 to each other stepwise. However, the present disclosure is not limited thereto, and the connection flow path 8621 can be provided as an inclined plane configured to connect the water collection communication hole 827 to the water collection bottom surface 8622.

The connection flow path 8621 can prevent the condensed water stored in the water collection body 862 from overflowing towards the collection guide part 825 when the pump is operated. The connection flow path 8621 can be provided as a stepped portion so as to be located above the pump, and can thus prevent overflow of the condensed water.

The compressor installation part 811 can be located behind the water collection communication hole 827. Since the compressor installation part 811 is located behind the water collection communication hole 827, the distance between the collection guide part 825 and the water collection part 860 can be reduced. Therefore, generation of odor or algal blooms due to the condensed water remaining between the collection guide part 825 and the water collection part 860 can be prevented.

Since the water collection part 860 is located between the inflow duct 821 and the compressor installation part 811, the distance between the transfer duct 822 in which the condensed water is generated and the water collection part 860 can be reduced, the water collection part 860 can be disposed adjacent to the spot at which the condensed water is generated, and thus, generation of problems due to residual condensed water can be prevented.

The compressor installation part 811 can be located to be spaced apart from the transfer duct 822 in the leftward and rightward directions, and can be located to be spaced apart from the water collection part 860 in the direction of extension of the transfer duct 822.

Since the transfer duct 822 extends in the forward and rearward directions of the laundry treating apparatus, when the water collection part 860 is disposed to be spaced apart from the transfer duct in the width direction and the compressor installation part 811 is disposed to be spaced apart from the water collection part 860 in the forward and rearward directions, the space on the base 800 can be effectively used.

The compressor installation part 811 can be located such that at least a portion thereof overlaps the discharge duct 823 in the leftward and rightward directions. Since the discharge duct 823 is disposed at the rear portion of the circulation flow path part 820, when the compressor installation part 811 overlaps the discharge duct 823 in the leftward and rightward directions, the compressor installation part 811 can also be located at the rear portion of the base 800. Therefore, the water collection part 860 can be located in front of the compressor installation part 811, the space occupied by the water collection body 862 can be expanded, and thus, a larger amount of the condensed water can be stored.

The laundry treating apparatus can further include the front plate 410 (with reference to FIG. 5), and the water collection part 860 can be located between the front plate 410 and the compressor installation part 811.

The front plate 410 can be located at the front portion of the base 800 and the compressor installation part 811 can be located at the rear portion of the base 800, and thus, when the water collection part 860 is located between the front plate 410 and the compressor installation part 811, the condensed water accommodating capacity of the water collection body 862 can be increased.

The cabinet 100 can further include the left side panel 141 out of the side panels 140 configured to form the side surfaces of the cabinet 100141 (with reference to FIG. 12), and the compressor installation part 811 can be located between the left side panel 141 and the circulation flow path part 820.

Further, the control box 190 configured to control the motor 500 can be installed on the base 800 between the left side panel 141 and the water collection part 860, and at least a portion of the compressor installation part 811 can be located behind the control box 190.

In the conventional laundry treating apparatus, the motor 500 is installed on the base 800, and thus, the space in which the control box 190 is installed is not secured. Therefore, the control box 190 can be located in the upper portion of the cabinet 100. However, in the laundry treating apparatus, the motor 500 is located behind the drum 200 separately from the base 800, and thus, the control box 190 can be located on the base 800. Therefore, electric wires for connecting the control box 190 to the compressor 930, the motor 500, etc.

can be fixed to the base 800, and thus, problems, such as short circuit of the electric wires due to interference with other elements, can be prevented during operation of the laundry treating apparatus.

Further, the rear plate 420 (with reference to FIG. 8) located between the drum and the motor 500 so as to guide air discharged from the circulation flow path part 820 to the drum can be installed on the base 800. The compressor installation part 811 can be disposed between the water collection part 860 and the rear plate 420.

The reducer 600 connected to the motor 500 so as to reduce the power generated by the motor 500 to rotate the drum can be fixed to the rear surface of the rear plate 420, and the motor 500 can be fixed to the reducer 600 so as to be spaced apart from the rear plate 420.

Since the motor 500 is fixed to the rear plate 420, the water collection part 860 and the compressor installation part 811 can be disposed in the forward and rearward directions, as described above, and thus, the amount of the condensed water accommodated in the water collection body 862 can be increased.

Further, since the compressor installation part 811 is disposed between the water collection part 860 and the rear plate 420, the amount of the condensed water accommodated in the water collection body 862 can be increased.

The control box installation part 813 can be located such that at least a portion thereof overlaps the compressor installation part 811 in the leftward and rightward directions. Further, the control box installation part 813 can be disposed in front of the compressor installation part 811.

When the control box installation part 813 and the compressor installation part 811 are disposed to overlap each other in the leftward and rightward directions, the space on the base 800 can be more effectively used.

Further, the compressor 930 can be connected to the control box 190 so as to be controlled thereby. Therefore, a control wire for connecting the control box 190 to the compressor 930 can be shortened, noise can be reduced, and thus, control reliability can be improved.

The control box installation part 813 can be located between the left side panel 141 (with reference to FIG. 12) and the circulation flow path part 820. Further, the control box installation part 813 can be located between the water collection part 860 and the left side panel 141.

The control box 190 (with reference to FIG. 12) can be installed parallel to the left side panel 141 in the control box installation part 813. The control box 190 can be installed in the control box installation part 813 so as to come into contact with the left side panel 141.

When the control box installation part 813 is located between the circulation flow path part 820 and the left side panel 141, the space on the base 800 can be more effectively used, and thus, efficiency in space utilization can be improved. Further, when the control box installation part 813 is located between the water collection body 862 and the left side panel 141, a very narrow space formed between the water collection part 860 and the left side panel 141 can be used. Therefore, efficiency in space utilization can be improved.

Further, the control box 190 can be provided as a PCB substrate having a thin thickness, and, when the control box 190 is installed parallel to the left side panel 141 in the control box installation part 813, the space located between the water collection body 862 and the left side panel 141 can be used.

When the control box 190 comes into contact with the left side panel 141, the control box 190 can be supported by the left side panel 141. Therefore, release of the control box 190 from the control box installation part 813 due to vibration can be prevented.

The water cover 826 can be coupled to the open upper surface of the collection guide part 825, and the water cover 826 can support the first heat exchanger 910 so that the first heat exchanger 910 is spaced apart from the guide bottom surface 8255. The water cover 826 can also be coupled to the open upper surface of the collection guide part 825 so as to be spaced apart the guide bottom surface 8255, and inflow support planes 8253 configured to support the water cover 826 can be formed at the left and right sides of the front portion of the collection guide part 825. The inflow support planes 8253 can be provided on the side walls of the transfer duct 822, and can be recessed so that the water cover 826 is firmly supported by the inflow support planes 8253.

A transfer support plane 8254 can be provided behind the collection guide part 825. The transfer support plane 8254 can extend rearwards from the upper end of the guide partition 8256, and can be stepped downwards from the bottom surface of the transfer duct 822 in which the second heat exchanger 920 is installed, in consideration of the thickness of the water cover 826.

The front and rear portions of the water cover 826 can be supported by the inflow support planes 8253 and the transfer support plane 8254, and the water cover 826 can support the first heat exchanger 910 so that the first heat exchanger 910 is spaced apart from the guide bottom surface 8255. A detailed structure of the water cover 826 coupled to the inflow support planes 8253 and the transfer support plane 8254 will be described later.

The conventional dryer is limited in that the width of the transfer duct is less than half of the width of the base due to the space occupied by the driving unit. However, in the laundry treating apparatus, the driving unit is located behind the drum, the space which was occupied by the driving unit is usable, and thus, the width W1 of the transfer duct 822 in which air transfers can be expanded. Therefore, the transfer duct 822 can be provided such that the width W1 thereof is greater than or equal to half of the width W2 of the base 800.

The width W1 of the transfer duct 822 can indicate a distance between the side walls of the transfer duct 822 which extend upwards from the base 800 to form the side surfaces of the transfer duct 822. The width W1 of the transfer duct 822 can indicate the distance between the side walls thereof.

The width W1 of the transfer duct 822 can be understood as the width of the transfer duct 822 including the thicknesses of the side walls provided at both sides of the transfer duct 822. That is, the width W1 of the transfer duct 822 can indicate the maximum distance between the outer surface of the right side wall and the outer surface of the left side wall of the transfer duct 822. Further, the width W2 of the base 800 can indicate a distance between the left side surface and the right side surface of the base 800.

The width W1 of the transfer duct 822 is expanded, and thus, the flow rate of air passing through the transfer duct 822 per unit time can be increased. Therefore, air in the drum can be circulated at a higher velocity, and can thus shorten a drying time.

Further, as the width W1 of the transfer duct 822 is expanded, the widths of the first heat exchanger and the second heat exchanger installed in the transfer duct 822 can also be increased. Therefore, air transferred along the transfer duct 822 can be more rapidly dehumidified by the first heat exchanger, and can be more rapidly heated by the second heat exchanger.

That is to say, the transfer duct 822 is provided such that the width W1 thereof is greater than or equal to half of the width W2 of the base 800, and thus, the widths of the first heat exchanger and the second heat exchanger can also be increased, and a larger amount of air can be dehumidified, heated and supplied to the drum. Therefore, the drying time can be shortened, and drying efficiency can be increased.

The transfer duct 822 can be provided such that the width W1 thereof is greater than or equal to half of the width W3 of the front plate 410 (with reference to FIG. 5). Further, the transfer duct 822 can be provided such that the width W1 thereof is greater than or equal to half of the diameter W4 of the drum 200 (with reference to FIG. 5).

As described above, since the driving unit is located behind the drum 200 so as to be spaced apart from the base 800, the transfer duct 822 can be provided such that the width W1 thereof is greater than half of the width W3 of the front plate 410 or half of the diameter W4 of the drum 200.

Such an increase in the width W1 of the transfer duct 822 can increase the flow rate of circulating air, and can shorten a time taken to dry laundry.

As described above, in the conventional dryer, there is a limit in expanding the width of the transfer duct because of the space occupied by the driving unit. Therefore, it is difficult to dispose the transfer duct so as to overlap the center of rotation of the drum in the height direction.

However, in the laundry treating apparatus, the motor 500 is disposed in the rear portion of the laundry treating apparatus so as to be spaced apart from the base 800, and thus, the transfer duct 822 can be located to overlap the center of rotation of the drum 200 on the first axis M1 (with reference to FIG. 5) in the height direction (in the Z-axis direction).

The transfer duct 822 overlaps the center of rotation of the drum 200 in the height direction, and thus, the width W1 of the transfer duct 822 can be expanded. Therefore, the flow rate of air passing through the transfer duct 822 per unit time can be increased. Therefore, air in the drum can be circulated at a higher velocity, and thus, the drying time can be shortened.

Further, the transfer duct 822 overlaps the center of rotation of the drum 200 in the height direction, and thus, air transferred along the circulation flow path part 820 can transfer close to the center of rotation of the drum 200. Therefore, air discharged from the circulation flow path part 820 can be discharged close to the center of rotation of the drum 200. Therefore, hot air discharged from the circulation flow path part 820 can be more uniformly supplied to the drum 200, compared to the case in which air discharged from the circulation flow path part 820 is discharged away from the center of rotation of the drum 200.

Further, the first heat exchanger 910 (with reference to FIG. 13) or the second heat exchanger 920 (with reference to FIG. 14) can be located to overlap the center of rotation of the drum 200 in the height direction. When the transfer duct 822 is located to overlap the center of rotation of the drum 200 on the first axis M1, as described above, the first heat exchanger 910 and the second heat exchanger 920 located in the transfer duct 822 can be disposed to overlap the center of rotation of the drum 200 on the first axis M1.

The widths of the first heat exchanger 910 and the second heat exchanger 920 can be increased, and thereby, the amount of air dehumidified or heated per unit time can be increased. Therefore, the drying time can be shortened and drying efficiency can be improved.

The base 800 can include the steam generator installation part 812 configured to the space in which the steam generator 170 is mounted. The steam generator installation part 812 can be provided to be spaced apart from the circulation flow path part 820. The steam generator installation part 812 can protrude upwards from the base 800. The steam generator installation part 812 can be provided as brackets which can support the steam generator 170 in the forward and rearward directions. The steam generator 170 is inserted between the brackets, and can thus be firmly fixed to the steam generator installation part 812.

The steam generator installation part 812 can be disposed to overlap the water collection part 860 in the forward and rearward direction. Further, the steam generator installation part 812 can be disposed in front of the water collection part 860.

The steam generator installation part 812 can be disposed in front of the water collection communication hole 827. Further, the steam generator installation part 812 can be disposed in front of the first heat exchanger 910.

Further, the steam generator installation part 812 can be disposed to overlap the compressor installation part 811 in the forward and rearward directions. The steam generator installation part 812 can be disposed in front of the compressor installation part 811.

Further, the water collection part 860 can be disposed between the steam generator installation part 812 and the compressor installation part 811. That is, the steam generator installation part 812, the water collection part 860 and the compressor installation part 811 can be sequentially disposed in the forward and rearward directions on the base 800.

Further, the steam generator installation part 812 can be disposed to overlap the inflow duct 821 in the leftward and rightward directions. In addition, the steam generator installation part 812 can be located on one surface of the base 800 facing the front plate 410 (with reference to FIG. 26). Therefore, the steam generator 170 can be mounted in the steam generator installation part 812, and can thus be installed between the front plate 410 and the base 800. The steam generator 170 can be disposed in a space between the front plate 410 and the base 800, and thus, the space on the base 800 can be more effectively used.

When the steam generator installation part 812 is disposed, as described above, the steam generator installation part 812 can be provided adjacent to the front portion rather than the rear portion of the base 800, thereby being capable of more effectively supplying steam to the front portion of the base 800. Further, the steam generator installation part 812 is disposed in the remaining space between other elements, and thus, the space on the base 800 can be more effective used.

Further, the distance between the steam generator 170 and the control box 190 (with reference to FIG. 12) configured to control the steam generator 170 can be shortened, and a control wire connecting the control box 190 to the steam generator 170 can be reduced. Thereby, noise of the control wire can be reduced, and control reliability of the steam generator 170 can be improved.

Figure 18:
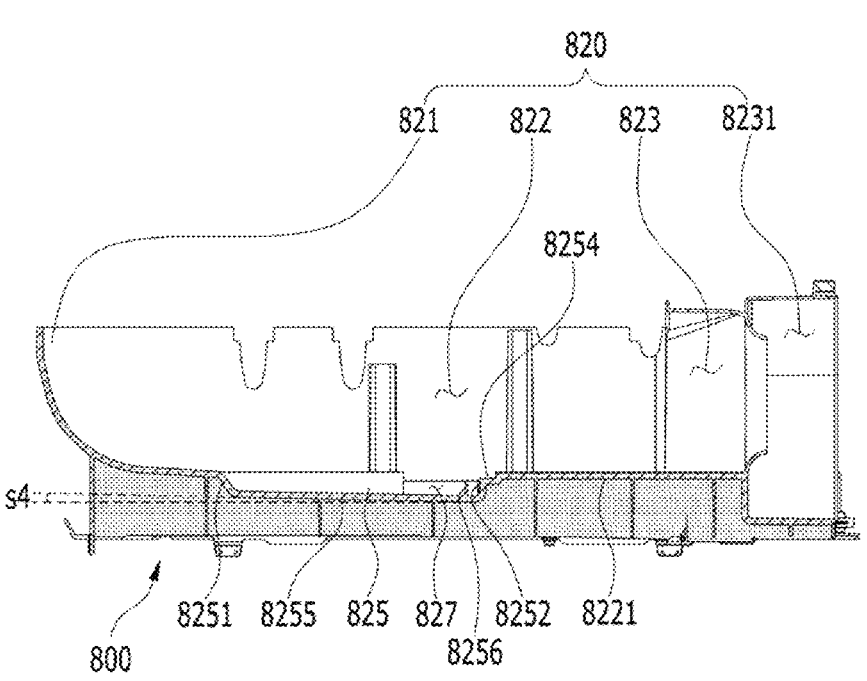
FIG. 18 is a cross-sectional view taken along line D-D of FIG. 17.
Figure 18:
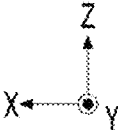

FIG. 18 is a cross-sectional view taken along line D-D of FIG. 17, as seen from the right.

Referring to FIG. 18, the transfer duct 822 can include the guide bottom surface 8255 recessed downwards so as to guide the condensed water to the water collection part 860. The collection guide part 825 can include the recessed stepped portion 8251 configured to form the front surface thereof.

Further, the bottom surface of the inflow duct 821 and the guide bottom surface 8255 can be connected by the recessed stepped portion 8251. A portion of the bottom surface of the transfer duct 822, which is recessed downwards so that the condensed water is transferred thereon, can be defined as the guide bottom surface 8255.

The guide bottom surface 8255 can extend rearwards from the recessed stepped portion 8251, and can be connected to the bottom surface of the transfer duct 822 facing the second heat exchanger 920 stepwise. That is, the guide bottom surface 8255 can be disposed at a lower position than the transfer bottom surface 8221. The collection guide part 825 can include the extending stepped portion 8252 configured to form the rear surface thereof. The guide bottom surface 8255 can be connected to the transfer bottom surface 8221 stepwise by the extending stepped portion 8252.

In other words, the guide bottom surface 8255 can be provided at a lower position than the bottom surface of the inflow duct 821 and the transfer bottom surface 8221. That is, among the guide bottom surface 8255, the bottom surface of the inflow duct 821 and the transfer bottom surface 8221, the guide bottom surface 8255 can be located closest to the ground.

The extending stepped portion 8252 and the recessed stepped portion 8251 can form the space of the collection guide part 825 in which the condensed water is accommodated.

The guide bottom surface 8255 can form the bottom surface of the collection guide part 825 which guides the condensed water generated by the first heat exchanger to the water collection part 860. The collection guide part 825 can include the water collection communication hole 827 formed through the side wall of the transfer duct 822 so as to allow the circulation flow path part 820 and the water collection part 860 to communicate with each other. The water collection communication hole 827 can be provided between the recessed stepped portion 8251 and the extending stepped portion 8252.

Further, the guide partition 8256 configured to protrude upwards from the guide bottom surface 8255 so as to prevent the condensed water flowing on the guide bottom surface 8255 from overflowing towards the spot at which the second heat exchanger is installed can be provided between the recessed stepped portion 8251 and the extending stepped portion 8252.

The guide partition 8256 can be spaced apart from the extending stepped portion 8252 by a designated distance, and thereby, overflow of the condensed water flowing through the collection guide part 825 towards the second heat exchanger can be primarily prevented by the guide partition 8256, and can then be secondarily prevented by the extending stepped portion 8252.

The guide bottom surface 8255 can be provided such that the distance between the guide bottom surface 8255 and the ground decreases in the direction from the recessed stepped portion 8251 to the extending stepped portion 8252, as shown in this figure. That is, the guide bottom surface 8255 can be inclined downwards towards the water collection communication hole 827. In other words, the guide bottom surface 8255 can have a gradient so as to guide the condensed water towards the water collection communication hole 827 by gravity. An inclination formed between the guide bottom surface 8255 and the ground in the forward and rearward directions can be defined as a fourth inclination angle s4.

The transfer support plane 8254 connected to the bottom surface of the transfer duct 822 facing the second heat exchanger 920 stepwise can be formed at the upper end of the extending stepped portion 8252. The transfer support plane 8254 can support the water cover coupled to the upper portion of the collection guide part 825.

Figure 19:
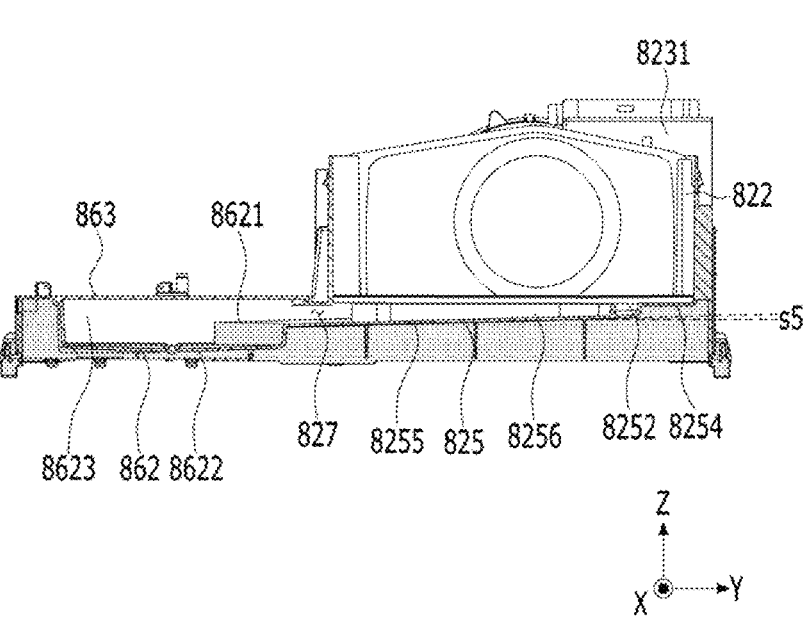
FIG. 19 is a cross-sectional view taken along line C-C of FIG. 17.

FIG. 19 is a cross-sectional view taken along line C-C of FIG. 17, as seen from the front.

Referring to FIG. 19, as described above, the circulation flow path part 820 can be provided on one side of the base 800, and the water collection part 860 configured to collect condensed water generated in the circulation flow path part 820 can be provided on the other side of the base 800. The water collection part 860 and the circulation flow path part 820 can communicate with each other by the water collection communication hole 827 formed through the side wall of the circulation flow path part 820.

The water collection body 862 can include the connection flow path 8621 configured to connect the water collection bottom surface 8622 to the water collection communication hole 827.

The collection guide part 825 configured to guide the condensed water generated by the first heat exchanger to the water collection part 860 can be formed on the bottom surface of the transfer duct 822. The guide bottom surface 8255 forming the bottom surface of the collection guide part 825 can be provided to have an inclination so as to transfer the condensed water to the water collection communication hole 827 by gravity.

The guide bottom surface 8255 can be provided such that the distance between the guide bottom surface 8255 and the ground decreases as the distance from the water collection communication hole 827 decreases. That is, the distance between the guide bottom surface 8255 and the ground can increases as the distance from the water collection communication hole 827 increases. In other words, the guide bottom surface 8255 can be inclined such that the height thereof decreases as the distance from the water collection communication hole 827 decreases, and owing to such a gradient, the condensed water on the guide bottom surface 8255 can be naturally transferred to the water collection communication hole 827, and the condensed water having passed through the water collection communication hole 827 can be stored in the water collection body 862.

Among inclinations formed between the guide bottom surface 8255 and the ground, an inclination formed between the guide bottom surface 8255 and the ground in the direction from the water collection guide part 825 to the water collection body 862 can be defined as a fifth inclination angle s5. That is, an inclination formed between the guide bottom surface 8255 and the ground in the width direction can be defined as the fifth inclination angle s5.

The fourth inclination angle s4, i.e., the inclination of the guide bottom surface 8255 in the forward and rearward direction defined in FIG. 18, and the fifth inclination angle s5 of the guide bottom surface 8255 can be provided as angles at which the condensed water flowing on the guide bottom surface 8255 can flow towards the water collection communication hole 827 without being stagnant at a specific position of the guide bottom surface 8255. For example, the fifth inclination angle s5 can be equal to the fourth inclination angle s4, or can be equal to or less than the fourth inclination angle s4.

The guide bottom surface 8255 can be connected parallel to the connection flow path 8621 through the water collection communication hole 827. The connection flow path 8621 can be provided to be stepped upwards from the circumference of the water collection bottom surface 8622 forming the bottom surface of the water collection body 862, and can be connected to the guide bottom surface 8255. The connection flow path 8621 can be inclined with respect to the ground in the same manner as the guide bottom surface 8255. Further, an inclination angle between the connection flow path 8621 and the ground can be equal to the fifth inclination angle s5.

That is, the guide bottom surface 8255 and the connection flow path 8621 can be connected into one surface through the water collection communication hole 827, and the water collection bottom surface 8622 can be stepped downwards from such a surface so as to store the condensed water. The water collection bottom surface 8622 can be disposed at a lower position than the guide bottom surface 8255.

Further, the connection flow path 8621 can be provided to come into contact with the water collection side surface 8623. That is, the connection flow path 8621 can be located between the water collection side surface 8623 and the water collection communication hole 827. Therefore, the connection flow path 8621 can guide the condensed water having entered through the water collection communication hole 827 so that the condensed water flows along the water collection side surface 8623.

The connection flow path 8621 can guide the condensed water having passed through the water collection communication hole 827 so that the condensed water does not directly fall to the water collection bottom surface 8622, and flows along the circumference of the water collection body 862 while passing through the upper surface of the connection flow path 8621. When the condensed water is accelerated in the circumferential direction of the water collection body 862 while passing over the connection flow path 8621, the condensed water can flow while rotating along the circumference of the water collection body 862.

When the condensed water flows while rotating along the circumference of the water collection body 862, foreign substances or lint included in the condensed water can be naturally accumulated on the side surface of the water collection body 862. The foreign substances are not moved to the center of the water collection body 862 provided with the pump installed therein, and are accumulated on the side surface of the water collection body 862 by the rotating flow, thereby being capable of preventing occurrence of an error in operation of the pump due to the foreign substances.

Further, when the pump is operated, the condensed water stored in the water collection body 862 can be transferred to the water collection communication hole 827 by centrifugal force, and, in this case, the connection flow path 8621 is stepped from the water collection bottom surface 8622 and can thus prevent the condensed water from flowing to the water collection communication hole 827.

In other words, the connection flow path 8621 can guide the condensed water entering the water collection body 862 through the water collection communication hole 827 so that the condensed water flows along the water collection side surface 8623, and can prevent the condensed water stored in the water collection body 862 from overflowing towards the water collection communication hole 827.

Figure 20:
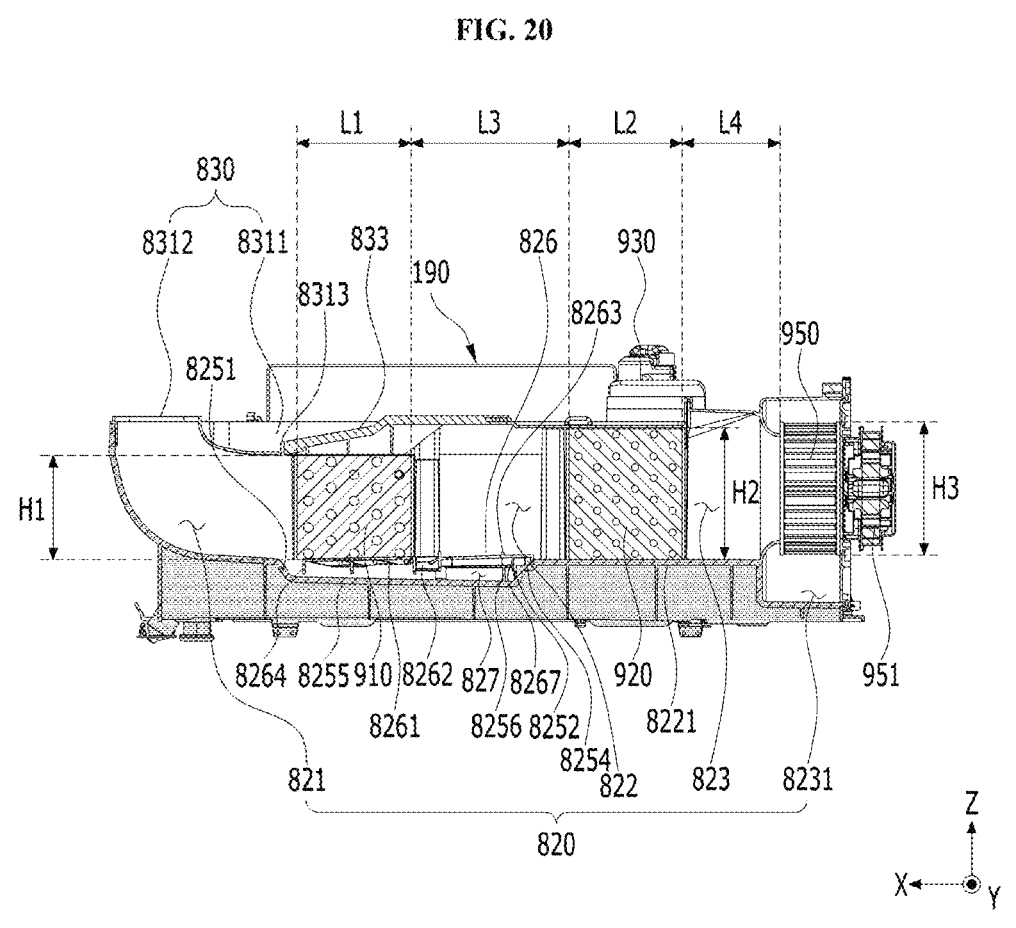

FIG. 20 is a cross-sectional view taken along line B-B of FIG. 14A, as seen from the right. FIG. 20 illustrates the elements, such as the first heat exchanger, the second heat exchanger, the water cover, the duct cover, the compressor, etc., installed on the base and, when a description of FIG. 20 is given, FIGS. 14A, 14B, 15, and 18 will be referred to. Hereinafter, elements added in FIG. 20 will be mainly described.

In the conventional laundry treating apparatus, the water cover configured to support the first heat exchanger so that the first heat exchanger is spaced apart from the bottom surface of the circulation flow path part is located under the second heat exchanger, and can thus support the second heat exchanger also. Therefore, condensed water generated by the first heat exchanger can flow to the second heat exchanger, or can come into contact with the second heat exchanger. Thereby, the condensed water can be evaporated again, and can then enter the inside of the drum.

In some cases, to maintain the lower moisture content of air supplied to the inside of the drum in order to improve drying efficiency of laundry and, in the conventional laundry treating apparatus, heat exchange efficiency of the heat exchange unit may be reduced and drying efficiency of the entirety of the laundry treating apparatus may be reduced.

Referring to FIG. 20, the water cover 826 can be installed under the first heat exchanger 910. The first heat exchanger 910 can be installed to be supported by the water cover 826. The water cover 826 can be coupled to the open upper surface of the collection guide part 825 so as to prevent the condensed water transferred through the collection guide part 825 from coming into contact with the first heat exchanger 910.

The water cover 826 can be provided to be spaced apart from the second heat exchanger 920. The water cover 826 can support the first heat exchanger 910, and can be spaced apart from the second heat exchanger 920 so as to prevent the condensed water from evaporating again around the second heat exchanger 920.

Therefore, the condensed water can be effectively collected in the water collection part 860, and heat exchange of the second heat exchanger 920 with the condensed water can be prevented and thus heat exchange efficiency of the second heat exchanger 920 can be improved. Further, as heat exchange efficiency of the second heat exchanger 920 is increased, drying efficiency of the entirety of the laundry treating apparatus can be improved.

The water cover 826 can be installed to be supported by the inflow support planes 8253 and the transfer support plane 8254 formed at the collection guide part 825, and can thus be spaced apart from the guide bottom surface 8255. A shield body 8263 of the water cover 826 can be supported by the transfer support plane 8254 formed at the upper end of the extending stepped portion 8252.

The water cover 826 can include a water transmission body 8261 configured to come into contact with the lower surface of the first heat exchanger 910 so as to guide the condensed water generated by the first heat exchanger 910 to the collection guide part 825, and the shield body 8263 configured to extend rearwards from the water transmission body 8261 so as to shield the open upper surface of the collection guide part 825

The water transmission body 8261 can include barrier ribs 8264 configured to extend from the water transmission body 8261 in a direction away from the first heat exchanger 910. The barrier ribs 8264 can prevent air having entered through the inflow duct 821 from entering the collection guide part 825 without passing through the first heat exchanger 910. A plurality of barrier ribs 8264 can be provided to be spaced apart from each other in the forward and rearward directions. That is, the plurality of barrier ribs 8264 can be disposed sequentially from front to rear so as to be spaced apart from each other.

Further, the cover partition 8267 extending downwards from the shield body 8263 can be disposed between the guide partition 8256 and the extending stepped portion 8252. The cover partition 8267 can prevent the condensed water transferred on the collection guide part 825 from being released from the collection guide part 825 and then overflowing towards the second heat exchanger 920 due to the volume of circulating air passing through the transfer duct 822.

The cover partition 8267 together with the guide partition 8256 located in front thereof and the extending stepped portion 8252 located therebehind can prevent overflow of the condensed water.

The width W1 of the transfer duct 822 (with reference to FIG. 17) can be expanded to be greater than or equal to half of the width W2 of the base 800 (with reference to FIG. 17), and thus, the widths of the first heat exchanger 910 and the second heat exchanger 920 installed in the transfer duct 822 can also be expanded.

As the widths of the first heat exchanger 910 and the second heat exchanger 920 are expanded, air flowing along the circulation flow path part 820 can be dehumidified or heated over a larger area. Therefore, although the lengths L1 and L2 of the first heat exchanger 910 and the second heat exchanger 920 in the forward and rearward directions are slightly reduced, the first heat exchanger 910 and the second heat exchanger 920 can exchange heat with the same or larger amount of air, compared to the conventional heat exchanger.

The laundry treating apparatus can further include the circulation flow path fan 950 disposed in the circulation flow path part 820 to generate air flow so as to discharge air in the circulation flow path part 820 towards the drum 200.

The circulation flow path fan 950 can be disposed to be spaced apart from the second heat exchanger 920 opposite to the first heat exchanger 910. That is, air discharged from the drum 200 can sequentially pass through the first heat exchanger 910, the second heat exchanger 920 and the circulation flow path fan 950. In other words, air flow can be generated by the circulation flow path fan 950 located at the downstream region of the circulation flow path part 820, and air in the circulation flow path part 820 can be discharged towards the drum 200 through the first heat exchanger 910 and the second heat exchanger 920 due to such air flow.

The distance L3 between the first heat exchanger 910 and the second heat exchanger 920 can be greater than the distance L4 between the second heat exchanger 920 and the circulation flow path fan 950.

When the distance L3 between the first heat exchanger 910 and the second heat exchanger 920 is not sufficiently secured, the possibility that water condensed by the first heat exchanger 910 scatters towards the second heat exchanger 920 is increased. Therefore, heat loss of the second heat exchanger 920 is caused, and thus, drying efficiency can be reduced.

However, when the distance L3 between the first heat exchanger 910 and the second heat exchanger 920 is greater than the distance L4 between the second heat exchanger 920 and the circulation flow path fan 950, a space between the first heat exchanger 910 and the second heat exchanger 920 can be secured. Therefore, scattering of the condensed water generated by the first heat exchanger 910 towards the second heat exchanger 920 can be minimized, and thus, reduction in drying efficiency can be prevented.

As described above, the circulation flow path part 820 can include the inflow duct 821, the discharge duct 823 and the transfer duct 822. The first heat exchanger 910 and the second heat exchanger 920 can be disposed in the transfer duct 822, and the circulation flow path fan 950 can be disposed in the discharge duct 823. That is, the circulation flow path fan 950 can be disposed at the downstream region of the circulation flow path part 820.

Since the circulation flow path fan 950 can be disposed at the downstream region of the circulation flow path part 820, air flowing in the circulation flow path part 820 can be smoothly supplied to the drum 200 without being disturbed by the first heat exchanger 910 or the second heat exchanger 920. That is, air flow loss can be minimized.

Further, the discharge duct 823 can include the air blowing part 8231 located at the rear part of the discharge duct 823 so as to discharge air to the outside of the circulation flow path part 820. The air blowing part 8231 can have an open upper surface, and can thus discharge air upwards. The circulation flow path fan 950 can be disposed in the air blowing part 8231.

When the circulation flow path fan 950 can be disposed in the air blowing part 8231 located at the rear part of the discharge duct 823, the longer distance L4 between the second heat exchanger 920 and the circulation flow path fan 950 can be secured. Therefore, a space can be secured in the upstream region compared to the circulation flow path fan 950, and thus, flow loss can be reduced.

Further, when the distance L4 between the second heat exchanger 920 and the circulation flow path fan 950 is increased, the distance L3 between the first heat exchanger 910 and the second heat exchanger 920, which is greater than the distance L4, can be increased. Therefore, scattering of the condensed water generated by the first heat exchanger 910 towards the second heat exchanger 920 can be prevented, and thus, reduction in heat exchange efficiency can be prevented.

As the length L2 of the second heat exchanger 920 in the forward and rearward directions is reduced, the distance L3 between the first heat exchanger 910 and the second heat exchanger 920 can be greater than or equal to the length L2 of the second heat exchanger 920 in the forward and rearward directions.

Further, the distance L3 between the first heat exchanger 910 and the second heat exchanger 920 can be equal to or greater than the length L1 of the first heat exchanger 910 in the forward and rearward directions.

As the width W1 of the transfer duct 822 is expanded, the width of the second heat exchanger 920 can also be expanded. Further, as the width of the second heat exchanger 920 is expanded, the length L2 of the second heat exchanger 920 in the forward and rearward directions can be reduced, and thus, the distance L3 between the first heat exchanger 910 and the second heat exchanger 920 can be increased.

Since the space between the first heat exchanger 910 and the second heat exchanger 920 is increased, contact of the condensed water generated by the first heat exchanger 910 with the second heat exchanger 920 can be prevented. When the condensed water comes into contact with the second heat exchanger 920, the second heat exchanger 920 exchanges heat with the condensed water, and thus, heat exchange efficiency of the second heat exchanger 920 can be reduced. However, since the space between the first heat exchanger 910 and the second heat exchanger 920 is expanded, reduction in heat exchange efficiency of the second heat exchanger 920 can be prevented.

Further, the second heat exchanger 920 is provided to heat air. Since a lot of energy is consumed to heat air, increase in heat exchange efficiency of the second heat exchanger 920 is important in increasing efficiency of the entirety of the laundry treating apparatus.

However, as the area of the second heat exchanger 920 coming into contact with elements rather than air increases, a quantity of heat may be consumed to heat the elements rather than the air. Therefore, the second heat exchanger 920 can be installed to minimize the area thereof coming into contact with other elements.

When the second heat exchanger 920 is installed in the transfer duct 822, the lower surface of the second heat exchanger 920 can be supported by the transfer duct 822. Therefore, when the area of the lower surface of the second heat exchanger 920 is reduced, loss of the quantity of heat of the second heat exchanger 920 due to thermal conduction can be prevented.

Therefore, the length L2 of the second heat exchanger 920 in the forward and rearward directions can be less than or equal to the length L1 of the first heat exchanger 910 in the forward and rearward directions. Thereby, heat loss from the lower surface of the second heat exchanger 920 can be reduced. Further, when the length L2 of the second heat exchanger 920 in the forward and rearward directions is reduced, the distance L3 between the first heat exchanger 910 and the second heat exchanger 920 can be increased, and the condensed water can be prevented from coming into contact with the second heat exchanger 920.

The diameter H3 of the circulation flow path fan 950 can be greater than or equal to the height H2 of the second heat exchanger 920. When the width W1 of the transfer duct 822 is increased, the amount of air flowing along the circulation flow path part 820 can be increased. Then, the circulation flow path fan 950 having the increased diameter H3 can increase the circulation rate of air.

The outer circumferential surface of the circulation flow path fan 950 can be disposed to overlap the transfer duct 822 in the forward and rearward directions. This can indicate that the left end and the right end of the outer circumferential surface of the circulation flow path fan 950 overlap the transfer duct 822 in the forward and rearward directions. That is, such an overlap of the outer circumferential surface of the circulation flow path fan 950 and the transfer duct 822 in the forward and rearward directions can indicate that the circulation flow path fan 950 does not protrude outwards from the side walls of the transfer duct 822 and are disposed inside the transfer duct 822, as seen from the front.

That is, this can indicate that the circulation flow path fan 950 is located inside the extensions of the transfer duct 822. Therefore, the path of the air flow generated by the circulation flow path fan 950 can be shortened. Therefore, generation of flow loss can be prevented.

Further, the center of rotation of the circulation flow path fan 950 can be disposed parallel to the center of the transfer duct 822 in the width direction. Further, the center of rotation of the circulation flow path fan 950 can be disposed parallel to the center of the first heat exchanger 910 or the second heat exchanger 920 in the width direction.

That is, the circulation flow path fan 950 is disposed parallel to the centers of the transfer duct 822, the first heat exchanger 910 and the second heat exchanger 920, and thus, air passing through the transfer duct 822 can symmetrically enter the circulation flow path fan 950. In this case, the path of the air flow from the inside of the transfer duct 822 to the drum 200 can be shortened, and thus, flow loss can be reduced.

Figure 21:
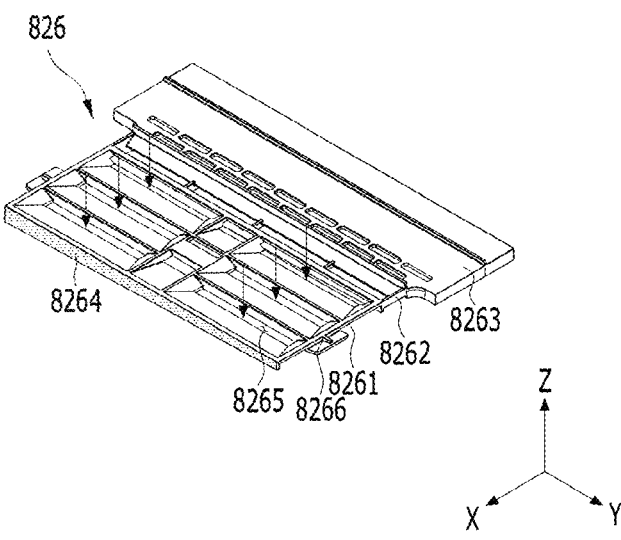
FIG. 21 is a perspective top view illustrating an example of a water cover.
Figure 22:
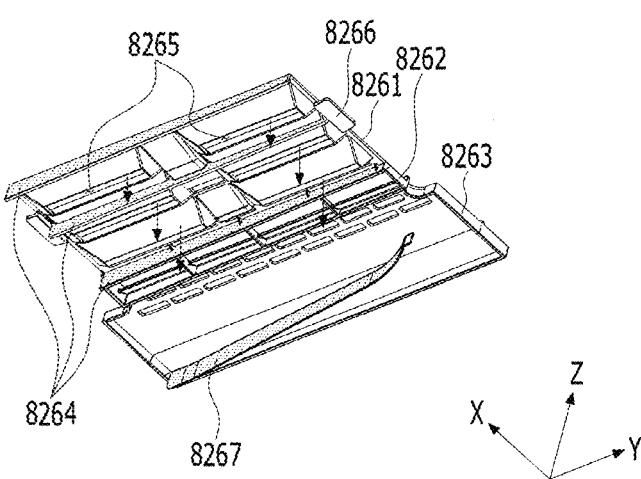
FIG. 22 is a perspective bottom view of the water cover.

FIG. 21 is a perspective top view of the water cover, and FIG. 22 is a perspective bottom view of the water cover.

Referring to FIG. 21, the water cover 826 can include the water transmission body 8261 provided to support the first heat exchanger 910 and to guide the condensed water generated by the first heat exchanger 910 to the collection guide part 825 through the water cover 826, the shield body 8263 provided at the rear of the water transmission body

8261 so as to shield the open upper surface of the collection guide part 825, and a connection body 8262 configured to connect the water transmission body 8261 to the shield body 8263.

The first heat exchanger 910 can be supported by the upper surface of the water transmission body 8261. Water transmission holes 8265 can be formed through the water transmission body 8261. A plurality of water transmission holes 8265 can be provided in various shapes as long as it can easily transmit the condensed water generated by the first heat exchanger 910. The water transmission holes 8265 can be provided as communication holes so as to guide the condensed water generated by the first heat exchanger 910 to the collection guide part 825 through the water transmission body 8261.

Support ribs 8266, which protrude from the side surfaces of the water transmission body 8261 and support the water transmission body 8261 spaced apart from the guide bottom surface 8255, can be disposed on the side surfaces of the water transmission body 8261. The support ribs 8266 can protrude from the left and right side surfaces of the water transmission body 8261. Referring to FIGS. 16 and 17, the support ribs 8266 can be supported by the inflow support planes 8253 provided at the side surfaces of the collection guide part 825.

The rear portion of the shield body 8263 can be supported by the transfer support plane 8254 of the collection guide part 825. The support ribs 8266 are supported by the inflow support planes 8253, the shield body 8263 is supported by the transfer support plane 8254, and thereby, the water cover 826 can withstand the load of the first heat exchanger 910, and can support the first heat exchanger 910 so that the first heat exchanger 910 is spaced apart from the collection guide part 825.

Referring to FIG. 22, the water cover 826 can further include the barrier ribs 8264 configured to extend downwards from the lower surface of the water transmission body 8261. The barrier ribs 8264 can be installed between the space between the guide bottom surface 8255 and the water transmission body 8261. During the drying cycle, air discharged forwards from the drum 200 is dehumidified by the first heat exchanger 910, is heated by the second heat exchanger 920, and is then supplied again to the rear portion of the drum 200. In order to improve heat exchange efficiency and drying efficiency, air discharged from the drum 200 can pass through only a space in which the first heat exchanger 910 and the second heat exchanger 920 are installed.

However, the collection guide part 825 configured to guide the condensed water to the water collection body 862 can be formed on the bottom surface of the transfer duct 822 in which the first heat exchanger 910 and the second heat exchanger 920 are installed, as described above. Thereby, there is the possibility that air discharged forwards from the drum 200 enters the collection guide part 825 located under the first heat exchanger 910. When the discharged air enters the collection guide part 825, the corresponding air may not sufficiently exchange heat with the first heat exchanger 910, and thus, the dehumidification degree of the air is reduced. In this case, drying performance can be reduced due to reduction in heat exchange efficiency.

Therefore, it is desirable to prevent air from entering into the space between the guide bottom surface 8255 and the water transmission body 8261 supporting the first heat exchanger 910. The barrier ribs 8264 extending downwards from the water transmission body 8261 can be installed in the above space between the water transmission body 8261 and the guide bottom surface 8255, and can thus prevent excessive inflow of air into the space. Here, a plurality of barrier ribs 8264 can be provided to be spaced apart from each other in the forward and rearward directions.

The barrier ribs 8264 can be provided to be spaced apart from the guide bottom surface 8255 so as not to disturb the flow of the condensed water transferred on the guide bottom surface 8255. That is, the barrier ribs 8264 can prevent circulating air from leaking to the collection guide part 825 by blocking a designated part of the space formed between the water transmission body 8261 and the guide bottom surface 8255.

The shield body 8263 can include the cover partition 8267 configured to extend downwards from the lower surface thereof. The cover partition 8267 can be formed in a structure corresponding to the shape of the extending stepped portion 8252 of the collection guide part 825. In the case in which the extending stepped portion 8252 is provided parallel to the recessed stepped portion 8251, the cover partition 8267 can be provided parallel to the extending stepped portion 8252. In the case in which the extending stepped portion 8252 is provided to gradually get closer to the recessed stepped portion 8251 in the direction from left to right, the cover partition 8267 can be provided to gradually get closer to the water transmission body 8261 in the direction from left to right in the same manner as the extending stepped portion 8252.

When the water cover 826 is installed above the collection guide part 825, the cover partition 8267 can be located in front of the extending stepped portion 8252. Further, the cover partition 8267 can be located between the extending stepped portion 8252 and the guide partition 8256.

The cover partition 8267 can prevent the condensed water within the collection guide part 825 from overflowing towards the second heat exchanger 920 due to the volume of air moving from front to rear when air in the drum 200 is circulated.

The condensed water located in the collection guide part 825 can be transferred rearwards by air flowing towards the transfer duct 822. Here, the guide partition 8256, the cover partition 8267 and the extending stepped portion 8252 can prevent the condensed water from flowing to the outside of the collection guide part 825 and thus overflowing towards the second heat exchanger 920.

The barrier ribs 8264 can extend downwards from the water transmission body 8261 to different lengths depending on the positions of the barrier ribs 8264. The barrier ribs 8264 can block the space between the water cover 826 and the guide bottom surface 8255 while not disturbing the flow of the condensed water on the collection guide part 825. Since the guide bottom surface 8255 can be inclined towards the water collection communication hole 827, as described above, when the barrier ribs 8264 extend from the water transmission body 8261 by the same length, the distance between the guide bottom surface 8255 and the barrier ribs 8264 increases as the distance from the water collection communication hole 827 decreases. Therefore, air can enter the corresponding space, and thus, heat exchange efficiency can be reduced.

Therefore, the lengths of the barrier ribs 8264 extending from the water transmission body 8261 increase as the distance from the water collection communication hole 827 decreases. As shown in this figure, the length of the barrier ribs 8264 extending from the water transmission body 8261 can be increased in the direction from right to left (in the Y-axis direction). Further, when a plurality of barrier ribs 8264 is provided at corresponding positions in the forward and rearward directions (i.e., in the X-axis direction, the barrier rib 8264 located at a rear position can extend to a greater length than the barrier rib 8264 located at a front position. That is, the barrier ribs 8264 can be provided to have lengths corresponding to the inclination of the guide bottom surface 8255 facing the ends of the barrier ribs 8264.

The barrier ribs 8264 can be provided to correspond to the inclination of the guide bottom surface 8255, as described above, and thereby, reduction in heat exchange efficiency due to inflow of air in the drum 200 into the collection guide part 825 without passing through the first heat exchanger 910 can be prevented.

Figures 23A, 23B:
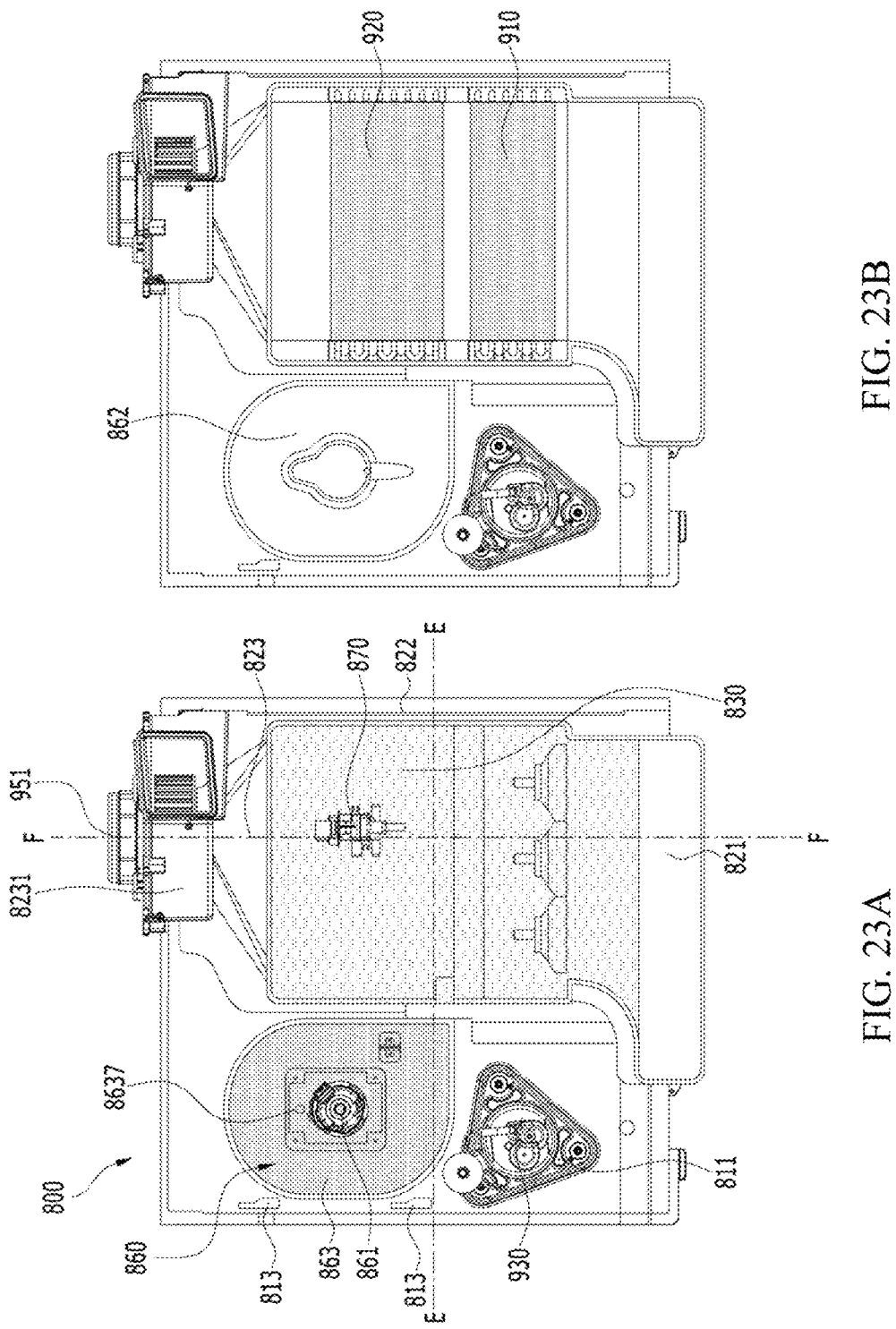
FIGS. 23A and 23B are top views illustrating an example of a base.
Figure 24:
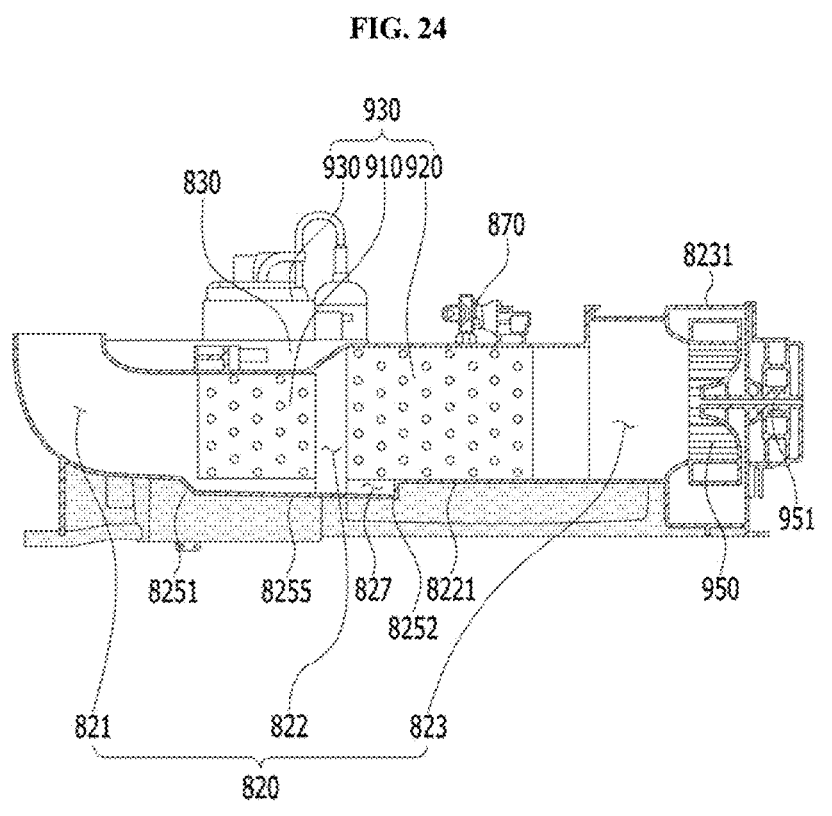
Figure 25:
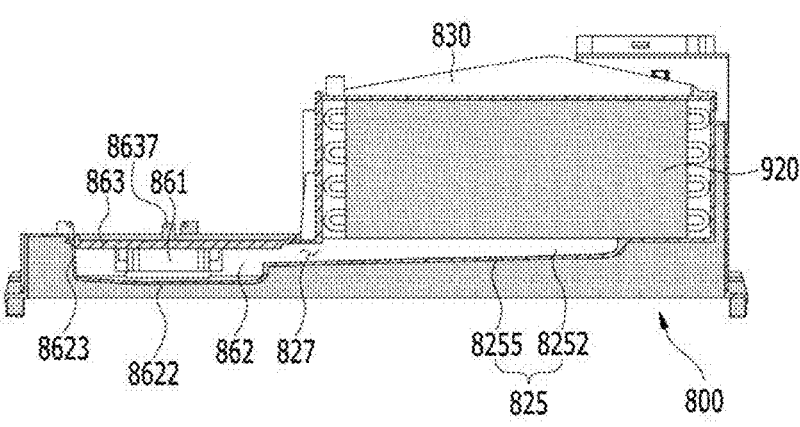
FIG. 25 is a cross-sectional view taken along line E-E of FIG. 23A, as seen from the front.

FIGS. 23A and 23B illustrate a laundry treating apparatus, and specifically, are top views of a base on which a compressor is disposed in front of a water collection part. FIG. 24 is a cross-sectional view taken along line F-F of FIG. 23A, as seen from the right. FIG. 25 is a cross-sectional view taken along line E-E of FIG. 23A, as seen from the front.

The illustration shown in FIGS. 23A and 23B will be understood with reference to FIGS. 14A and 14B, the illustration shown in FIG. 24 will be understood with reference to FIG. 15, and the illustration shown in FIG. 25 will be understood with reference to FIG. 20. Other elements except for modified elements in this implementation, which are substantially the same as those in the former implementation in which the compressor is located behind the water collection part, will be denoted by the same reference numerals even though they are denoted in different drawings. Hereinafter, the disposition relationships between a compressor installation part and the water collection part will be mainly described.

Referring to FIGS. 23A and 23B, a circulation flow path part 820 configured to circulate air in a drum can be disposed on one side of a base 800, and a compressor installation part 811 spaced apart from the circulation flow path part 820 to accommodate a compressor 930 mounted therein and a water collection part 860 can be disposed on the other side of the base 800.

The compressor installation part 811 can be disposed such that at least a portion thereof overlaps the water collection part 860 in the forward and rearward directions. Further, the compressor installation part 811 can be disposed in front of the water collection part 860.

When the water collection part 860 is disposed to overlap the compressor installation part 811 in the forward and rearward directions, the capacity of the water collection part 860 to accommodate the condensed water can be increased. Therefore, the frequency of drainage of the condensed water by a user can be reduced, and thus, user convenience can be increased.

Since compression efficiency of the compressor 930 is reduced when the compressor 930 is overheated, it is favorable to properly cool the compressor 930. Since the second heat exchanger 920 serves to heat the air in the drum, the disposition of the compressor 930 adjacent to the second heat exchanger 920 can be disadvantageous for cooling of the compressor 930.

In the case in which the compressor installation part 811 is disposed in front of the water collection part 860, the distance between the compressor 930 and the second heat exchanger 920 can be increased compared to the case in which the compressor installation part 811 is disposed behind the water collection part 860. Therefore, the disposition of the compressor installation part 811 in front of the water collection part 860 can be advantageous for cooling of the compressor 930. When cooling efficiency of the compressor 930 is increased, compressor efficiency of the compressor 930 can be increased, heat exchange efficiency of the second heat exchanger 920 can also be increased, and thus, drying efficiency of the laundry treating apparatus can be improved.

The circulation flow path part 820 can include an inflow duct 821 configured such that air discharged from the drum flows thereinto, a discharge duct 823 configured to discharge the air towards the drum, and a transfer duct 822 configured to connect the inflow duct 821 to the discharge duct 823.

A first heat exchanger 910 and the second heat exchanger 920 can be installed in the transfer duct 822. The first heat exchanger 910 and the second heat exchanger 920 can sequentially exchange heat with air discharged from the drum so as to dehumidify and heat the air.

The water collection part 860 can be disposed such that at least a portion thereof overlaps the second heat exchanger 920 in the leftward and rightward directions. Further, the compressor installation part 811 can be disposed such that at least a portion thereof overlaps the first heat exchanger 910 in the leftward and rightward directions.

When the water collection part 860 is disposed to overlap the second heat exchanger in the leftward and rightward directions and the compressor installation part 811 is disposed to overlap the first heat exchanger 910 in the leftward and rightward directions, the distance between the compressor installation part 811 and the second heat exchanger 920 can be increased, as described above. Therefore, cooling efficiency of the compressor 930 can be improved.

Further, when the compressor installation part 811 is disposed to overlap the first heat exchanger 910 and the water collection part 860 is disposed to overlap the compressor installation part 811 in the forward and rearward directions, the water collection part 860 can be located at the rear portion of the base 800.

When the water collection part 860 is located at the rear portion of the base 800, the distance between a water storage tank (with reference to FIG. 3) configured to store condensed water so that a user can remove the condensed water stored in the water collection part 860 and the water collection part 860 is reduced, and thus, the length of a flow path connecting the water storage tank to the water collection part 860 can be reduced, and power consumption of a pump 861 configured to move water upwards can be reduced.

In some examples, where a laundry treating apparatus, such as a washer, is installed in a space (for example, a boiler room, a bathroom or the like) in which water is capable of being directly drained, a user may not separately drain water used in washing. In some implementations, where the laundry treating apparatus is installed in the space in which water is capable of being directly drained in the same manner as the washer, the condensed water can be discharged from the water collection part 860 directly to the outside of the cabinet using the pump 861.

In the case in which water is discharged from the water collection part 860 directly to the outside of the cabinet, when the water collection part 860 is located adjacent to the rear surface of the cabinet, power consumed by the pump 861 can be reduced.

Further, the water collection part 860 can be disposed such that at least a portion thereof overlaps the discharge duct 823 in the leftward and rightward directions. In addition, the compressor installation part 811 can be disposed such that at least a portion thereof overlaps the inflow duct 821.

The discharge duct 823 can be located at the rear portion of the circulation flow path part 820. Further, the inflow duct

821 can be located at the front portion of the circulation flow path part 820. Therefore, when the water collection part 860 overlaps the discharge duct 823 in the leftward and rightward directions and the compressor installation part 811 overlaps the inflow duct 821 in the leftward and rightward directions, the compressor installation part 811 can be disposed at the front portion of the base 800. Further, the water collection part 860 can be disposed at the rear portion of the base 800.

Therefore, cooling efficiency can be increased and thus drying efficiency can be improved, as described above. Further, power consumption of the pump 861 can be reduced.

In addition, the water collection part 860 can be disposed to overlap a control box installation part 813 in the leftward and rightward directions. When the water collection part 860 is disposed to overlap the control box installation part 813, a control wire connected to the pump 861 can be shortened, and thus, control reliability can be increased.

The compressor 930 installed in the compressor installation part 811 can generate a large amount of heat. When an excessive amount of heat is applied to a control box, noise is generated, and thus, reliability can be reduced. Therefore, the compressor installation part 811 can be disposed in front of the control box installation part 813. Deterioration of reliability of the control box can be prevented by locating the compressor 930 and the control box to be spaced apart from each other.

Further, the water collection part 860 can be disposed between the compressor installation part 811 and the rear plate 420 (with reference to FIG. 5). When the water collection part 860 is disposed between the compressor installation part 811 and the rear plate 420, the compressor installation part 811, the water collection part 860 and the rear plate 420 can be sequentially disposed in the forward and rearward directions.

Therefore, the compressor installation part 811 can be disposed at the front portion of the base 800, and the water collection part 860 can be disposed at the rear portion of the base 800. Therefore, cooling efficiency of the compressor 930 can be increase, and power consumed by the pump 861 can be reduced.

Referring to FIG. 24, the base 800 can include a collection guide part 825 configured to guide condensed water generated by the first heat exchanger 910 to the water collection part 860. Further, the circulation flow path part 820 can include a water collection communication hole 827 configured such that the collection guide part 825 and the water collection part 860 communicate with each other therethrough.

The collection guide part 825 can be disposed to overlap the compressor installation part 811 in the leftward and rightward directions. Further, the water collection communication hole 827 can be located behind the compressor installation part 811.

The collection guide part 825 can include a guide bottom surface 8255 recessed downwards from the bottom surface of the transfer duct 822 so as to guide the condensed water generated by the first heat exchanger 910. The guide bottom surface 8255 can be provided at a lower position than the bottom surface of the inflow duct 821 and a transfer bottom surface 8221.

The collection guide part 825 can include a recessed stepped portion 8251 configured to form the front surface of the collection guide part 825 and an extending stepped portion 8252 configured to form the rear surface of the collection guide part 825. The recessed stepped portion 8251 can connect the inflow duct 821 and the guide bottom surface 8255 to each other stepwise. The extending stepped portion 8252 can connect the bottom surface of the transfer duct 822 and the guide bottom surface 8255 to each other stepwise.

The water collection communication hole 827 can be located under the second heat exchanger 920. When the water collection communication hole 827 is located under the second heat exchanger 920, the length of the collection guide part 825 in the forward and rearward directions can be increased compared to the case in which the water collection communication hole 827 is disposed between the first heat exchanger 910 and the second heat exchanger 920.

Therefore, the transfer distance of the condensed water to reach the water collection part 860 can be increased. Therefore, a larger amount of the condensed water can be accommodated. The frequency of drainage of the condensed water by a user can be reduced, and thus, user convenience can be increased.

The collection guide part 825 can be provided to be inclined towards the water collection communication hole 827. That is, the guide bottom surface 8255 can be provided such that the distance between the guide bottom surface 8255 and the ground decreases as the distance from the water collection communication hole 827 decreases. Due to such an inclination, the condensed water flowing along the collection guide part 825 can be transferred towards the water collection communication hole 827 by gravity. When the condensed water is transferred through the water collection communication hole 827, the condensed water can pass through a region under the second heat exchanger 920.

Referring to FIG. 25, the water collection communication hole 827 can allow the collection guide part 825 and the water collection part 860 to communicate with each other under the second heat exchanger 920. The guide bottom surface 8255 can be inclined downwards towards the water collection communication hole 827.

That is, the guide bottom surface 8255 can be provided such that the distance between the guide bottom surface 8255 and the ground decreases as the distance from the water collection communication hole 827 decreases. A water cover can be coupled to the open upper surface of the collection guide part 825. The water cover can prevent the condensed water transferred along the collection guide part 825 from coming into contact with the first heat exchanger 910 and the second heat exchanger 920.

Further, the extending stepped portion 8252 forming the rear end of the collection guide part 825 can be located under the second heat exchanger 920. Since the extending stepped portion 8252 is located under the second heat exchanger 920, the space of the collection guide part 825 extending from the recessed stepped portion 8251 to the extending stepped portion 8252 can be expanded so as to collect a larger amount of the condensed water.

A water collection body 862 can include a water collection bottom surface 8622 configured to form the bottom surface of the water collection body 862 in which the condensed water is collected, and a water collection side surface 8623 configured to form the side surface of the water collection body 862. The water collection side surface 8623 can connect the water collection bottom surface 8622 to the upper surface of the base 800 stepwise.

A water collection cover 863 can be coupled to the open upper surface of the water collection body 862 so as to prevent water collected in the water collection body 862 from scattering to the outside. The pump 861 can be installed to pass through the water collection cover 863, and can move the condensed water collected in the water collection body 862 to the outside.

When the water collection part 860 is located behind the compressor 930, as described above, the collection guide part 825 can be expanded to collect a larger amount of the condensed water, and the frequency of drainage of the condensed water by a user can be reduced, and thus, user convenience can be increased.

Figure 26:
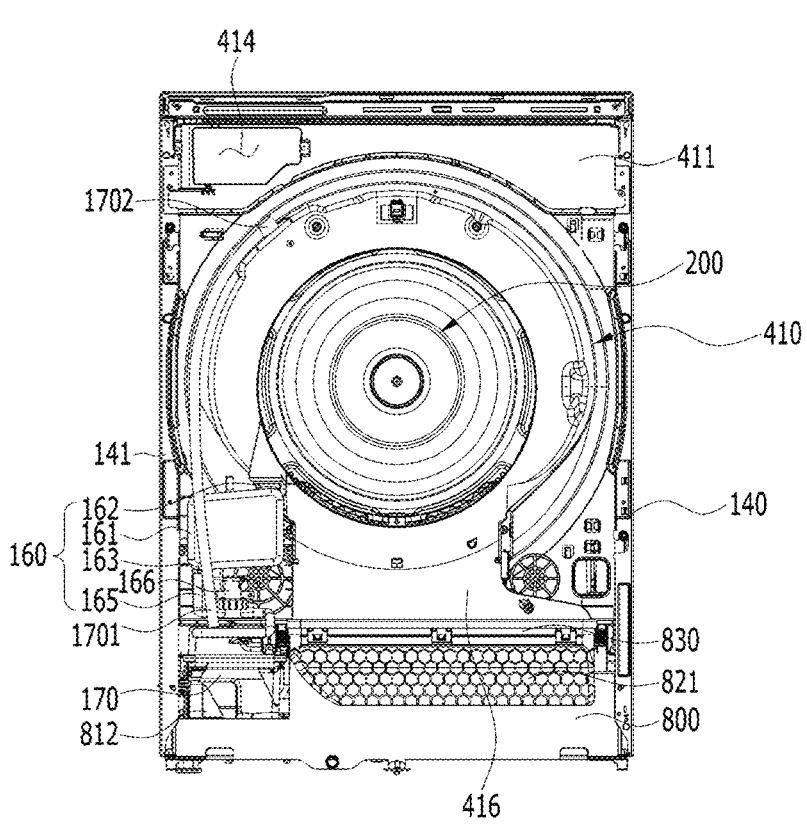
FIG. 26 is a front view illustrating an example of a front panel removed from the laundry treating apparatus.

FIG. 26 is a front view illustrating the state in which the front panel is removed from the laundry treating apparatus. FIG. 27 is an enlarged view illustrating the steam generator shown in FIG. 26.

Referring to FIGS. 26 and 27, the steam generator 170 can be installed in the steam generator installation part 812 so as to be disposed between the base 800 and the front plate 410. Further, the steam generator installation part 812 can be disposed to overlap the inflow duct 821 in the leftward and rightward directions.

The steam generator 170 can receive water so as to generate steam. Therefore, the laundry treating apparatus can include a steam water supply unit 160 configured to supply water to the steam generator 170.

Referring to FIG. 27, the steam water supply unit 160 can include a water tank 161 provided such that a user can directly supply water thereto. The water tank 161 can include a water tank inlet 162 provided at the upper portion of the water tank 161 so that water is supplied to the water tank inlet 162, and a water tank outlet 163 configured to discharge water stored in the water tank 161 therethrough.

The water tank inlet 162 can be provided at the upper portion of the water tank 161, and the water tank outlet 163 can be provided at the lower portion of the water tank 161.

The steam water supply unit 160 can include a water tank supply flow path 165 configured to connect the water tank outlet 163 to the steam generator 170. Water discharged from the steam water supply unit 160 can be supplied to the steam generator 170 through the water tank supply flow path 165.

The steam water supply unit 160 can further include a water tank valve 166 configured to selectively open and close the water tank supply flow path 165. The water tank valve 166 can be controlled by the control box 190 (with reference to FIG. 12). The water tank valve 166 can open the water tank supply flow path 165 so as to supply water to the steam generator 170 to generate steam, and can close the water tank supply flow path 165 to stop generating steam.

The steam water supply unit 160 can be disposed above the steam generator 170. In this case, although a separate pump is not used, water stored in the steam water supply unit 160 can be supplied to the steam generator 170 by gravity.

Further, the steam water supply unit 160 can be installed at the front portion of the front plate 410. The front panel 110 (with reference to FIG. 3) can be coupled to the front portion of the front plate 410 so as to prevent the steam water supply unit 160 from being exposed to a user.

However, the water tank inlet 162 can be provided to penetrate the inlet communication hole 412. That is, the water tank inlet 162 can penetrate the inlet communication hole 412 so as to be exposed to the user.

The user can access the inlet communication hole 412 by opening the door, and the water tank inlet 162 can be provided to penetrate the inner circumferential surface of the inlet communication hole 412. Therefore, the user can supplement water through the water tank inlet 162 exposed from the inner circumferential surface of the inlet communication hole 412 by opening the door.

A water tank lid 164 can be coupled to the water tank inlet 162. The water tank lid 164 can prevent water stored in the water tank 161 from scattering towards the outside. When the user supplement water of the water tank 161, the user can remove the water tank lid 164, and can couple the water tank lid 164 to the water tank inlet 162 after supplementing water.

The steam generator 170 can include a steam flow path 1701 configured to guide steam generated by the steam generator 170 to the drum, and a steam nozzle 1702 coupled to the steam flow path 1701 so as to inject the steam.

The steam nozzle 1702 can be provided to penetrate the front plate 410. The steam nozzle 1702 can penetrate the front plate 410, and can inject steam into the drum.

Steam generated by the steam generator 170 can move upwards along the steam flow path 181. Steam having moved through the steam flow path 1701 can pass through the front plate 410 through the steam nozzle 182, and can be injected into the drum.

In some implementations, a steam generator of a laundry treating apparatus will be described with reference to the accompanying drawings. A description of parts of the laundry treating apparatus which are the same as those of the laundry treating apparatus according to the earlier implementations will be omitted.

Figure 28:
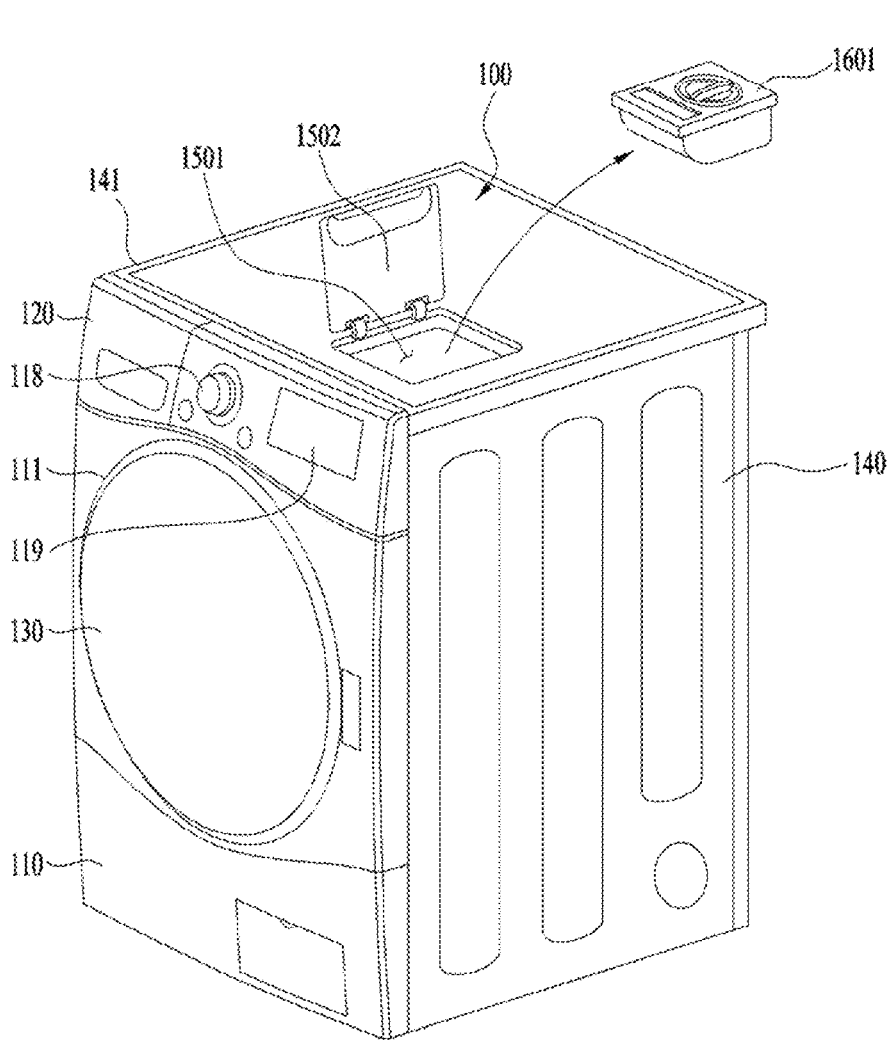
FIG. 28 is a perspective view illustrating an example of a laundry treating apparatus.
Figure 30:
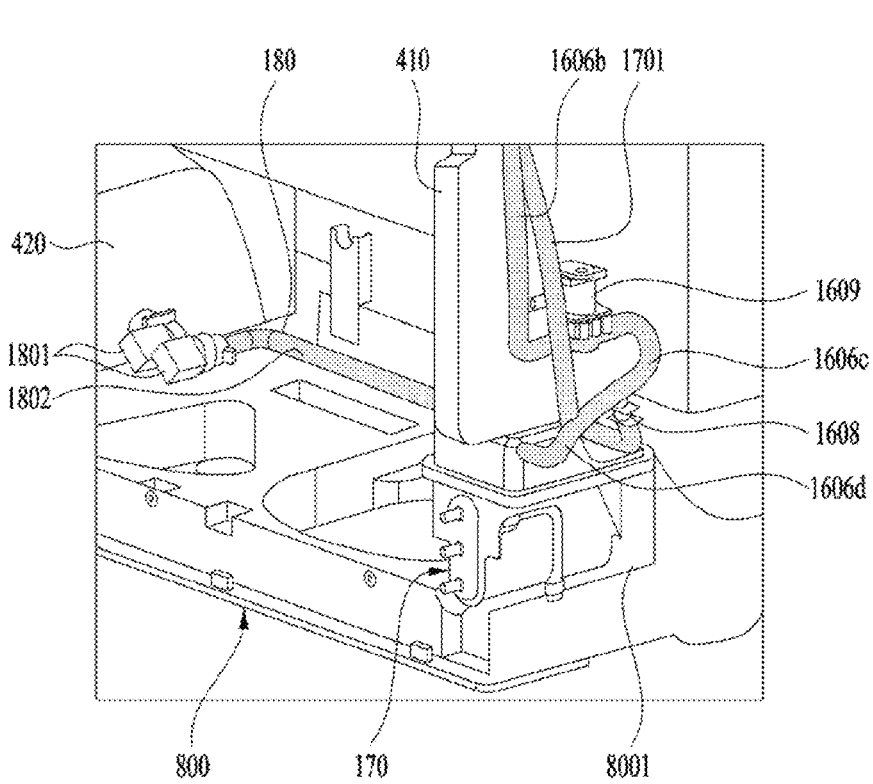
FIG. 30 is an enlarged exploded perspective view illustrating the steam generator.
Figure 31:
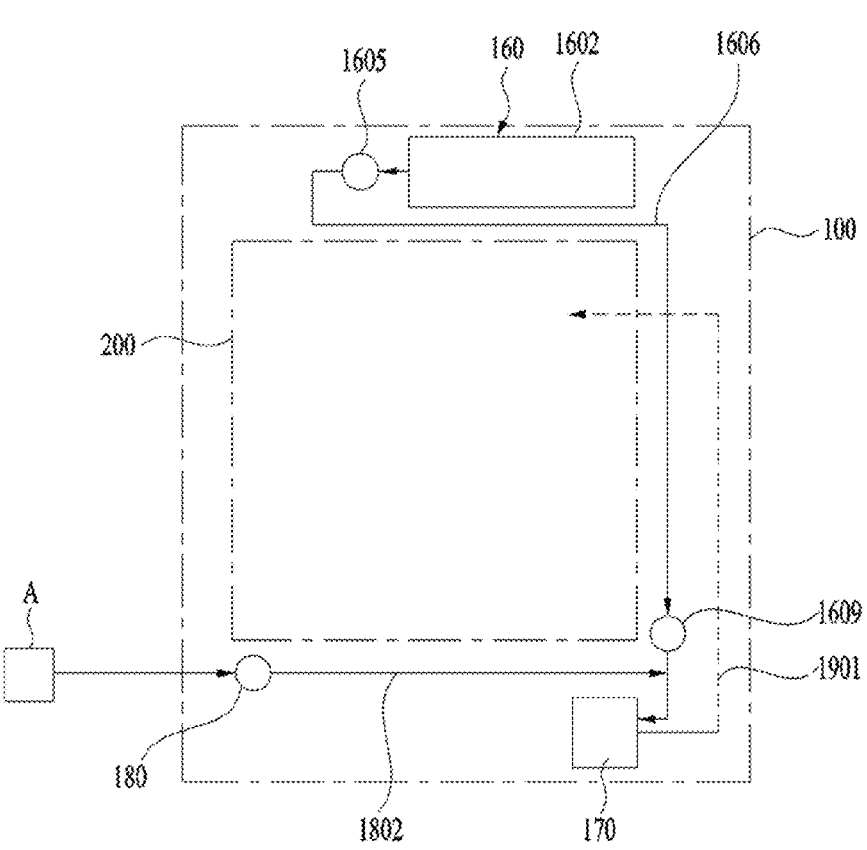
FIG. 31 is a schematic view illustrating an example of a steam flow path.

In order to generate steam, water can be supplied to the steam generator 170. In order to supply water to the steam generator 170, water can be supplied to the steam generator 170 through a water supply pipe from an external water supply source A (with reference to FIG. 31), water can be supplied to the steam generator 170 from a separate steam water cartridge 1601 (with reference to FIG. 28) in which water is stored, or condensed water generated from laundry dried in the drum can be supplied to the steam generator 170.

Further, the drawings illustrate an example in which water is supplied from the steam water cartridge 1601 in which water is stored and from the external water supply source A. However, the steam generator 170 can generate steam using condensed water generated from laundry.

As shown in FIGS. 28 to 31, the laundry treating apparatus of the present disclosure can include the steam generator 170 located on one side of the front surface of the base 800 so as to supply steam to the drum 200, a steam water supply unit 160 located above one side of the drum 200 so as to receive water supplied from the steam water cartridge 1601 in which water is stored and then to guide the received water to the steam generator 170, and a water supply unit 180 configured to receive water from the external water supply source A and to supply the received water to the steam generator 170 along the supply flow path of the steam water supply unit 160.

Here, the steam generator 170 can be located below one side of the drum 200, and a steam generator installation part 8001 in which the steam generator 170 is installed can be formed in the base 800.

The steam generator 170 can include a steam generation space, a heater provided in the steam generation space, a water level sensor configured to sense a water level in the steam generation space, and a temperature sensor configured to sense the temperature of steam generated in the steam generation space. Various implementations of the steam generator 170 are possible, and a detailed description thereof will thus be omitted.

The steam generator installation part 8001 can be provided to be recessed into one side of the front portion of the base 800. Further, the lower portion of one side of the front plate 410 located in front of the base 800 can be recessed depending on the shape of the steam generator 170 so as to secure a space in which the steam generator 170 is installed.

The steam generator installation part 8001 can be located in a lower corner space formed between the cabinet 100 and the drum 200 rotatably provided in the cabinet 100. That is, the cabinet 100 can be formed in a rectangular parallelepipedal shape having an inner space, and the drum 200 can be formed in a cylindrical shape having a rotating axis provided in the horizontal direction. Therefore, a surplus space can be formed between the outer circumferential surface of the drum 200 and a lower corner of the cabinet 100, the steam generator 170 can be located in the surplus space, and thereby, space utilization of the inside of the cabinet 100 can be improved.

The steam water supply unit 160 can be located in an upper corner space formed between the cabinet 100 and the drum 200 rotatably provided in the cabinet 100. That is, a surplus space can be formed between the outer circumferential surface of the drum 200 and an upper corner of the cabinet 100, the steam water supply unit 160 can be located in the surplus space, and thereby, space utilization of the inside of the cabinet 100 can be improved.

Here, a cartridge inlet 1501 configured to detachably attach the steam water cartridge 1601 of the steam water supply unit 160 to the cabinet 100 therethrough is formed in the upper panel 150 forming the upper surface of the cabinet 100. The cartridge inlet 1501 can be formed to correspond to the upper portion of the steam water supply unit 160, and an inlet door 1502 configured to shield the cartridge inlet 1501 can be further provided. The inlet door 1502 can be hinged to the cartridge inlet 1501, and can thus selectively open and close the cartridge inlet 1501.

The steam water supply unit 160 can include a supply unit housing 1602 located below the upper panel 150 so that the steam water cartridge 1601 is mounted in the supply unit housing 1602, and a steam water supply pump 1605 provided in the supply unit housing 1602 and configured to form a pressure for transferring water stored in the steam water cartridge 1601.

Here, water transferred by the steam water supply pump 1605 can be transferred along a supply pipe 1606 configured to connect the steam water supply pump 1605 to the steam generator 170.

The supply unit housing 1602 can be formed in a case shape having an open upper surface, a cartridge mount part 1604 located under the cartridge inlet 1501 and formed in a case shape corresponding to the shape of the steam water cartridge 1601 can be located on one side of the supply unit housing 1602, and a case-shaped pump installation part 1603 in which the steam water supply pump 1605 is installed can be formed at one side of the cartridge mount part 1604.

A cartridge connector hole 1604a communicating with the steam water cartridge 1601 can be formed on the cartridge mount part 1604, and a cartridge insertion hole into which the cartridge connector hole 1604a is inserted so as to communicate therewith can be formed in the steam water cartridge 1601.

Here, the steam water cartridge 160a can include a check valve configured to close the cartridge insertion hole when the cartridge connector hole 1604a is inserted into the cartridge insertion hole, and to open the cartridge insertion hole when the cartridge connector hole 1604a is inserted into the cartridge insertion hole.

The supply pipe 1606 can extend to guide water to the steam generator 170, and can include a first supply pipe 1606a configured to extend from the steam water supply pump 1605 so as to pass through the front plate 410, a second supply pipe 1606b configured to extend from the first supply pipe 1606a along the outer circumferential surface of the inlet communication hole 412 of the front plate 410, a steam water control valve 1609 configured to control water transferred along the second supply pipe 1606b, and a third supply pipe 1606c configured to guide the water controlled by the steam water control valve 1609 to the steam generator 170.

Here, an L-type connection pipe 1607 configured to change the direction of the second supply pipe 1606b can be further provided between the first supply pipe 1606a and the second supply pipe 1606b. The second supply pipe 1606b can extend along the outer circumference of the inlet communication hole 412 in a direction parallel to the front surface of the front plate 410, and the direction of the second supply pipe 1606b can be changed to be perpendicular to the first supply pipe 1606a passing through the front plate 410.

Further, a T-type connection pipe 1608 connected to a water supply pipe 1802 of the water supply unit 180, which will be described later, can be provided between the second supply pipe 1606b and the third supply pipe 1606c. Here, the T-type connection pipe 1608 can allow the water transferred along the second supply pipe 1606b by the steam water control valve 1609 and water transferred along the water supply pipe 1802 of the water supply unit 180 to be supplied to the steam generator 170 through the third supply pipe 1606c.

The steam water control valve 1609 provided in the second supply pipe 1606b can control supply of water transferred along the second supply pipe 1606b, and can prevent water from being excessively supplied from the steam water cartridge 1601 through the supply pipe 1606.

That is, the supply pipe 1606 can be located at a higher position than the steam generator 170, and water supplied to the steam generator 170 through the supply pipe 1606 can be excessively supplied to the steam generator 170 through the supply pipe 1606 by a siphon function. Therefore, the steam water control valve 1609 can cut off water supplied through the supply pipe 1606, thereby being capable of preventing an excessive amount of water from being supplied to the steam generator 170.

The water supply unit 180 can include a water supply valve 1801 located on one side of the lower portion of the rear plate 420 such that the external water supply source A is connected to the water supply valve 1801, and the water supply pipe 1802 extending from the water supply valve 1801 and connected to the T-type connection pipe 1608.

The water supply valve 1801 can be provided on one side of the lower portion of the rear plate 420, and in this case, when the laundry treating apparatus is stacked on another laundry treating apparatus (for example, a drum washer or the like), the height of the water supply valve 1801 can be relatively low, and thus, a connection hose extending from the external water supply source A can be more easily connected to the water supply valve 1801.

The above-described steam generator 170 can receive water for generating steam selectively from the steam water supply unit 160 or the water supply unit 180, and the controller can selectively control operation of the steam water supply pump 1605, the steam water control valve 1609 and the water supply valve 1801 depending on supply of water from the steam water supply unit 160 or the water supply unit 180.

Hereinafter, a process of supplying water to the steam generator 170 will be described in detail with reference to the accompanying drawings.

FIG. 32 is a flowchart illustrating a process of supplying steam water.

In general, when the laundry treating apparatus is initially installed, water supply can be set to select any one of the water supply unit 180 using the external water supply source A or the steam water supply unit 160 using the steam water cartridge 1601, and then, in the case in which there are no additional settings, water can be continuously supplied from the selected supply unit, i.e., the water supply unit 180 or the steam water supply unit 160.

However, unless water supply is limited to the selected water supply unit, the water supply unit 180 or the steam water supply unit 160 can be selected through various methods in the laundry treating apparatus having the water supply unit 180 and the steam water supply unit 160.

When the position of the laundry treating apparatus is changed after the laundry treating apparatus has been initially installed, the water supply unit 180 or the steam water supply unit 160 can be selected through a separate process.

By settings of a worker when the laundry treating apparatus is initially installed, as described above, a process of selecting the water supply unit 180 or the steam water supply unit 160 to supply water can be set.

First, as the laundry treating apparatus is operated, the controller determines through which one of the water supply unit 180 and the steam water supply unit 160 water is supplied to the steam generator 170.

Here, the controller can determine whether or not water is supplied through the water supply unit 180 from the external water supply source A by closing the steam water control valve 1609 of the steam water supply unit 160 and opening the water supply valve 1801 of the water supply unit 180.

Concretely, the controller closes the steam water control valve 1609 of the steam water supply unit 160, and opens the water supply valve 1801 of the water supply unit 180 (Operation S110). Here, by opening the water supply valve 1801, when the external water supply source A is connected to the water supply unit 180, water can be supplied to the steam generator 170 through the water supply valve 1801 and the water supply pipe 1802.

Thereafter, the controller stands by for a designated time while closing the steam water control valve 1609 and opening the water supply valve 1801 (Operation S120). That is, water supplied through the water supply unit 180 can be sensed by the water level sensor of the steam generator 170, and the controller can stand by for the designated time so that the steam generation space of the steam generator 170 can be filled with water. Here, the designated time can be set to be varied depending on the size of the steam generation space of the steam generator 170.

Thereafter, the controller determines whether or not the water level sensor of the steam generator 170 senses a water level after the designated time has elapsed (Operation S130). Here, when the water level sensor senses the water level, the controller can determine that the external water supply source is connected to the water supply unit 180 (Operation S200).

In Operation for determining whether or not the water level sensor senses the water level (Operation S130), when the water level sensor does not sense the water level, the controller determines that the external water supply source is not connected to the water supply unit 180, and closes the water supply valve 1801 of the water supply unit 180 (Operation S140).

Thereafter, the controller can determine whether or not water is supplied through the steam water cartridge 1601 of the steam water supply unit 160 by operating the steam water supply pump 1605 of the steam water supply unit 160 and opening the steam water control valve 1609.

Concretely, the controller opens the steam water control valve 1609 of the steam water supply unit 160, and operates the steam water supply pump 1605 (Operation S150). Here, as the steam water control valve 1609 is opened and the steam water supply pump 1605 is operated, water stored in the steam water cartridge 1601 is transferred along the supply pipe 1606, passes through the steam water control valve 1609, and is supplied to the steam generator 170.

The controller stands by for a designated time while opening the steam water control valve 1609 (Operation S160). That is, water supplied through the supply pipe 1606 can be sensed by the water level sensor of the steam generator 170, and the controller can stand by for the designated time so that the steam generation space of the steam generator 170 can be filled with water. Here, the designated time can be set to be varied depending on the size of the steam generation space of the steam generator 170.

Thereafter, the controller determines whether or not the water level sensor of the steam generator 170 senses a water level after the designated time has elapsed (Operation S130). Here, when the water level sensor senses the water level, the controller can determine that water is supplied to the steam generator 170 through the steam water supply unit 160 (Operation S300).

In Operation for determining whether or not the water level sensor senses the water level (Operation S170), when the water level sensor does not sense the water level, the controller determines that water is not supplied to the steam generator 170 through the steam water supply unit 160.

When water supply through the water supply unit 180 and the steam water supply unit 160 is not performed during the above process, the display 119 can indicate that no water is supplied to the steam generator 170 (Operation S180).

As is apparent from the above description, the present disclosure provides a laundry treating apparatus which includes a driving unit configured to reduce the rotational velocity of a rotor and then to transmit the reduced rotational velocity to a drum, and allowing the center of rotation of the rotor and the center of rotation of the drum to form a concentric axis.

Further, the present disclosure provides a laundry treating apparatus which can secure a space between an evaporator and a condenser so as to prevent condensed water generated by the evaporator from scattering in the condenser.

Further, the present disclosure provides a laundry treating apparatus which can secure a space between a condenser and a circulation fan so as to facilitate smooth generation of air flow in a flow path by the circulation fan.

Further, the present disclosure provides a laundry treating apparatus which can increase the circulation rate of air in a flow path.

Further, the present disclosure provides a laundry treating apparatus in which a steam generator configured to generate steam injected into a drum can be installed on a base.

Further, the present disclosure provides a laundry treating apparatus which can supply steam generated by a steam generator to the front portion of a drum.

Further, the present disclosure provides a laundry treating apparatus which can shorten the length of a flow path configured to supply water to a steam generator by disposing a water supply unit configured to store water to generate steam and the steam generator adjacent to each other.

Further, the present disclosure provides a laundry treating apparatus which can install a steam generator on a base so as to increase efficiency in space utilization.

Further, the present disclosure provides a laundry treating apparatus which can improve a water supply structure configured to generate steam so as to simplify a steam water supply flow path.

Further, the present disclosure provides a laundry treating apparatus which can improve a water supply position for steam generation when the laundry treating apparatus is stacked on another laundry treating apparatus, so as to provide convenience to a worker or a user.

Further, the present disclosure provides a laundry treating apparatus which can improve a water supply position for steam generation when the laundry treating apparatus is stacked on another laundry treating apparatus, so as to prevent a water supply hose configured to connect a water supply unit to an external water supply source from unnecessarily extending.

The present disclosure is not limited to the above-described effects, and it is to be understood that other effects not described herein will become apparent to those skilled in the art from the claims.

The above description is merely illustrative of specific implementations of the present disclosure, and it will be apparent to those skilled in the art that various modifications and variations can be made in the present disclosure without departing from the spirit or scope of the present disclosure. Therefore, the scope of the present disclosure is defined not by the detailed description, but by the claims and their equivalents, and all variations within the scope of the claims and their equivalents are to be construed as being included in the present disclosure.

What is claimed is:

1. A laundry treating apparatus comprising:
a cabinet having an opening defined at a front portion thereof;
a drum rotatably disposed in the cabinet, the drum having an inlet defined at a front portion thereof and configured to introduce laundry to the drum;
a front plate that is located between the cabinet and the drum and is configured to support the front portion of the drum;
a base that is disposed below the drum, the base defining a space configured to at least one of (i) receive air discharged from the drum and guide the air to the drum or (ii) collect moisture condensed from the air;
a motor configured to rotate the drum, the motor being disposed rearward relative to the drum and spaced apart from the base;
a steam generator configured to generate steam to be supplied to the drum; and
a heat exchange unit comprising:
a first heat exchanger disposed at the base and configured to condense the moisture in the air,
a second heat exchanger disposed at the base and configured to heat the air, and
a compressor configured to supply a refrigerant to the first heat exchanger or the second heat exchanger to thereby enable heat exchange between the air and the refrigerant,
wherein the base defines:
a circulation flow path that accommodates the first heat exchanger and the second heat exchanger and is configured to guide the air toward the drum, and
a steam generator installation space that is spaced apart from the circulation flow path and accommodates the steam generator, and wherein the steam generator is disposed forward toward the front plate relative to the compressor and is disposed at a side of the circulation flow path.

2. The laundry treating apparatus according to claim 1, further comprising a water collection part that is spaced apart from the steam generator installation space and defines a water collection space that is in fluid communication with the circulation flow path and configured to collect water condensed in the circulation flow path,
wherein the steam generator installation space and the water collection part are arranged along a forward-rearward direction such that the steam generator installation space overlaps with the water collection part along the forward-rearward direction.

3. The laundry treating apparatus according to claim 2, wherein the steam generator installation space is defined forward relative to the water collection part.

4. The laundry treating apparatus according to claim 3, wherein the water collection part and the first heat exchanger are arranged along a left-right direction such that the water collection part overlaps with the first heat exchanger along the left-right direction.

5. The laundry treating apparatus according to claim 4, wherein the base further comprises a collection guide that is recessed from a first portion of a bottom surface of the circulation flow path facing the first heat exchanger and configured to guide the condensed water to the water collection space,
wherein the collection guide defines a water collection communication hole that passes through a second portion of the bottom surface of the circulation flow path facing the water collection part, the water collection communication hole being in fluidly communication with the water collection space, and
wherein the steam generator installation space is defined forward relative to the water collection communication hole.

6. The laundry treating apparatus according to claim 4, wherein the steam generator installation space is defined forward relative to the first heat exchanger.

7. The laundry treating apparatus according to claim 2, wherein the base further defines a compressor installation space that is spaced apart from the circulation flow path and accommodates the compressor, and
wherein the steam generator installation space and compressor installation space are arranged along the forward-rearward direction such that the steam generator installation space overlaps with the compressor installation space along the forward-rearward direction.

8. The laundry treating apparatus according to claim 7, wherein the steam generator installation space is defined forward relative to the compressor installation space.

9. The laundry treating apparatus according to claim 8, wherein the water collection space is arranged between the steam generator installation space and the compressor installation space in the forward-rearward direction.

10. The laundry treating apparatus according to claim 1, wherein the circulation flow path comprises:
an inflow duct disposed at a first side of the circulation flow path and configured to receive the air discharged from the drum;
a discharge duct disposed at a second side of the circulation flow path and configured to discharge the air toward the drum; and
a transfer duct that connects the inflow duct to the discharge duct,

wherein the steam generator installation space and the inflow duct are arranged along a left-right direction such that the steam generator installation space overlaps with the inflow duct along the left-right direction.

11. The laundry treating apparatus according to claim 10, wherein the front plate is configured to guide the air discharged from the drum to the inflow duct and defines an inlet communication hole in fluid communication with the opening of the cabinet, and wherein the steam generator installation space is defined at a surface of the base facing the front plate.

12. The laundry treating apparatus according to claim 11, wherein the steam generator is disposed between the base and the front plate.

13. The laundry treating apparatus according to claim 1, further comprising a rear plate disposed on the base and located between the drum and the motor, the rear plate being configured to guide the air discharged from the circulation flow path to the drum.

14. The laundry treating apparatus according to claim 13, further comprising a reducer fixed to a rear surface of the rear plate and disposed between the drum and the motor, the reducer being configured to reduce rotational power supplied by the motor to rotate the drum.

15. The laundry treating apparatus according to claim 14, wherein the motor is fixed to the reducer and spaced apart from the rear plate.

16. The laundry treating apparatus according to claim 10, further comprising a circulation flow path fan rotatably disposed in the discharge duct and configured to generate air flow from the transfer duct toward the drum, wherein a distance between the first heat exchanger and the second heat exchanger is greater than a distance between the second heat exchanger and the circulation flow path fan in a forward-rearward direction.

17. The laundry treating apparatus according to claim 16, wherein the distance between the first heat exchanger and the second heat exchanger is greater than or equal to a length of the first heat exchanger or a length of the second heat exchanger in the forward-rearward direction.

18. The laundry treating apparatus according to claim 1, further comprising:

a steam water supply unit configured to store water and to supply the stored water to the steam generator, the steam water supply unit comprising a supply pipe that is disposed at an upper region of the front portion of the cabinet and extends toward the steam generator; and a water supply unit configured to receive water from an external water supply source and to supply the water to the steam generator, the water supply unit comprising a water supply pipe that is disposed at a lower region of a rear portion of the cabinet and connected to the supply pipe of the steam water supply unit.

19. The laundry treating apparatus according to claim 18, wherein the steam water supply unit further comprises:

a steam water cartridge configured to store water;

a supply unit housing configured to detachably accommodate the steam water cartridge therein; and a steam water supply pump disposed in the supply unit housing and configured to transfer the water stored in the steam water cartridge through the supply pipe, and wherein the supply pipe comprises a T-type connection pipe connected to the steam water supply pump and the water supply pipe.

20. The laundry treating apparatus according to claim 19, wherein the cabinet comprises a rear plate that defines a rear surface of the cabinet, the motor being disposed on the rear plate, and wherein the water supply unit is located at a lower portion of a rear surface of the rear plate.

21. The laundry treating apparatus according to claim 20, wherein the water supply unit further comprises a water supply valve disposed at the lower portion of the rear surface of the rear plate, and wherein the water supply pipe connects the water supply valve to the T-type connection pipe.

22. The laundry treating apparatus according to claim 21, wherein the steam water supply unit further comprises a steam water control valve disposed at a front end of the T-type connection pipe and configured to restrict the stored water from flowing along the supply pipe.

23. The laundry treating apparatus according to claim 19, wherein the supply unit housing defines:

a cartridge mount space configured to detachably accommodate the steam water cartridge; and a pump installation space that is disposed adjacent to the cartridge mount space and accommodates the steam water supply pump.

24. The laundry treating apparatus according to claim 23, wherein the cabinet further comprises:

an upper panel that defines an upper surface of the cabinet, the upper panel having a cartridge inlet defined above the cartridge mount space and configured to receive and discharge the steam water cartridge therethrough; and an inlet door rotatably connected to the upper panel and configured to cover the cartridge inlet.

25. A laundry treating apparatus comprising:

a cabinet having an opening defined at a front portion thereof;

a drum rotatably disposed in the cabinet, the drum having an inlet defined at a front portion thereof and configured to introduce laundry to the drum;

a base that is disposed below the drum, the base defining a space configured to at least one of (i) receive air discharged from the drum and guide the air to the drum or (ii) collect moisture condensed from the air;

a motor configured to rotate the drum, the motor being disposed rearward relative to the drum and spaced apart from the base; and a heat exchange unit comprising:

a first heat exchanger disposed at the base and configured to condense the moisture in the air, a second heat exchanger spaced apart from the first heat exchanger and configured to heat the air, and a compressor configured to supply a refrigerant to the first heat exchanger or the second heat exchanger to thereby enable heat exchange between the air and the refrigerant, wherein the base defines a circulation flow path that accommodates the first heat exchanger and the second heat exchanger and is configured to guide the air toward the drum, wherein the laundry treating apparatus further comprises a circulation flow path fan that is disposed rearward relative to the second heat exchanger and configured to generate air flow along the circulation flow path toward the drum, and wherein a distance between the first heat exchanger and the second heat exchanger is greater than a distance between the second heat exchanger and the circulation flow path fan.

26. The laundry treating apparatus according to claim 25, wherein the circulation flow path comprises:

an inflow duct disposed at a first side of the circulation flow path and configured to receive the air discharged from the drum;

a discharge duct disposed at a second side of the circulation flow path and configured to discharge the air toward the drum; and a transfer duct that connects the inflow duct to the discharge duct.

27. The laundry treating apparatus according to claim 26, wherein the first heat exchanger and the second heat exchanger are disposed in the transfer duct, and wherein the circulation flow path fan is disposed in the discharge duct.

28. The laundry treating apparatus according to claim 27, wherein the discharge duct comprises an air blowing part that accommodates the circulation flow path fan, that is located at a rear part of the discharge duct, and that is configured to discharge the air out of the circulation flow path.

29. The laundry treating apparatus according to claim 28, wherein a diameter of the circulation flow path fan is greater than or equal to a height of the second heat exchanger.

30. The laundry treating apparatus according to claim 27, wherein the circulation flow path fan and the transfer duct are arranged along a forward-rearward direction such that an outer circumferential surface of the circulation flow path fan overlaps with the transfer duct along the forward-rearward direction.

31. The laundry treating apparatus according to claim 27, wherein a center axis of rotation of the circulation flow path fan extends parallel to a longitudinal direction of the transfer duct and passes through a width center of the transfer duct.

32. The laundry treating apparatus according to claim 27, wherein a center axis of rotation of the circulation flow path fan passes through a width center of one of the first heat exchanger or the second heat exchanger.

33. The laundry treating apparatus according to claim 25, wherein the base further comprises:

a water collection part that is disposed outside the circulation flow path and defines a water collection space in fluid communication with the circulation flow path, the water collection space being configured to collect condensed water generated in the circulation flow path; and a collection guide disposed at a bottom surface of the circulation flow path facing the first heat exchanger and configured to guide the condensed water to the water collection space.

34. The laundry treating apparatus according to claim 33, further comprising a water cover that is located between the first heat exchanger and the collection guide and supports the first heat exchanger, the water cover being configured to block the condensed water transferred along the collection guide from coming into contact with the first heat exchanger, wherein the water cover is spaced apart from the second heat exchanger.

35. The laundry treating apparatus according to claim 34, wherein the collection guide comprises an extending stepped portion located between the first heat exchanger and the second heat exchanger and configured to block the condensed water from overflowing toward the second heat exchanger.

* * * * *